United States Patent
Reilly et al.

(10) Patent No.: US 10,486,050 B2
(45) Date of Patent: *Nov. 26, 2019

(54) VIRTUAL REALITY SPORTS TRAINING SYSTEMS AND METHODS

(71) Applicant: WIN Reality, LLC, Austin, TX (US)

(72) Inventors: Brendan Reilly, Kansas City, MO (US); Yazhou Huang, Mission Viejo, CA (US); Lloyd Churches, Victoria (AU); Chris O'Dowd, Osprey, FL (US); Sebastien Goisbeault, Le Genest Saint Isle (FR); Mats Johansson, Trabuco Canyon, CA (US)

(73) Assignee: WIN REALITY, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,313

(22) Filed: May 6, 2019

(65) Prior Publication Data

US 2019/0255419 A1 Aug. 22, 2019

Related U.S. Application Data

(63) Continuation of application No. 15/431,630, filed on Feb. 13, 2017, now Pat. No. 10,300,362, which is a
(Continued)

(51) Int. Cl.
*G09G 5/00* (2006.01)
*A63B 71/06* (2006.01)
(Continued)

(52) U.S. Cl.
CPC .......... *A63B 71/0622* (2013.01); *A63B 69/00* (2013.01); *A63B 69/002* (2013.01);
(Continued)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS

| | | | |
|---|---|---|---|
| 5,443,260 A * | 8/1995 | Stewart | A63B 69/0002 473/421 |
| 2007/0072705 A1 * | 3/2007 | Ono | A63B 24/0003 473/451 |

(Continued)

*Primary Examiner* — Gordon G Liu
(74) *Attorney, Agent, or Firm* — Innovation Capital Law Group, LLP; Vic Lin

(57) ABSTRACT

Virtual and augmented reality sports training environments are disclosed. A user interacts with virtual players in a simulated environment of a virtual reality sporting event. In some embodiments, the user's actions and decisions are monitored by the simulated environment. The environment evaluates the user's performance, and provides quantitative scoring based on the user's decisions and timing. Coaches and other users may design customized scenarios or plays to train and test users, and the resultant scores may be reviewed by the coach. In one application, real life pitchers and their pitching data are tracked and replicated in a simulated pitching environment. A team of users may practice against a simulation of a pitcher they are about to compete against, swinging at pitches that they would see in a real game. Such environments may maximize effective practice time for users, and help develop better players with improved decision-making skills.

20 Claims, 45 Drawing Sheets

Related U.S. Application Data continuation-in-part of application No. 14/694,770, filed on Apr. 23, 2015, now abandoned.

(60) Provisional application No. 62/294,195, filed on Feb. 11, 2016.

(51) Int. Cl.

| | |
|---|---|
| *A63B 69/00* | (2006.01) |
| *G09G 3/00* | (2006.01) |
| *G09G 5/18* | (2006.01) |
| *G06F 3/147* | (2006.01) |
| *G06F 3/01* | (2006.01) |
| *G06F 3/0481* | (2013.01) |
| *G09G 5/02* | (2006.01) |
| *G09G 5/14* | (2006.01) |
| *G09B 19/00* | (2006.01) |
| *G06K 9/00* | (2006.01) |
| *G02B 27/01* | (2006.01) |

(52) U.S. Cl.
CPC ...... *A63B 69/0002* (2013.01); *A63B 69/0015* (2013.01); *A63B 69/0024* (2013.01); *A63B 69/0071* (2013.01); *G06F 3/011* (2013.01); *G06F 3/04815* (2013.01); *G06F 3/147* (2013.01); *G09B 19/0038* (2013.01); *G09G 3/001* (2013.01); *G09G 5/026* (2013.01); *G09G 5/14* (2013.01); *G09G 5/18* (2013.01); *A63B 2069/0008* (2013.01); *A63B 2071/0636* (2013.01); *A63B 2071/0647* (2013.01); *A63B 2071/0666* (2013.01); *A63B 2225/50* (2013.01); *A63B 2243/007* (2013.01); *A63B 2243/0025* (2013.01); *A63B 2243/0033* (2013.01); *A63B 2243/0037* (2013.01); *A63B 2243/0066* (2013.01); *G02B 2027/0141* (2013.01); *G06K 9/00342* (2013.01); *G09G 2340/12* (2013.01)

(58) Field of Classification Search
USPC .......................................................... 345/633
See application file for complete search history.

(56) References Cited

U.S. PATENT DOCUMENTS

| | | | |
|---|---|---|---|
| 2013/0095924 A1* | 4/2013 | Geisner | G06F 3/012 463/32 |
| 2013/0244211 A1* | 9/2013 | Dowling | G06F 19/3481 434/247 |

* cited by examiner

NO IMPACT

ALGORITHM #1
POSSIBLE IMPACT

ALGORITHM #2
CONFIRMED IMPACT

VIRTUAL REALITY SPORTS TRAINING SYSTEMS AND METHODS

CROSS-REFERENCE TO RELATED APPLICATION

This application is a continuation of pending U.S. Non-provisional application Ser. No. 15/431,630 filed Feb. 13, 2017.

BACKGROUND OF THE INVENTION

1. Field of the Invention

The present invention relates in general to systems and methods for training athletes. More particularly, the invention is directed to virtual reality simulated sports training systems and methods.

2. Description of the Related Art

Virtual reality environments may provide users with simulated experiences of sporting events. Such virtual reality environments may be particularly useful for sports such as American football in which players may experience many repetitions of plays while avoiding the chronic injuries that may otherwise result on real-world practice fields. However, conventional virtual reality sports simulators may not provide meaningful training experiences and feedback of the performance of a player.

Accordingly, a need exists to improve the training of players in a virtual reality simulated sporting environment.

SUMMARY OF THE INVENTION

In the first aspect, a machine implemented method for simulated sports training is disclosed. The method comprises generating a simulated environment having one or more virtual objects of a sporting event to a user by one or more computing devices, and generating simulated players in the simulated environment of the sporting event, each of the simulated players located in a pre-determined location. The method further comprises presenting a query to the user, receiving a response from the user, and scoring the response.

In a first preferred embodiment, the method further comprises initiating a simulated play for a period of time, wherein one or more simulated players move in response to the play. The method preferably further comprises developing the simulated play by a second user, wherein the simulated play defines the pre-determined location of the simulated players and the movements of the simulated players during the play. The method preferably further comprises sending the scored response to another user. Generating the simulated environment of the sporting event preferably comprises generating the simulated environment on a head-mounted display. Receiving the response preferably comprises receiving user input from the computer device employing a virtual pointer. Generating the simulated environment of the sporting event preferably comprises generating the simulated environment in an immersive virtual reality environment. Receiving a response preferably comprises receiving user input through a game controller. The sporting event is preferably American football.

In a second aspect, a machine readable non-transitory medium storing executable program instructions which when executed cause a data processing system to perform a method is disclosed. The method comprises generating a simulated environment of a sporting event to a user by one or more computing devices, the simulated environment depicting the sporting event appearing to be in the immediate physical surroundings of the user, and generating simulated players in the simulated environment of the sporting event, each of the simulated players located in a pre-determined location. The method further comprises presenting a query to the user, receiving a response from the user, and scoring the response.

In a second preferred embodiment, the method further comprises initiating a simulated play for a period of time, wherein one or more simulated players move in response to the play. The method preferably further comprises developing the simulated play by a second user, wherein the simulated play defines the pre-determined location of the simulated players and the movements of the simulated players during the play. The method preferably further comprises sending the scored response to another user. Generating the simulated environment of a sporting event preferably comprises providing the simulated environment on a head-mounted display. Receiving the response preferably comprises receiving user input from the computer device employing a virtual pointer. Generating the simulated environment of a sporting event preferably comprises generating the simulated environment in an immersive virtual reality environment. Receiving a response preferably comprises receiving user input through a game controller.

In a third aspect, a system for facilitating simulated sports training is disclosed. The system comprises an input configured to receive user input, at least one processing system coupled to the input, the at least one processing system having one or more processors configured to generate and interact with a simulated sports training environment based on at least the user input, the at least one processing system operable to perform the operations including generating a simulated environment of a sporting event to a user by one or more computing devices, the simulated environment depicting sporting event appearing to be in the immediate physical surroundings of the user. The operations further comprise generating simulated players in the simulated environment of the sporting event, each of the simulated players located in a pre-determined location, presenting a query to the user, receiving a response from the user, and scoring the response.

In a third preferred embodiment, generating the simulated environment of the sporting event comprises generating the simulated environment on a head-mounted display. Generating the simulated environment of the sporting event preferably comprises generating the simulated environment in an immersive virtual reality environment.

In another embodiment, a virtual reality projection system comprises a projector and a graphics engine module connected to the projector. The graphics engine module is configured to: display a virtual reality environment from the projector; retrieve from a database, real-life pitching data for a selected real-life pitcher, the real-life pitching data including a pitch type, a release point associated with the pitch type for the selected real-life pitcher, and a range of speeds associated with the pitch type for the selected real-life pitcher; display in the virtual reality environment, a digital avatar of the selected real-life pitcher with an appearance of the real-life pitcher in real-life from the perspective of a baseball batter, display in the virtual reality environment, a pitching sequence by the digital avatar of the selected real-life baseball pitcher, from either a wind-up or a stretch delivery, and display in the virtual reality environment, a release of a digital baseball from the release point associated with the pitch type for the selected real-life pitcher, the release of the digital baseball continuing in a simulated trajectory of a thrown pitch from the release point associated with the pitch type for the selected real-life pitcher toward a strike zone adjacent the baseball batter.

In yet another embodiment, a machine readable non-transitory medium storing executable program instructions which when executed cause a data processing system to perform a method comprising: displaying a virtual reality environment from a projector; retrieving from a database, real-life pitching data for a selected real-life pitcher, the real-life pitching data including a pitch type, a release point associated with the pitch type for the selected real-life pitcher, and a range of speeds associated with the pitch type for the selected real-life pitcher; displaying in the virtual reality environment, a digital avatar of the selected real-life pitcher with an appearance of the real-life pitcher in real-life from the perspective of a baseball batter, displaying in the virtual reality environment, a pitching sequence by the digital avatar of the selected real-life baseball pitcher, from either a wind-up or a stretch delivery, and displaying in the virtual reality environment, a release of a digital baseball from the release point associated with the pitch type for the selected real-life pitcher, the release of the digital baseball continuing in a simulated trajectory of a thrown pitch from the release point associated with the pitch type for the selected real-life pitcher toward a strike zone adjacent the baseball batter.

These and other features and advantages of the invention will become more apparent with a description of preferred embodiments in reference to the associated drawings.

DETAILED DESCRIPTION OF THE PREFERRED EMBODIMENTS

Figure 1:
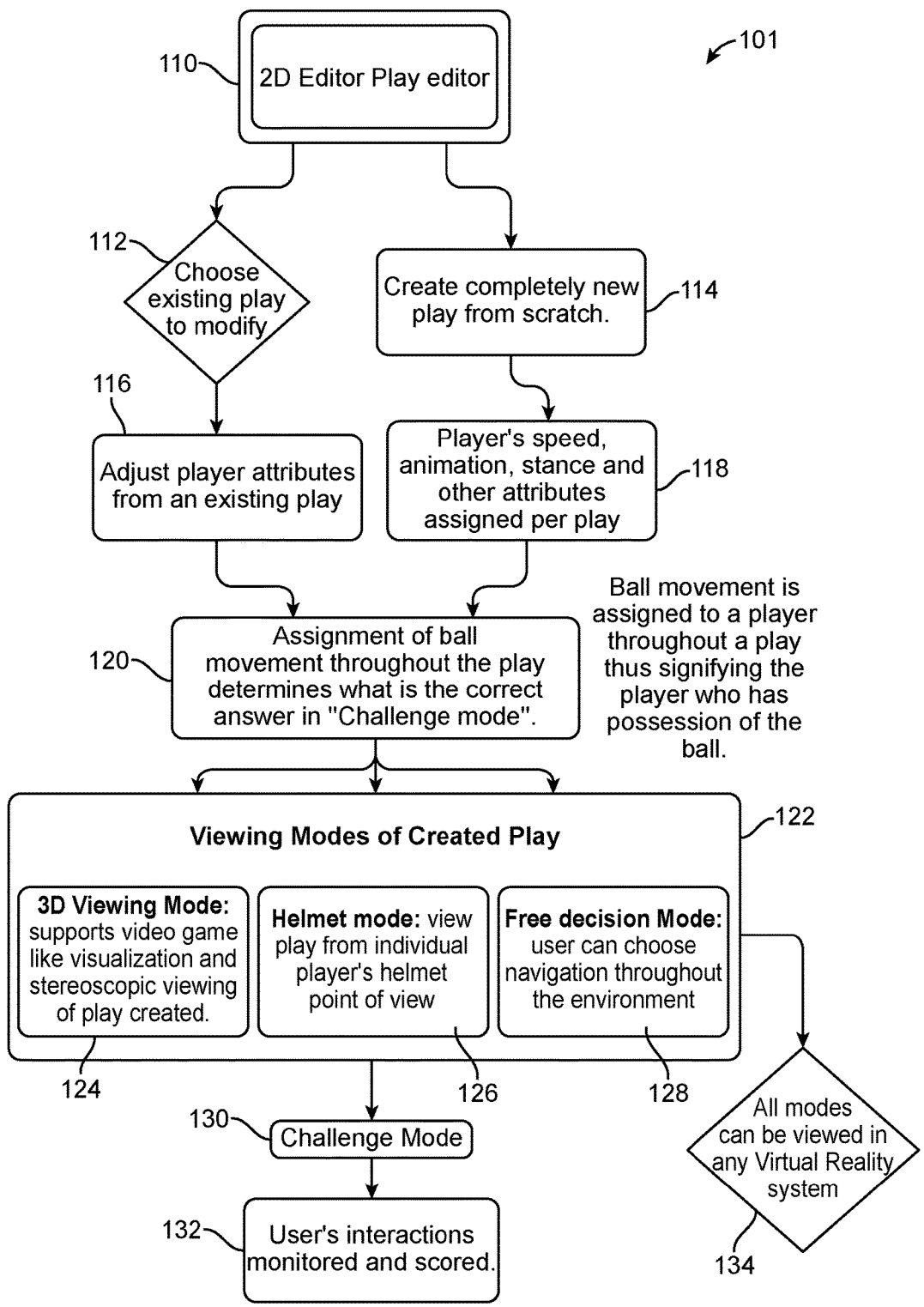
FIG. 1 is an exemplary flowchart illustrating a method for implementing a virtual reality sports training program.

The following preferred embodiments are directed to virtual reality sports training systems and methods. Virtual reality environments provide users with computer-generated virtual objects which create an illusion to the users that they are physically present in the virtual reality environment. Users typically interact with the virtual reality environment by employing some type of device such as headset goggles, glasses, or mobile devices having displays, augmented reality headgear, or through a cave automatic virtual environment (CAVE) immersive virtual reality environment where projectors project images to the walls, ceiling, and floor of a cube-shaped room.

In one or more embodiments, a sports training simulated environment is contemplated. While in a virtual reality environment, a user views a simulated sporting event. In an embodiment, a user acting as a football quarterback in the virtual reality environment may see a pre-snap formation of computer-generated defensive and offensive football players. In an embodiment, the virtual football is snapped, the play is initiated, and the offensive and defensive players move accordingly. The user sees several of his virtual teammates cross the field, and the user must decide among his teammates to whom he should throw the ball. The user makes his selection, and the sports training simulated environment scores the user's decisions. Scores may be based on timing (i.e., how quickly the user decides) and/or on selection (i.e., did the user select the correct player). In one or more embodiments, the user may repeat the virtual play or may move on to additional plays. The scores are stored in a cloud based storage. The user's progress (or regression) over time will be tracked and monitored. The user can access the scores and data via a personalized dashboard in either a webpage or mobile application.

In one or more embodiments, the user may be queried on other aspects of a simulated sporting event. For example, a user acting as a virtual quarterback may be asked to read a defense and identify areas of weakness against a play. In one or more embodiments, multiple possible answers are presented to the user, and the user selects the answer he believes is correct.

In one or more embodiments, a comprehensive virtual reality sports training environment is contemplated. A coach may develop customized plays for his team. The players of the team then interact individually with the virtual reality simulated sporting event and have their performances scored. The scores of the players may then be interpreted and reviewed by the coach.

One or more embodiments provide a means for improving athlete decision-making. Athletes in a virtual environment may experience an increased number of meaningful play repetitions without the risk of injury. Such environments may maximize effective practice time for users, and help develop better players with improved decision-making skills.

Embodiments described herein refer to virtual reality simulated environments. However, it shall be understood that one or more embodiments may employ augmented reality environments comprising both virtual and real world objects. As used herein and as is commonly known in the art, the terms "simulated environments," "simulated," "virtual," "augmented," and "virtual reality environment" may refer to environments or video displays comprising computer-generated virtual objects or computer-generated virtual objects that are added to a display of a real scene, and may include computer-generated icons, images, virtual objects, text, or photographs. Reference made herein to a mobile device is for illustration purposes only and shall not be deemed limiting. Mobile device may be any electronic computing device, including handheld computers, smart phones, tablets, laptop computers, smart devices, GPS navigation units, or personal digital assistants for example.

Embodiments described herein make reference to a training systems and methods for American football; however, it shall be understood that one or more embodiments may provide training systems and methods for other sports including, but not limited to, soccer, baseball, hockey, basketball, rugby, cricket, and handball for example. As used herein and as is commonly known in the art, a "play" is a plan or action for one or more players to advance the team in the sporting event. Embodiments described herein may employ head mounted displays or immersive systems as specific examples of virtual reality environments. It shall be understood that embodiments may employ head mounted displays, immersive systems, mobile devices, projection systems, or other forms of simulated environment displays.

FIG. 1 is an exemplary flowchart illustrating a machine-implemented method 101 for implementing a virtual reality sports training program. The process begins with a 2 dimensional ("2D") play editor program (step 110) in which a coach or another person may either choose an existing simulated play to modify (step 112) or else create a completely new simulated play from scratch (step 114). The simulated play may be created by a second user such as a coach, where the simulated play defines the pre-determined location of the simulated players and the movements of the simulated players during the play.

An existing play may be modified by adjusting player attributes from an existing play (step 116). A new play may be created by assigning a player's speed, animation, stance, and other attributes for a given play (step 118). The simulated sports training environment provides a simulated environment of a sporting event to a user by one or more computing devices, where the simulated environment depicting the sporting event appears to be in the immediate physical surroundings of the user. The simulated sports training environment generates simulated players in the video display of the sporting event, where each of the simulated players is located in a pre-determined location. In one or more embodiments, the simulated sports training environment initiates a simulated play for a period of time, where one or more simulated players move in response to the play. Assignment of ball movement throughout the play determines the correct answer in the "Challenge mode" (step 120).

Multiple viewing modes are possible to present the created play (step 122). A 3D viewing mode supports video game visualization and stereoscopic viewing of the play created (step 124). In a helmet mode, the view of the play is from the individual player's helmet view point (step 126). In a free decision mode, the user may choose the navigation throughout the environment (step 128). All of these modes may be viewed in any virtual reality system (step 134).

The user may be faced with a challenge mode (step 130) where the user's interactions with the play are monitored and scored (step 132). In one or more embodiments, the sports training environment presents a question or query to the user, receives a response from the user, and scores the response. The ball movement is assigned to a player throughout a play to signify the player who has possession of the ball. In one or more embodiments, the simulated sports training environment may send the scored response to another user such as the coach. In one or more embodiments, the simulated sports training environment may send the scored response to another user to challenge the other user to beat one's score.

Figure 2:
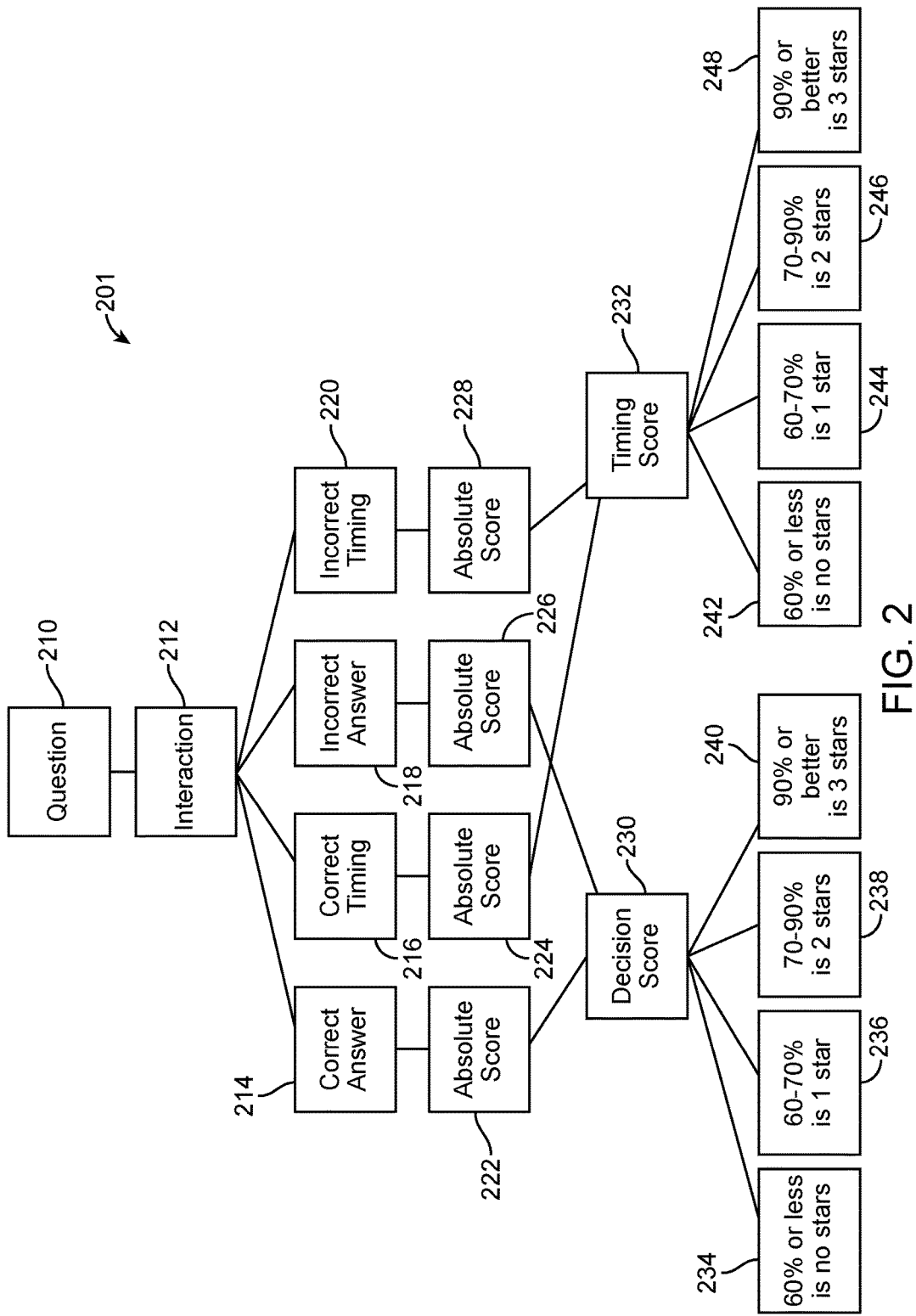
FIG. 2 is an exemplary flowchart illustrating the calculation of the decision and timing scores.

FIG. 2 is an exemplary flowchart illustrating the method 201 for calculating the decision and timing scores in the challenge mode. The user interacts with a play in a virtual reality environment, and a question or query is posed to the player (step 210). The player then interacts with the virtual reality system through a handheld controller, player gestures, or player movements in one or more embodiments (step 212). The interaction is monitored by the virtual reality environment which determines if the interaction results in a correct answer (step 214), correct timing (step 216), incorrect answer (step 218) or incorrect timing (step 220). Each of these decision and timing results are compared to an absolute score for the correct answer (step 222), an absolute score for the correct timing (step 224), an absolute score for the incorrect answer (step 226), or the absolute score for incorrect timing (step 228). The comparison of the absolute scores from the correct answer (step 222) and a comparison of the absolute score of the incorrect answer (step 226) determines the decision score (step 230). The comparison of the absolute score of the correct timing (step 224) and the absolute score of the incorrect timing (step 228) determines the timing score (step 232). The decision score (step 230) is assigned a number of stars for providing feedback to the player. A decision score of 60% or less generates no stars (step 234), a decision score of 60-70% results in one star (step 236), a decision score of 70-90% results in two stars (step 238), and a decision score of 90% or greater results in three stars (step 240) in one or more embodiments. The timing score (step 232) is assigned a number of stars for providing feedback to the player. A timing score of 60% or less generates no stars (step 242), a timing score of 60-70% results in one star (step 244), a timing score of 70-90% results in two stars (step 246), and a timing score of 90% or greater results in three stars (step 248) in one or more embodiments.

Figure 3:
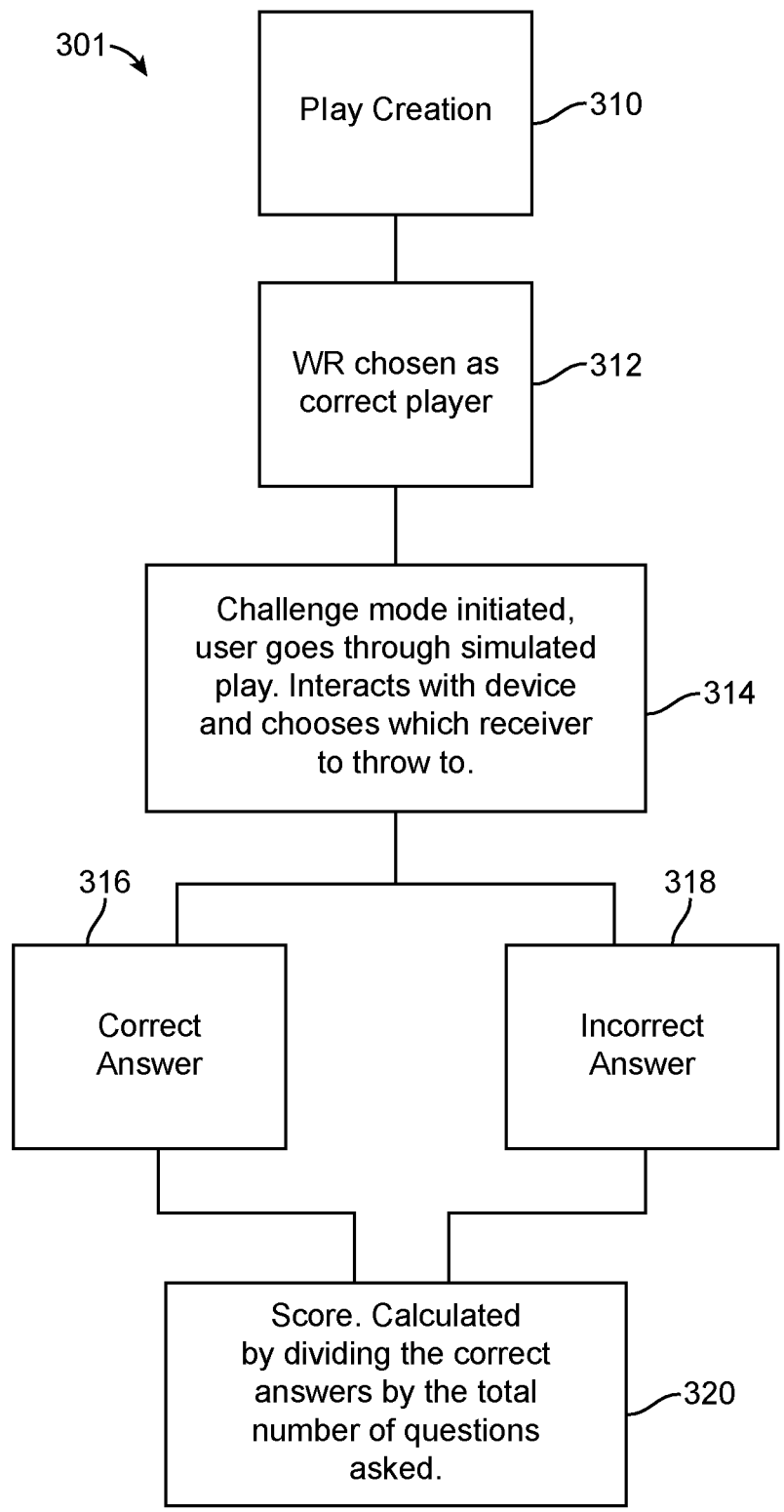
FIG. 3 is an exemplary flowchart illustrating the decision scoring for a football quarterback.

FIG. 3 is an exemplary flowchart illustrating a method 301 for determining the decision scoring for a football quarterback in one or more embodiments. A coach or another person creates a play (step 310), where, in this example, the wide receiver is chosen as the correct teammate for receiving the football (step 312). The wide receiver chosen by the coach as the recipient of the ball is deemed the correct answer for the player in the challenge mode. A play commences in a simulated environment, and the challenge mode is initiated as the player goes through a simulated play where the player interacts with a device and chooses the player to receive the ball (step 314). The answer or response is chosen through a player interacting with a gamepad controller, on a tablet by clicking on an individual, or by positional head tracking. The player decision is monitored, resulting in either a correct answer (step 316) or an incorrect answer (step 318). The incorrect answer results from the player selecting players other than the player selected by the coach or play creator. The score is calculated by dividing the correct answers by the total number of questions asked (step 320).

Figure 4:
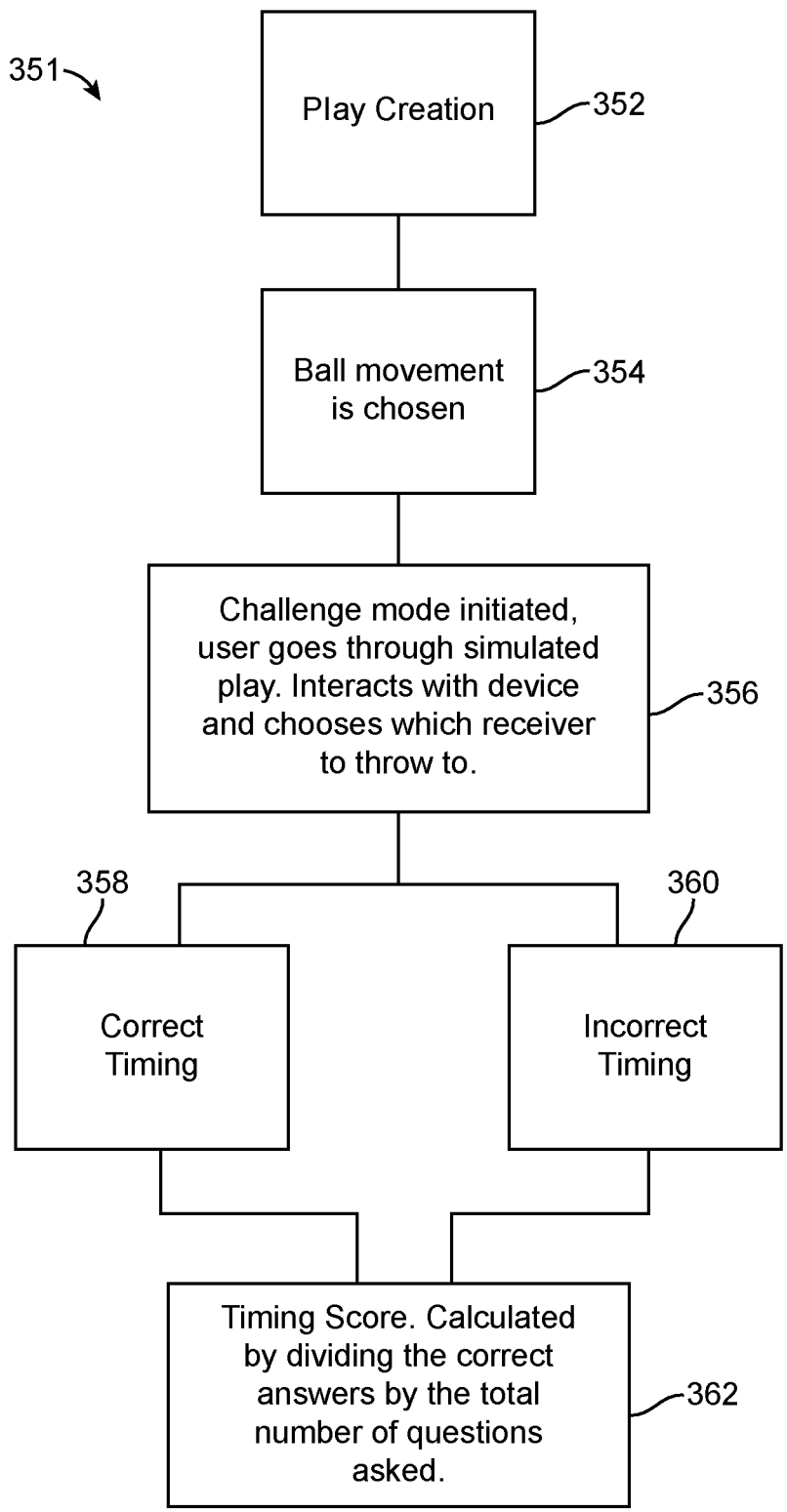
FIG. 4 is an exemplary flowchart illustrating the timing scoring for a football quarterback.

FIG. 4 is an exemplary flowchart illustrating a method 351 for determining the timing scoring for a football quarterback. A coach or another person creates a play (step 352), where, in this example, the ball movement is chosen (step 354). The coach determines the time that the ball is chosen to move from the quarterback to the wide receiver that will be deemed as the correct timing in the challenge mode. A play commences in a virtual reality environment, and the challenge mode is initiated as the player goes through a simulated play where the player interacts with a device and chooses the player to whom the quarterback will throw the ball (step 356). The player timing is monitored, resulting in either a correct timing (step 358) or an incorrect timing (step 360). The timing is determined from the time of the snap of the football to the point in time that the quarterback throws the ball to the wide receiver. The incorrect timing is a time of release of the football that is inconsistent with the timing established by the coach. The time score is calculated by dividing the correct answers by the total number of questions (step 362).

Figure 5:
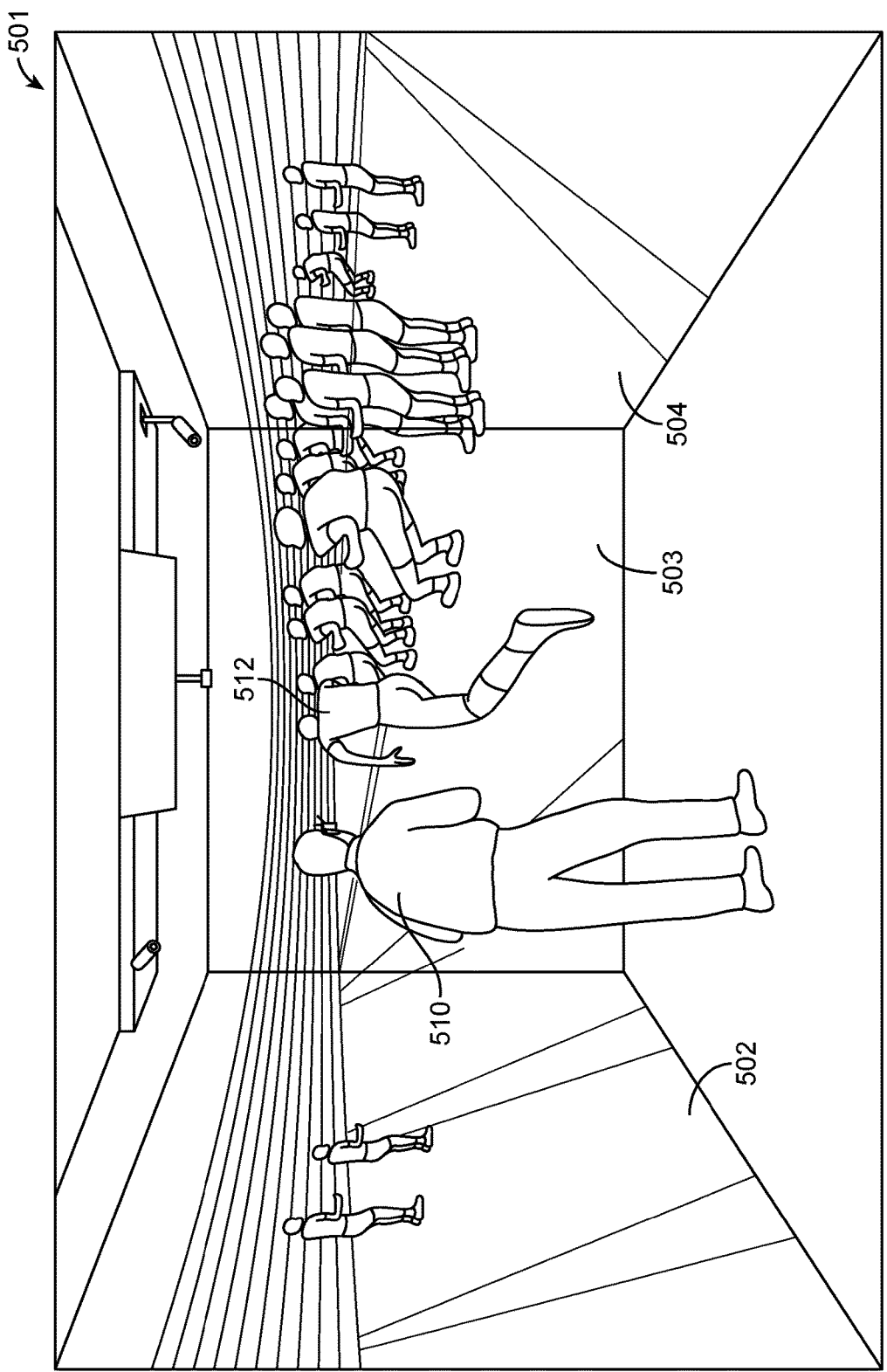
FIG. 5 is a front, perspective view of a user in an immersive virtual reality environment.

FIG. 5 is a front, perspective view of a user 510 in an immersive virtual reality environment 501 which may be referred to as a CAVE. A user 510 typically stands in a cube-shaped room in which video images are projected onto walls 502, 503, and 504. The real player 510 is watching the virtual player 512 running across a virtual football field. In an embodiment, the player 510 will be acting in the role of a quarterback. Players in the CAVE can see virtual players in a virtual football field, and can move around them to get a view of the virtual player from a different perspective. Sensors in the virtual reality environment track markers attached to the user to determine the user's movements.

Figure 6:
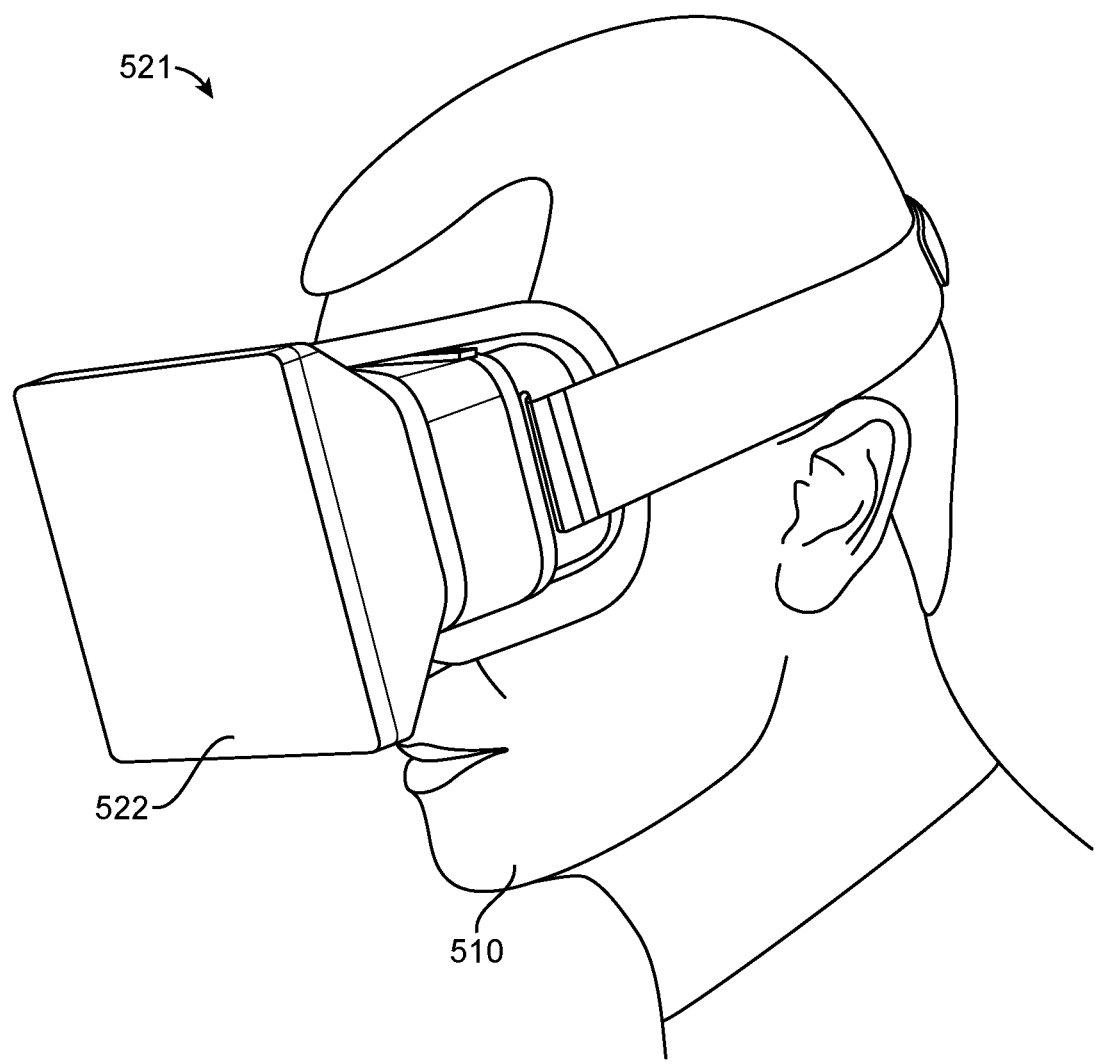
FIG. 6 is a side, perspective view of a user wearing a virtual reality head-mounted display showing a virtual reality environment.

FIG. 6 is a side, perspective view 521 of a user wearing a virtual reality head-mounted display 522 showing a virtual reality environment. The head-mounted display 522 has a display positioned inches away from the eyes of the user. Employing motion and orientation sensors, the head-mounted display 522 monitors the movements of the user 510. These movements are fed back to a computer controller generating the virtual images in the display 522. The virtual reality images react to the user's 510 motions so that the user perceives himself to be part of the virtual reality experience. In one or more embodiments, a smartphone or mobile device may be employed.

Figure 7:
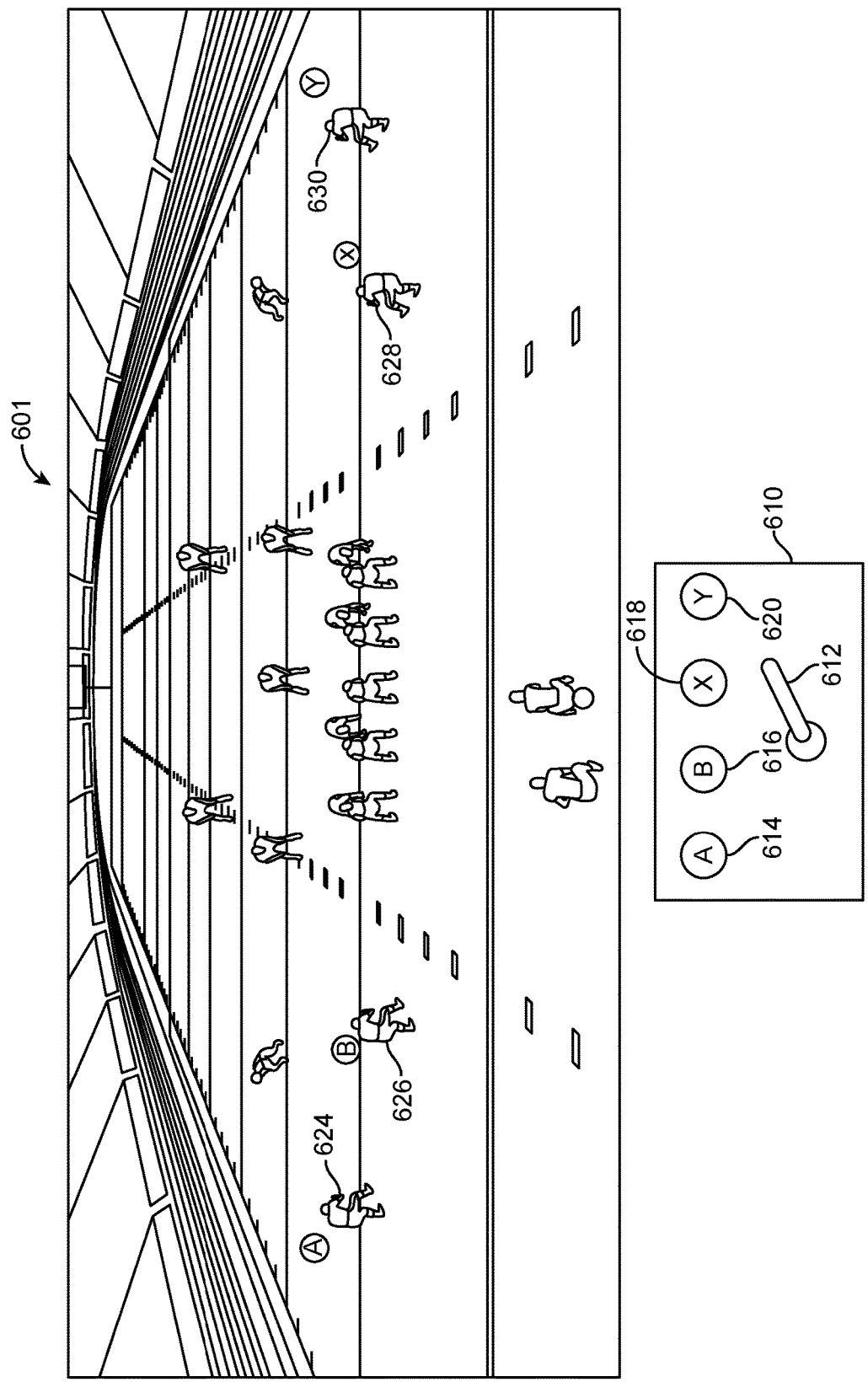
FIG. 7 is a front, perspective view of a simulated environment of a football game and a handheld game controller for the user to interact with the game.

FIGS. 7-11 depict a sequence of virtual reality images for testing and training a quarterback to select a teammate in best position to receive the ball. Several screen shots depict a player interacting with a virtual reality environment where the player responds to a specific play by, for example, receiving a football, responding to the defensive players, deciding one or more actions, and completing the play. FIG. 7 is a front, perspective view of a simulated environment 601 of a virtual football game and a handheld controller 610 for the user to interact with the simulated football game 601. The hand held controller 610 has a joystick 612 and four buttons 614 (labeled as "A"), 616 ("B"), 618 ("X"), and 620 ("Y"). The simulated football game image shows both the offensive and defensive teams. Player 624 is labeled as "A", player 626 as "B", player 628 as "X", and player 630 as "Y."

A user, acting as a quarterback, will see the simulated players move across the field, and will be required to decide when to throw a football and to select which of the simulated players 624, 626, 628, and 630 will be selected for receiving the ball in an embodiment. A user may select player 624 by pressing the button 614 ("A"), player 626 by pressing the button 616 ("B"), player 628 by pressing button 618 ("X"), and player 630 by pressing button 620 ("Y"). In one or more embodiments, real time decisions are made by the user by pressing buttons on a controller which correspond to the same icon above the head of the player.

Figure 8:
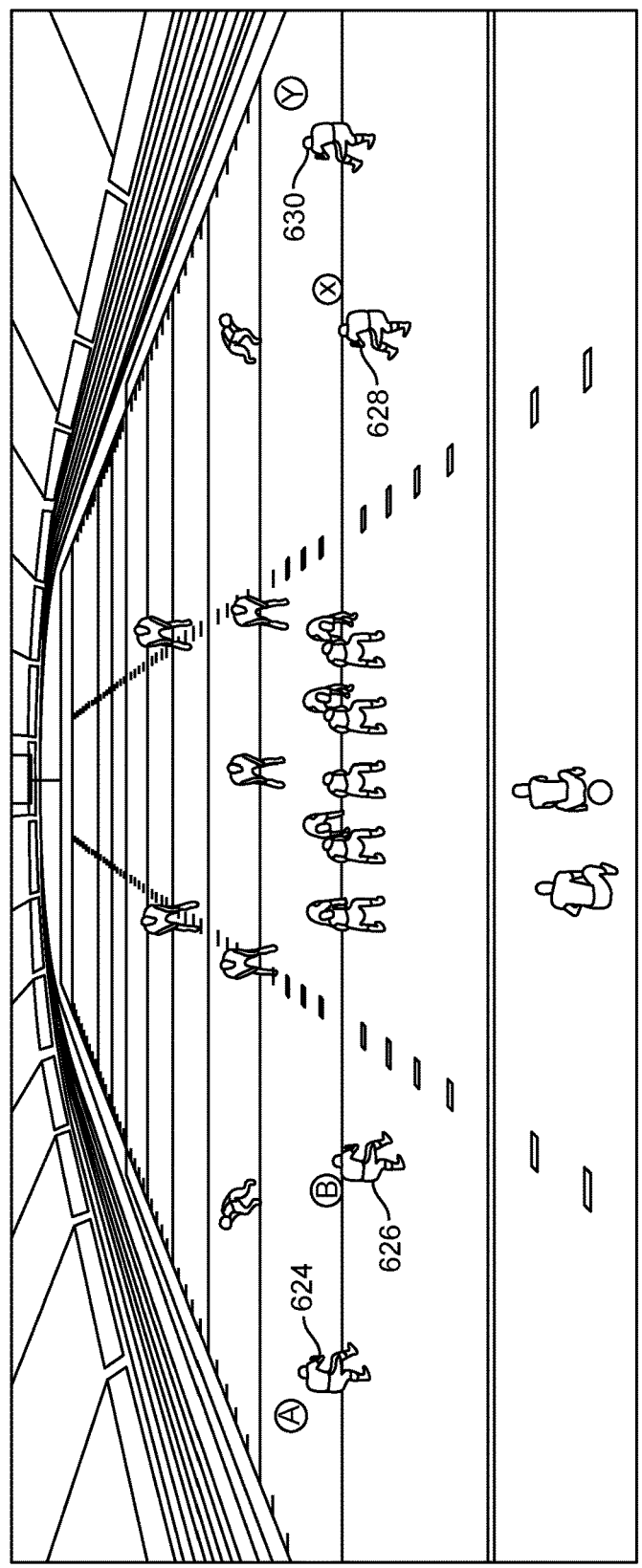
FIG. 8 is a front, perspective view of the simulated environment of a football game just before the initiation of a play.
Figure 9:
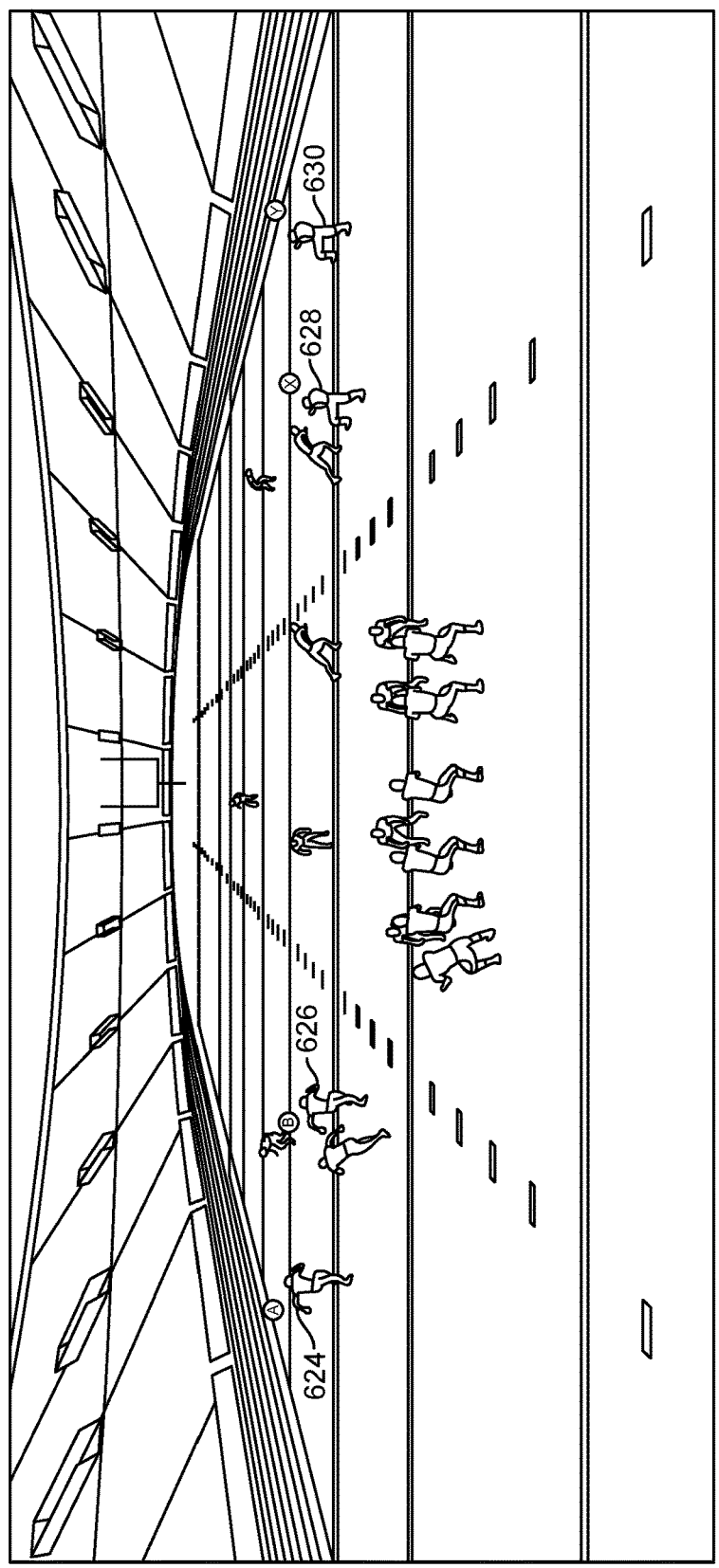
FIG. 9 is a front, perspective view of the simulated environment of a football game immediately after the initiation of a play.
Figure 10:
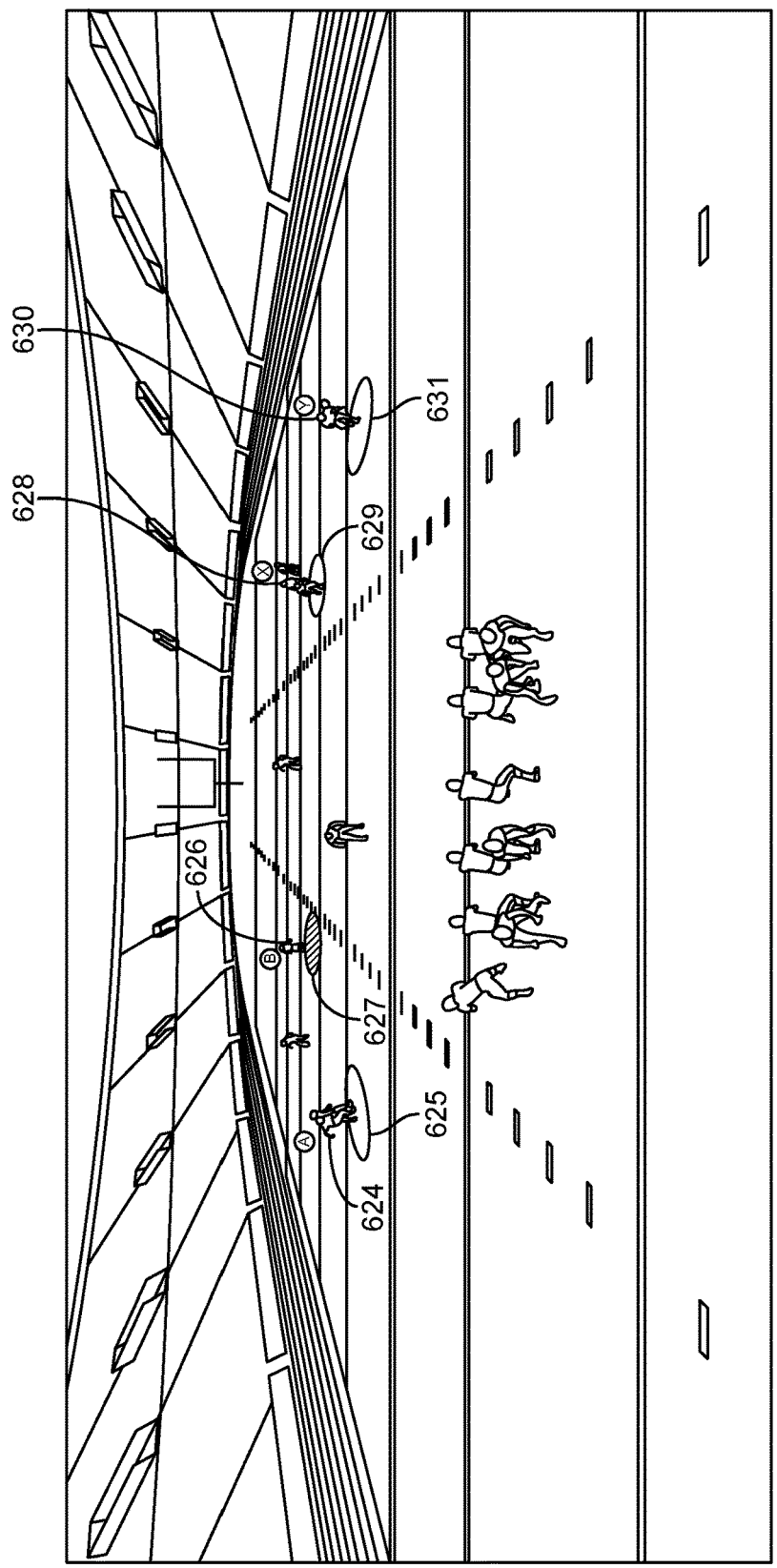
FIG. 10 is a front, perspective view of the simulated environment of a football game showing the correct decision.

FIG. 8 shows the positions of the players just before the initiation of a play. In FIG. 9, a play is initiated and in real-time, the user must choose which player to whom he will throw the football. In FIG. 10, the user selects which player will be selected to receive the football. In one or more embodiments, virtual ovals 625, 627, 629, and 631 encircle the players 624, 626, 628, and 630. In this example, oval 627 is cross hatched or has a color different from that of the ovals to indicate to the user that player 626 was the correct choice. If the user does not decide correctly, the user can redo the play until he makes the correct choice. The score is based on how quickly decisions are made, and the number of correct decisions compared to total testing events.

Figure 11:
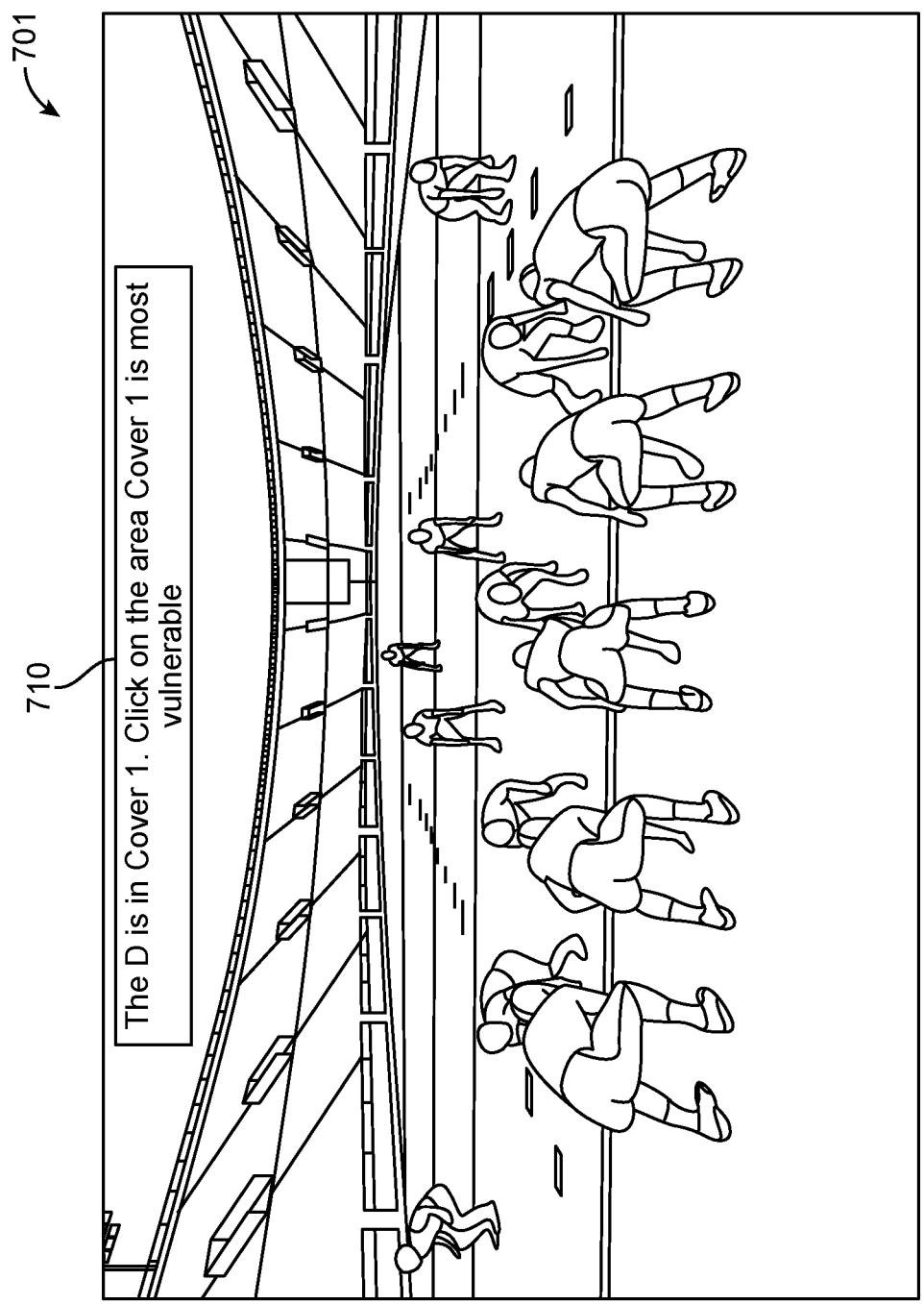
FIG. 11 is a front, perspective view of a simulated environment of a football game showing a multiple choice question presented to the user.
Figure 12:
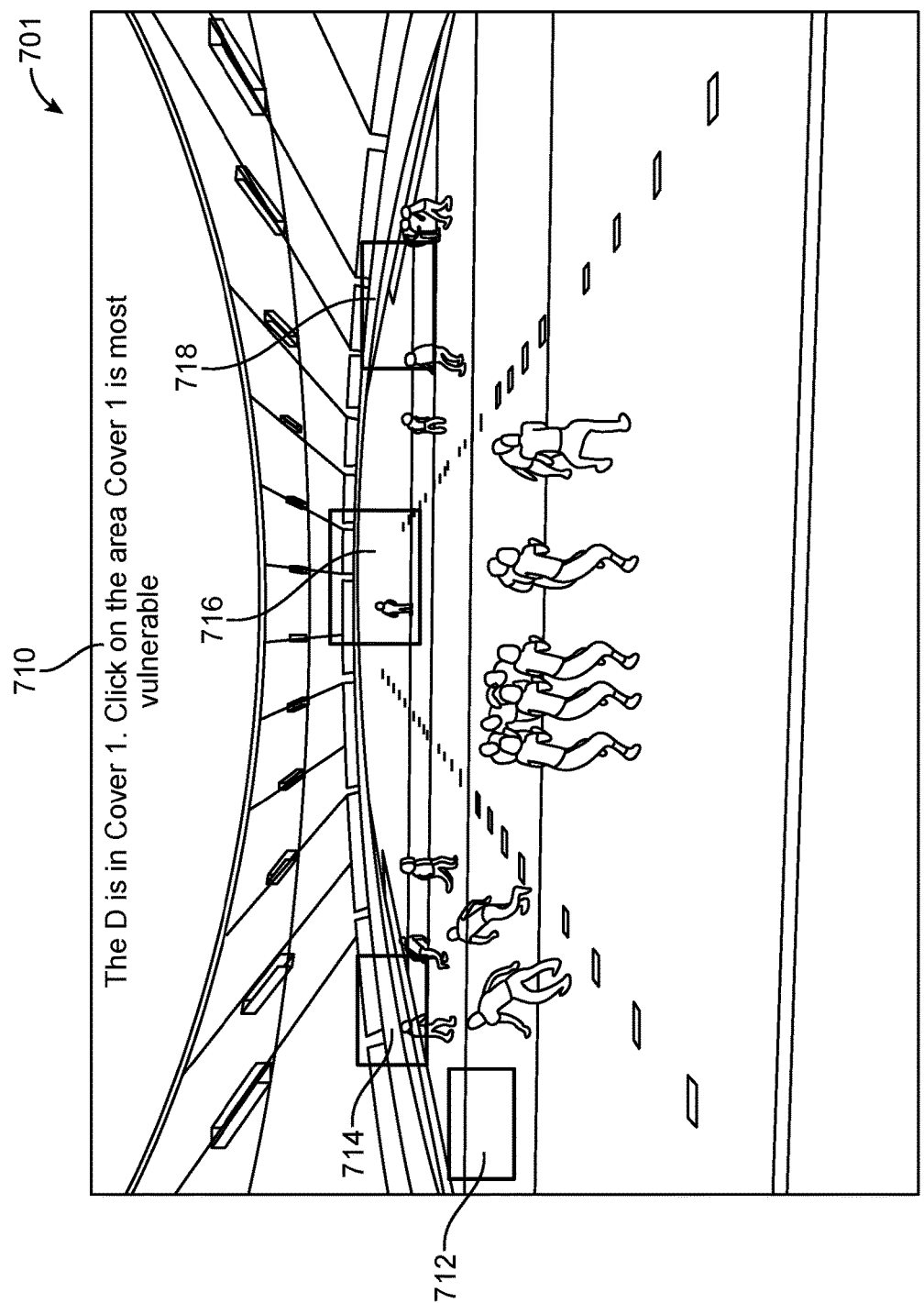
FIG. 12 is a front, perspective view of a simulated environment of a football game showing the possible areas from which the user may select.

FIGS. 11 and 12 illustrate that the simulated environment 701 can be configured to challenge users with multiple choice questions. FIG. 11 shows a quarterback's perspective of a simulated football game before a play is initiated. The virtual reality environment shows a pop up window 710 presenting a question posed to the user. In this example, the virtual reality environment is asking the user to identify the areas of vulnerability of a coverage shell. In FIG. 12, the play is initiated and the user is presented with four areas 712, 714, 716, and 718 representing possible choices for the answer to the question posed. In one or more embodiments, the user may select the area by interacting with a hand held controller, or by making gestures or other motions.

Figure 13:
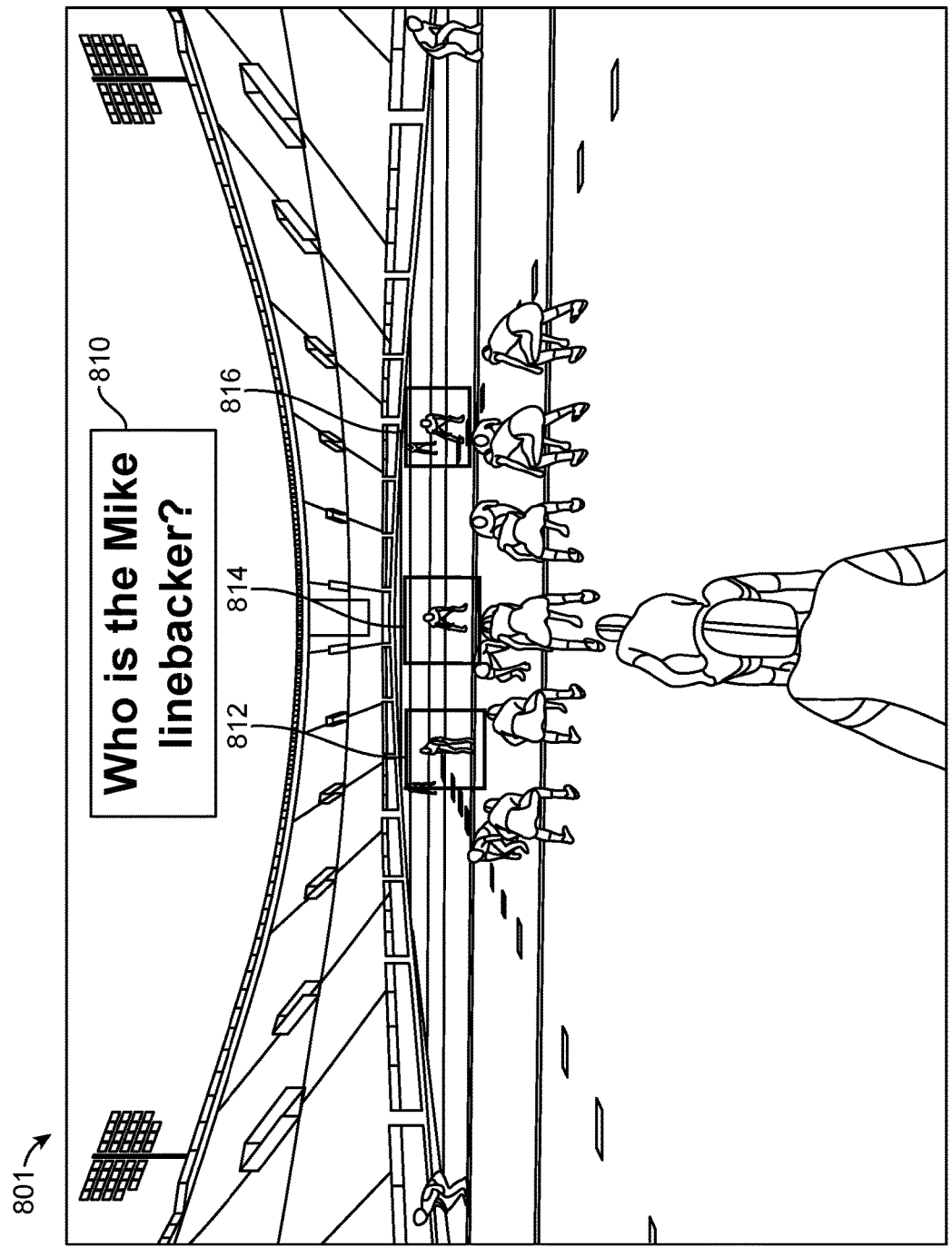
FIG. 13 is a front, perspective view of a simulated environment of a football game showing the possible areas from which the user may select in an embodiment.

FIG. 13 is a front, perspective view of a simulated environment 801 of a virtual football game showing the possible areas from which the user may select in an alternative embodiment. The user is presented with a view before the initiation of a play, and a pop-up window 810 appears and asks the user to identify the Mike linebacker (i.e., the middle or inside linebacker who may have specific duties to perform). Three frames 812, 814, and 816 appear around three players and the user is given the opportunity to choose the player he believes to be the correct player.

Figure 14:
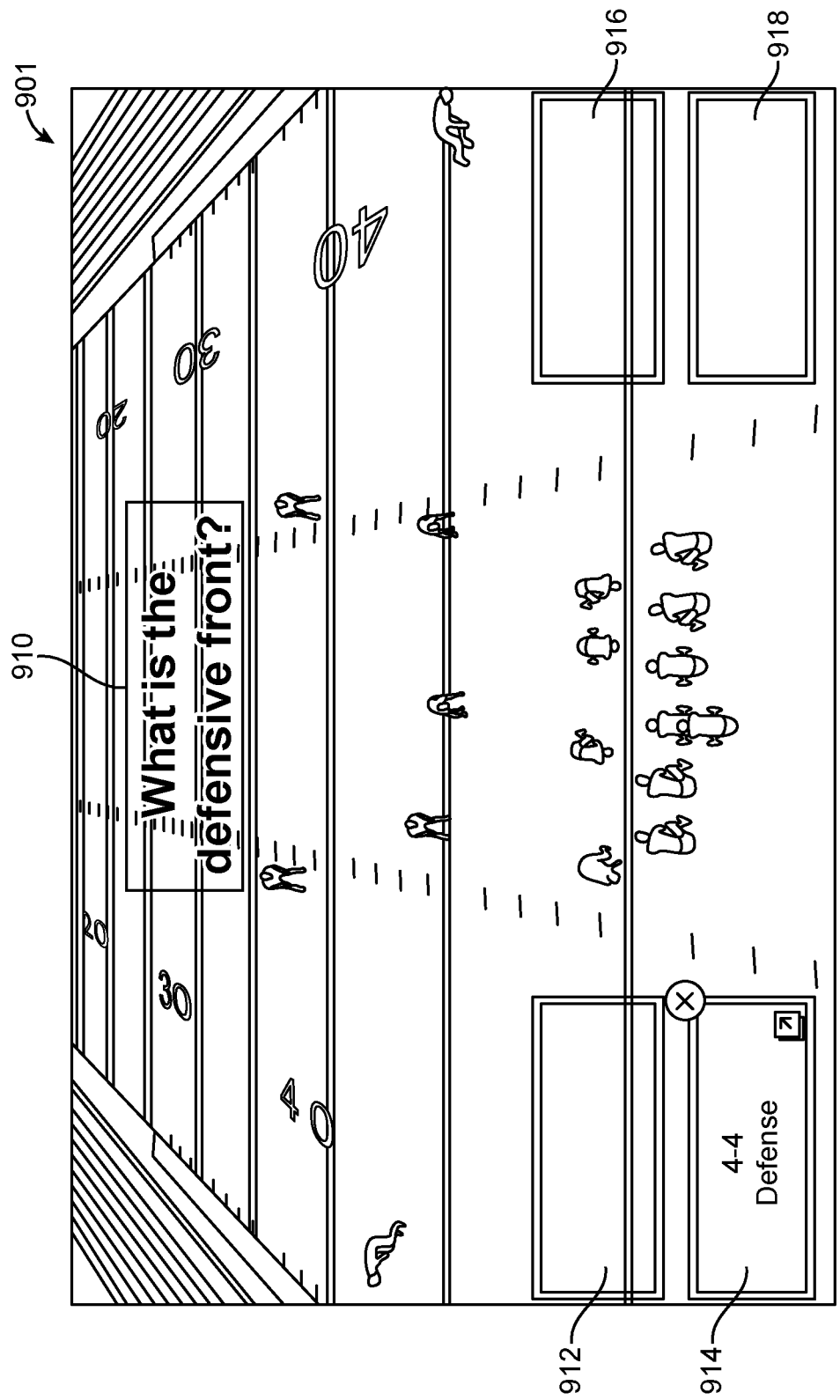
FIG. 14 is a front, perspective view of a simulated environment of a football game showing the possible areas from which the user may select in an embodiment.
Figure 15:
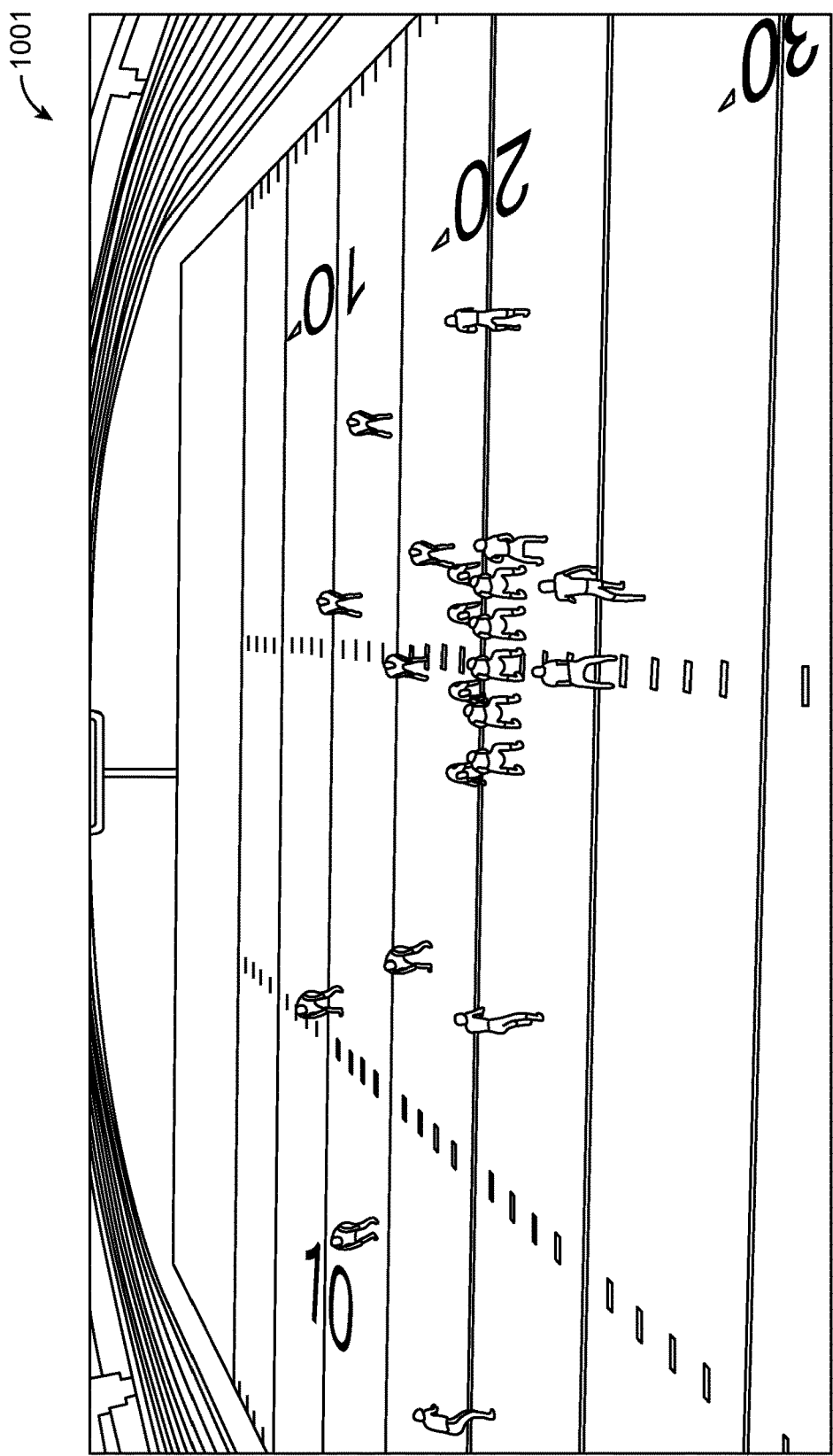
FIG. 15 is a front, perspective view of a simulated environment of a football game where the user is asked to read the defense.

FIG. 14 is a front, perspective view of a simulated environment of a football game in an embodiment. The user is presented with a view before the initiation of a play, and a pop-up window 910 appears and asks the user to identify the defensive front. Four frames 912, 914, 916, and 918 have possible answers to the question posed. The user is given the opportunity to choose the answer he believes is correct. In one or more embodiments, the user may choose the correct answer through interacting with a game controller, or by making gestures or other movements.

One or more embodiments train users to read a defense. For Man and Zone Reads such as picking up Man and Cover 2 defense, embodiments may have 20 play packages such as combo, under, curl, and so forth. Embodiments enable users to practice reading Man vs. Zone defenses. Users may recognize each defense against the formation, such as against a cover 2, and may highlight areas of the field that are exposed because the defense is a cover 2 against that specific play. Players and areas may be highlighted. In one or more embodiments, a training package may consist of 20 plays each against Man and Cover 2 and highlighted teaching point.

Figure 16:
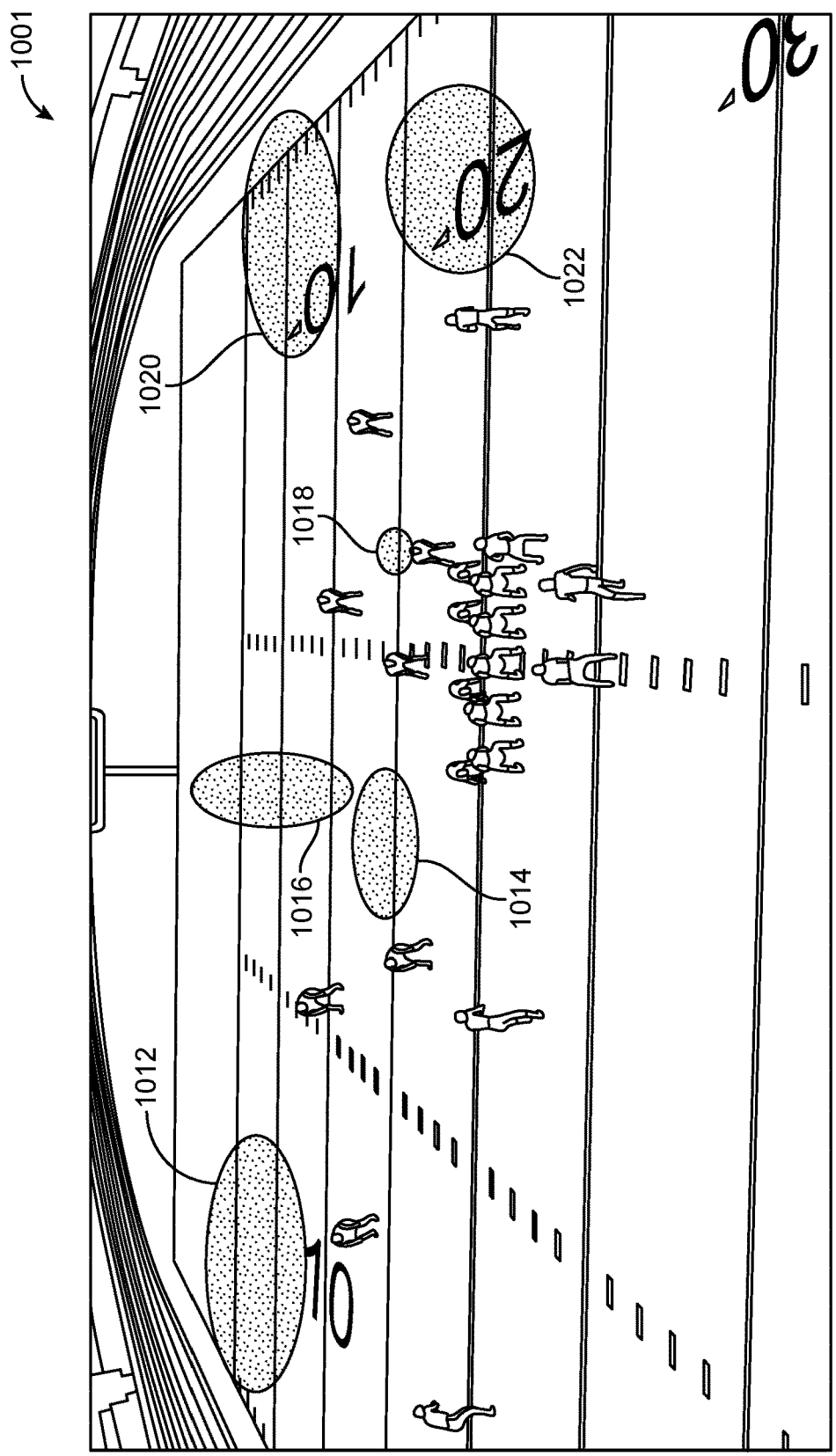
FIG. 16 is a front, perspective view of the simulated environment of a football game showing possible areas of weakness from which a user may select.
Figure 17:
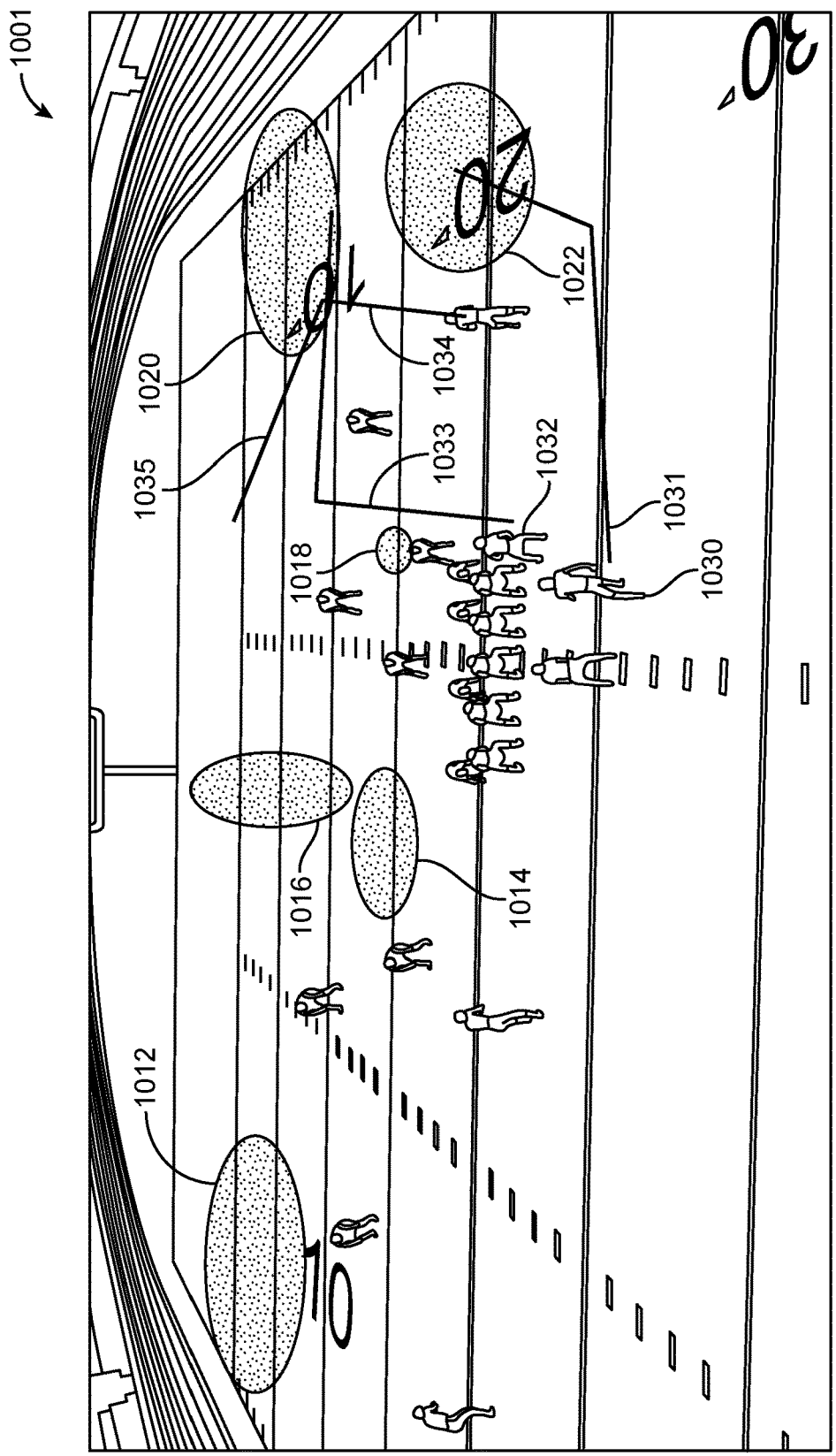
FIG. 17 is a front, perspective view of the simulated environment of a football game showing offensive player running patterns.

FIGS. 15-18 are front, perspective views of a simulated environment 901 of a football game where the user is asked to read the defense. As a first step, the user is asked to identify the defensive coverage, which is cover 2 in this example. In FIG. 16, the user is asked to identify areas of weakness or exposure against the play, represented as areas 1012, 1014, 1016, 1018, 1020, and 1022. In FIG. 17, the user is asked to create a mismatch against a zone and expose the areas.

Figure 18:
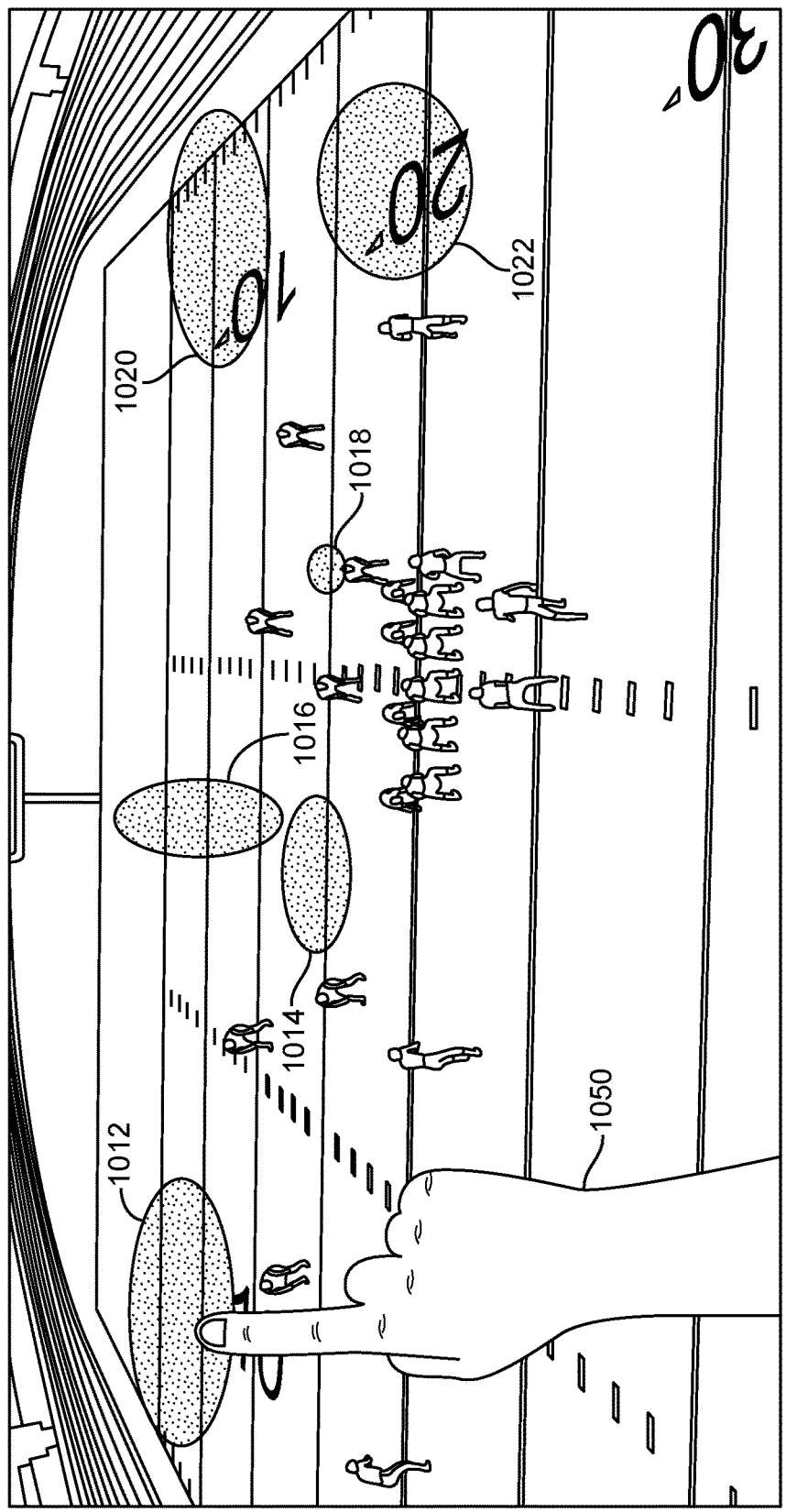
FIG. 18 is a front, perspective view of a user selecting the area of weakness in an embodiment.

The play is represented by players 1030, 1032, and 1034 traversing the field as depicted in running patterns 1031, 1033, and 1035. In FIG. 18, the user may use his hand 1050 to assess and identify the areas of the field that have "weak points" against that coverage.

Figure 19:
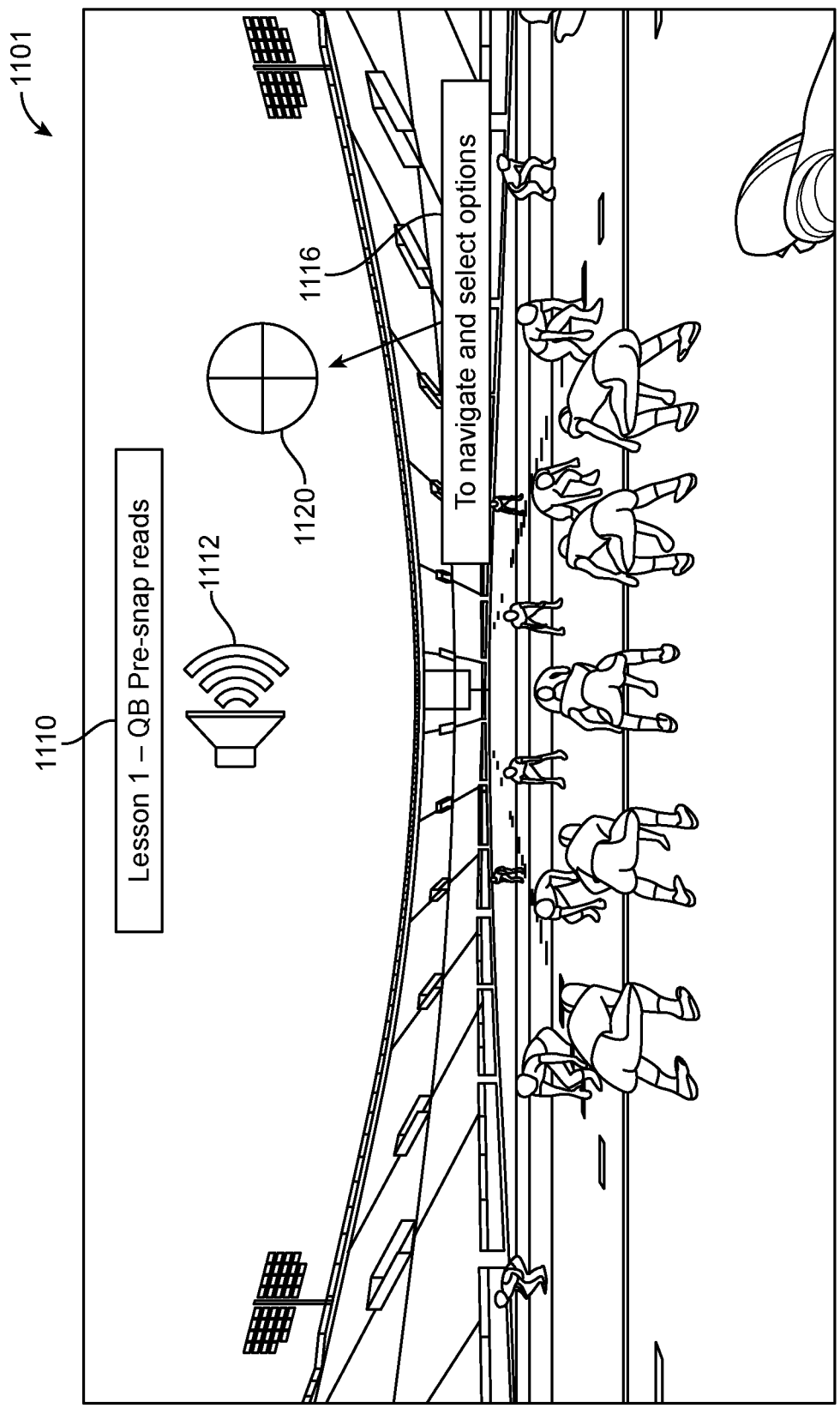
FIG. 19 is a front, perspective view of a user interacting with a virtual reality environment via a virtual pointer.

FIGS. 19-23 are front, perspective views of a user interacting with a virtual reality environment 1101. In one or more embodiments, the user may be wearing a head mounted display as depicted in FIG. 6, or may be wearing glasses having markers in an immersive virtual reality environment as depicted in FIG. 5. As shown in FIG. 19, the user sees an environment 1101 having a window 1110 describing the current lesson, an icon 1112 for activating audio instructions, and a window 1116 describing a virtual pointer 1120 represented here as a virtual crosshairs. In one or more embodiments, the virtual pointer may be fixed with respect to the display of the device. A user may interact with the virtual reality environment by aiming the virtual pointer toward a virtual object. The virtual pointer provides a live, real time ability to interact with a three-dimensional virtual reality environment.

Figure 20:
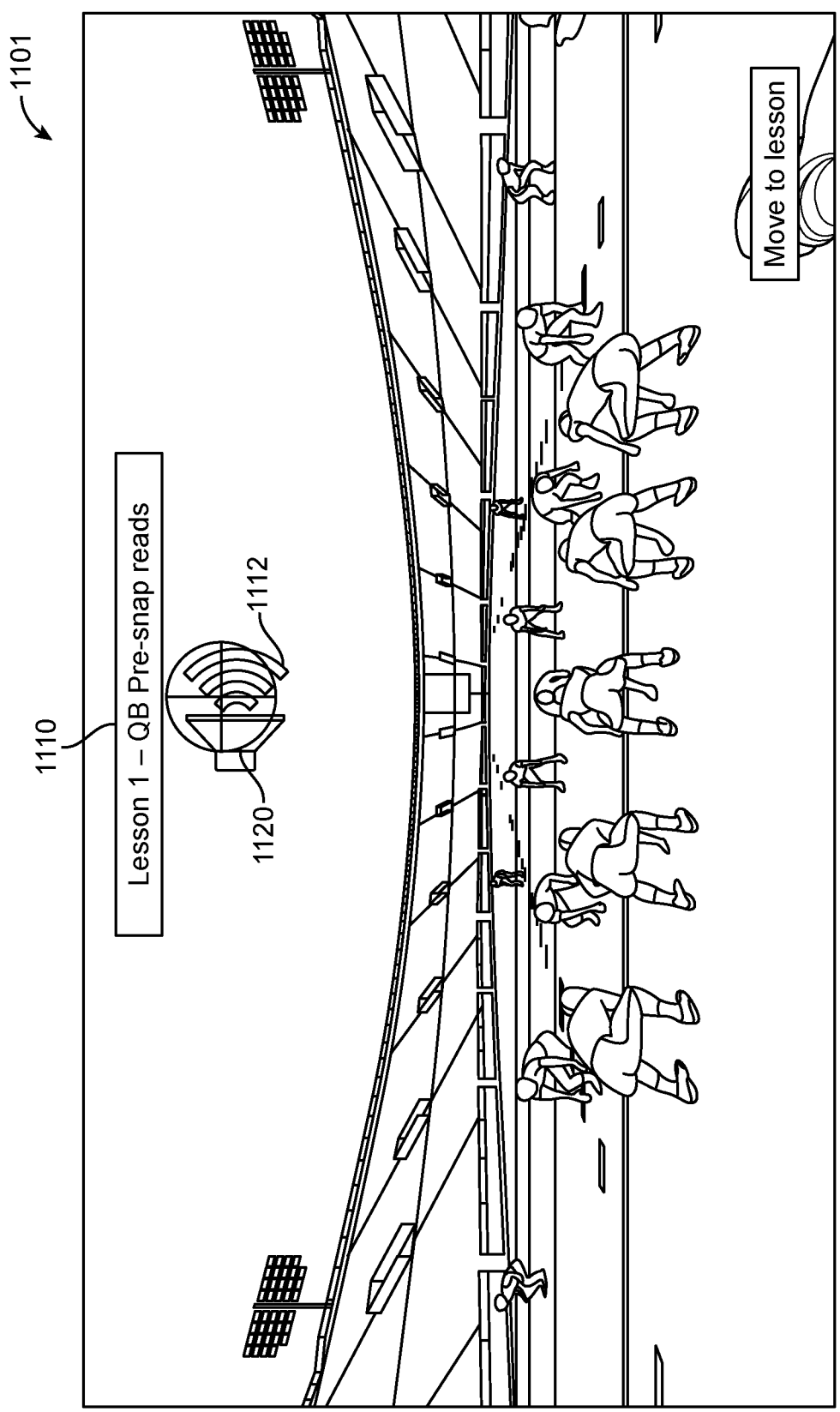
FIG. 20 is a front, perspective view of a user selecting an audio recording in an embodiment.
Figure 21:
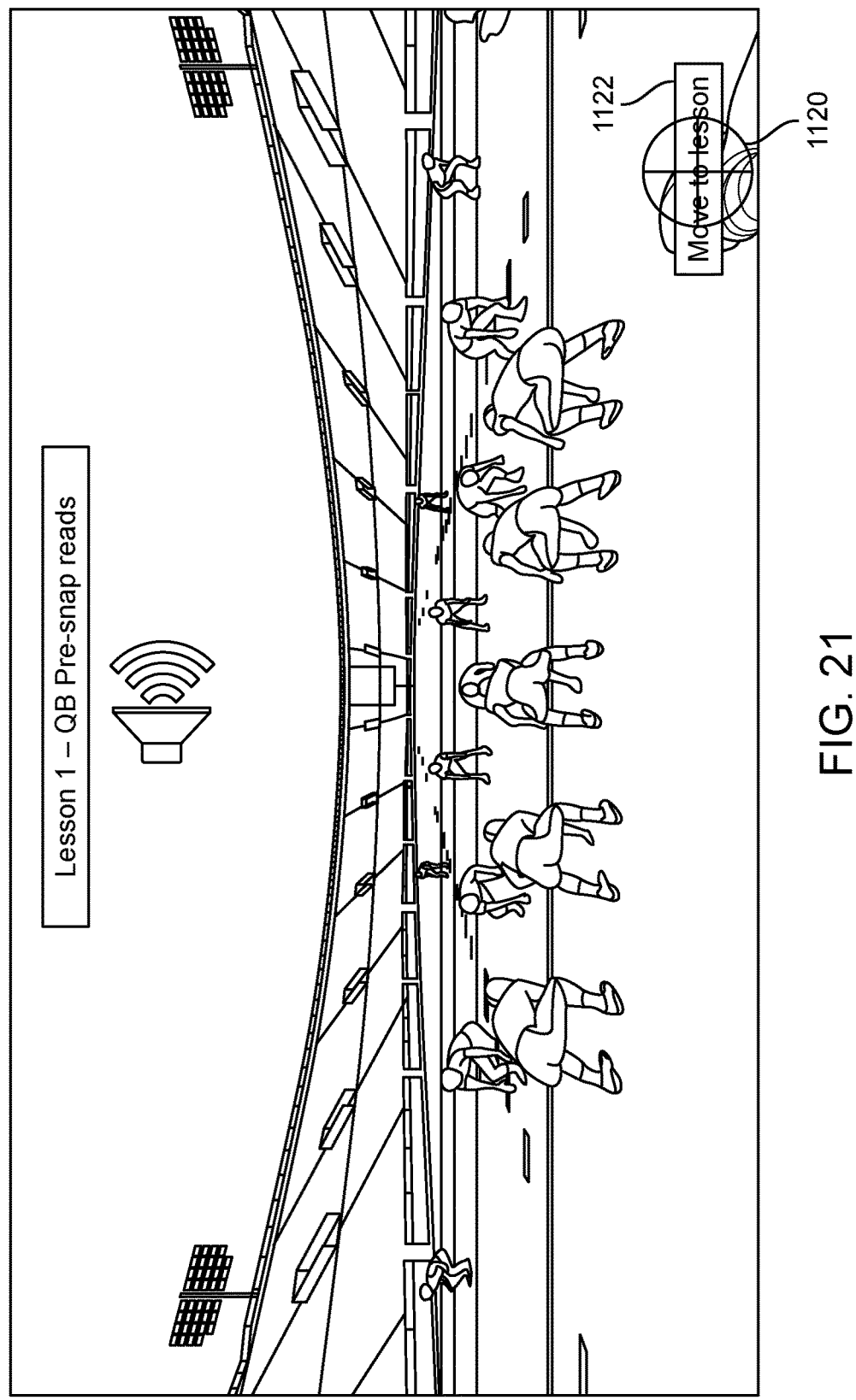
FIG. 21 is a front, perspective view of a user selecting a lesson with the virtual pointer.

In one or more embodiments, the virtual pointer 1120 moves across the virtual reality environment 1101 as the user moves his head. As depicted in FIG. 20, the user moves the virtual pointer 1120 over the icon 1112 to activate audio instructions for the lesson. The user may then use the virtual pointer 1120 to interact with the virtual reality environment 1101 such as by selecting the player that will receive the ball. As shown in FIG. 21, the user may then either replay the audio instructions or move to the drill by sweeping the virtual pointer 1120 over and selecting icon 1122.

Figure 22:
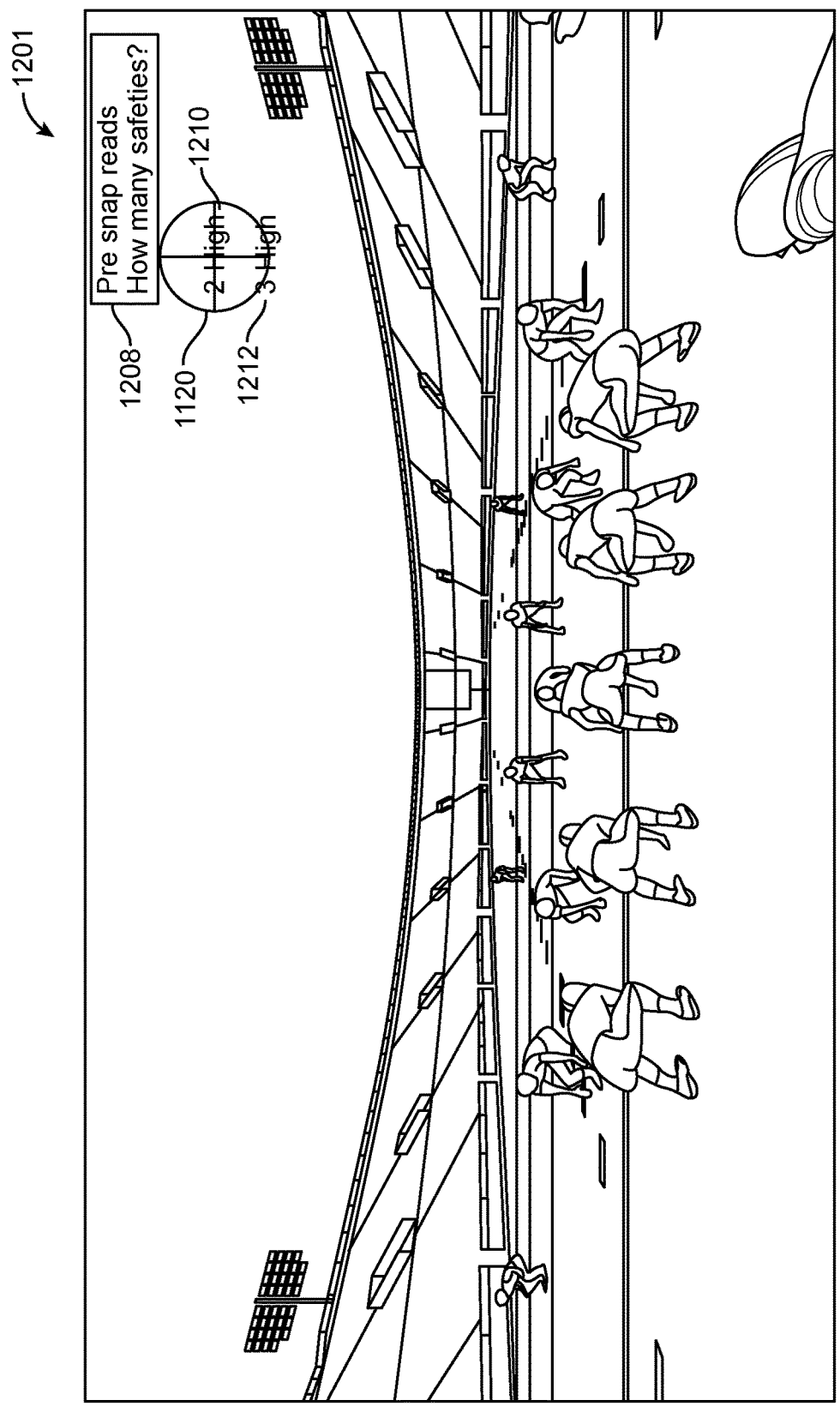
FIG. 22 is a front, perspective view of a user selecting from multiple choices using the virtual pointer.
Figure 23:
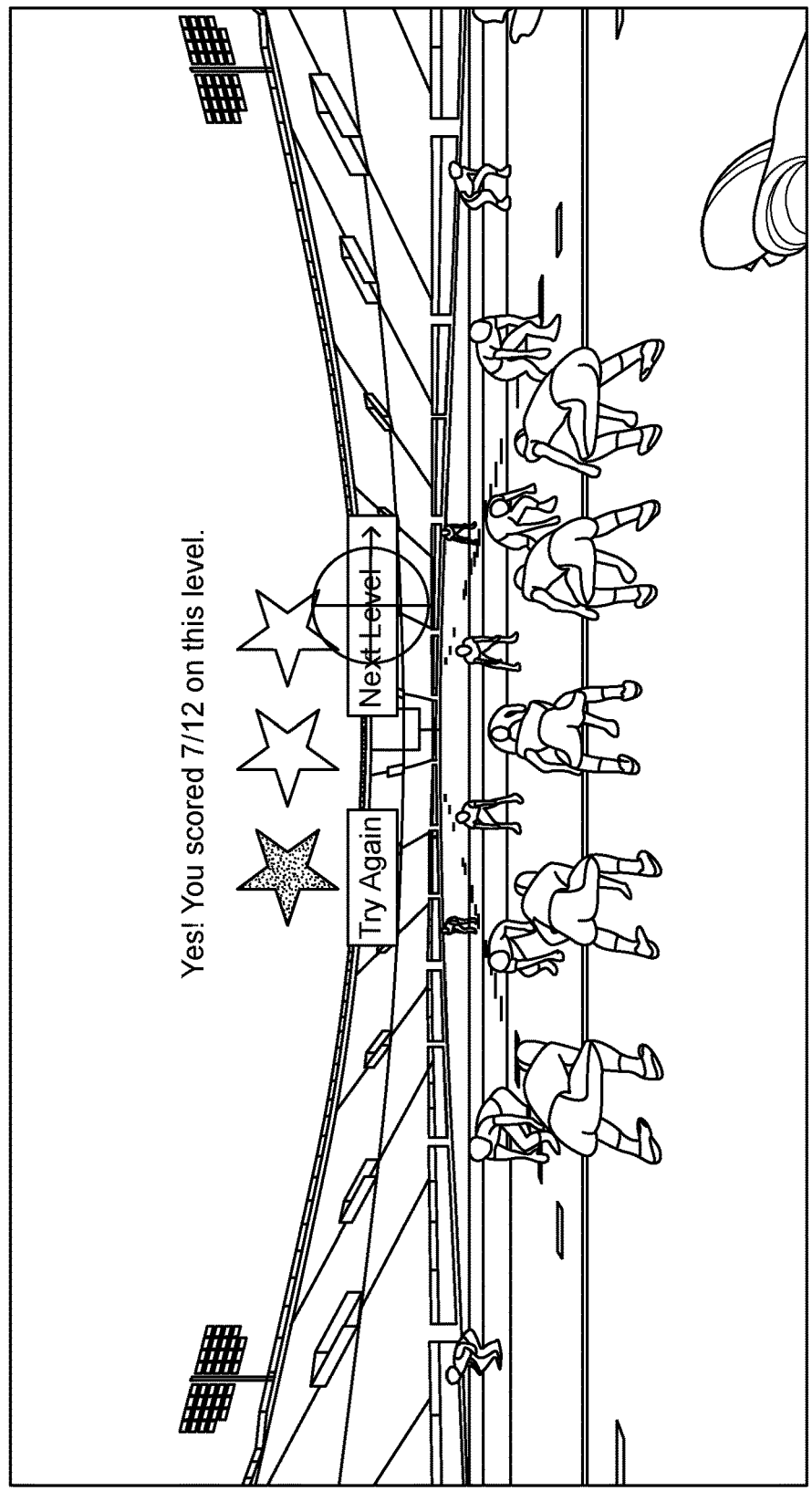
FIG. 23 is a front, perspective view of a user receiving the score of performance in an embodiment.

FIG. 22 is a front, perspective view of a simulated environment 1201 illustrating that the virtual pointer 1120 may enable a user to select answers from a multiple choice test. A window 1208 may pose a question to the user, where the user selects between answers 1210 and 1212. The user moves virtual pointer 1120 over the selected answer in response to the question. In FIG. 23, the virtual reality environment generates a score for the user, and the user is able to attempt the test again or move to the next level.

Figure 24:
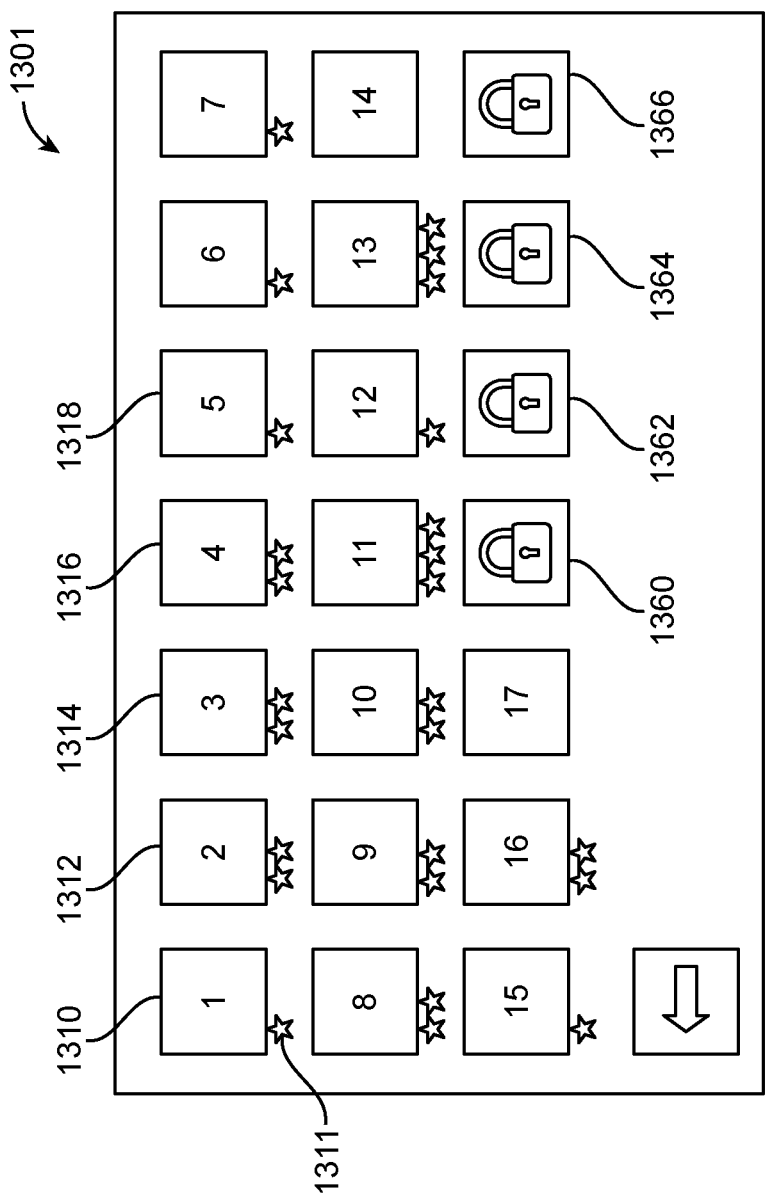
FIG. 24 is a front view of a playlist menu in one or more embodiments.

FIG. 24 is a front view of a menu 1301 in one or more embodiments. In one or more embodiments, the user is presented with a series of plays in a playlist. The user navigates the application ("app") by successfully completing a play which then unlocks the next play in the playlist. For example, icons 1310, 1312, 1314, 1316, 1318 and so forth, represent plays the user has successfully completed. Each of the icons may have a series of stars such as star 1311 which represents the score for that play. The icons 1360, 1362, 1364, and 1366 represent the "locked" plays that later become accessible as the user completes the series of plays.

Figure 25:
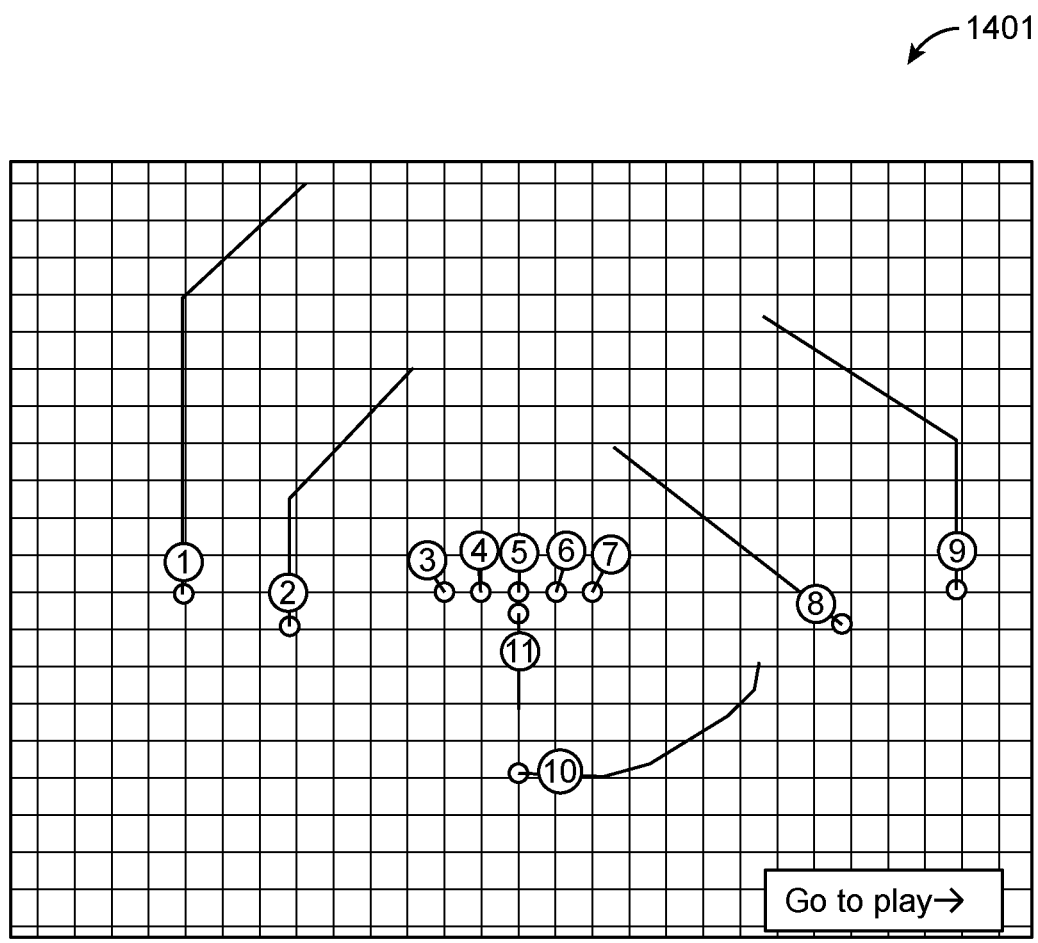
FIG. 25 is a front view of a football field diagram showing details of a play in one or more embodiments.
Figure 26:
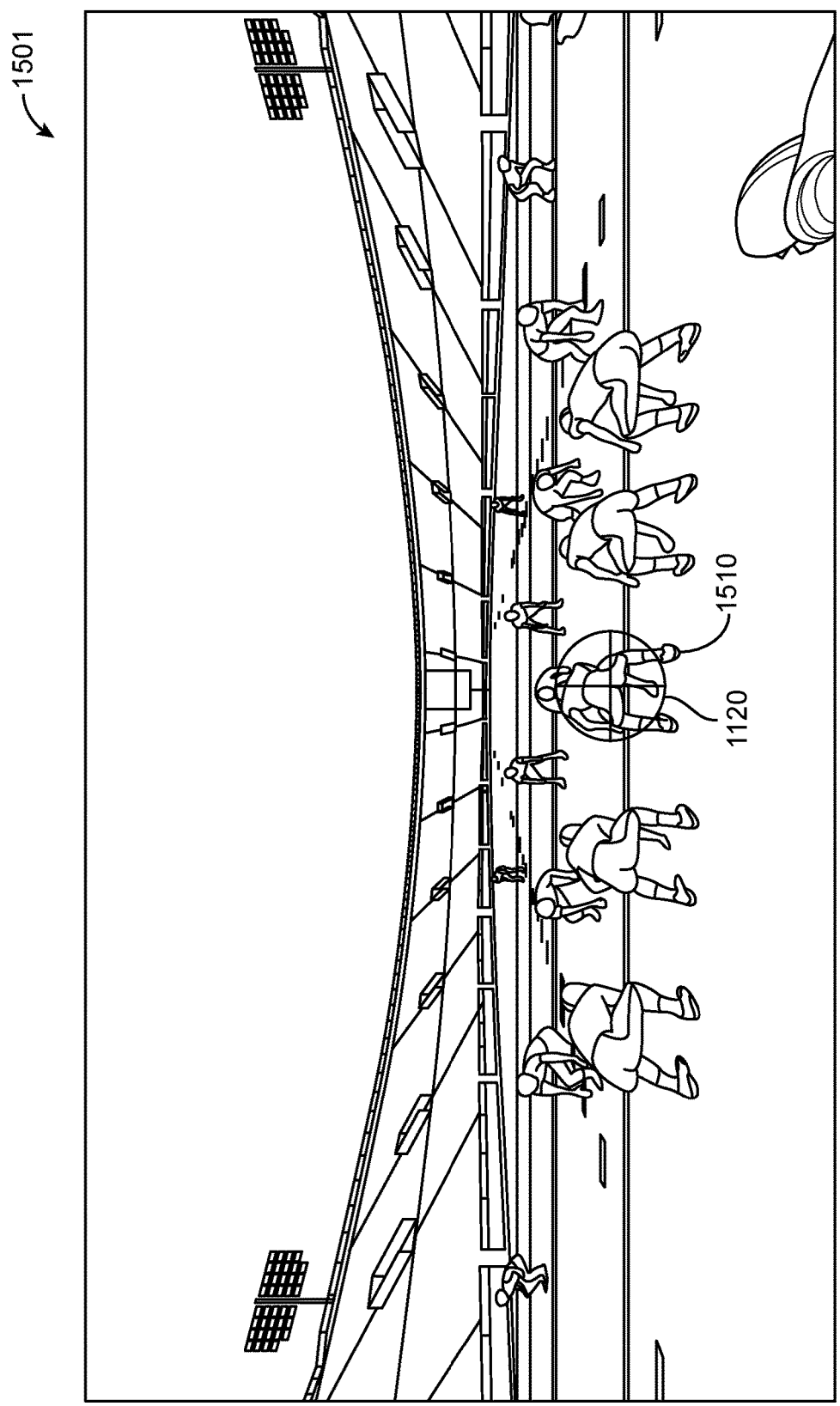
FIG. 26 is a front, perspective view of a simulated environment of a football game immediately before a play is executed.
Figure 27:
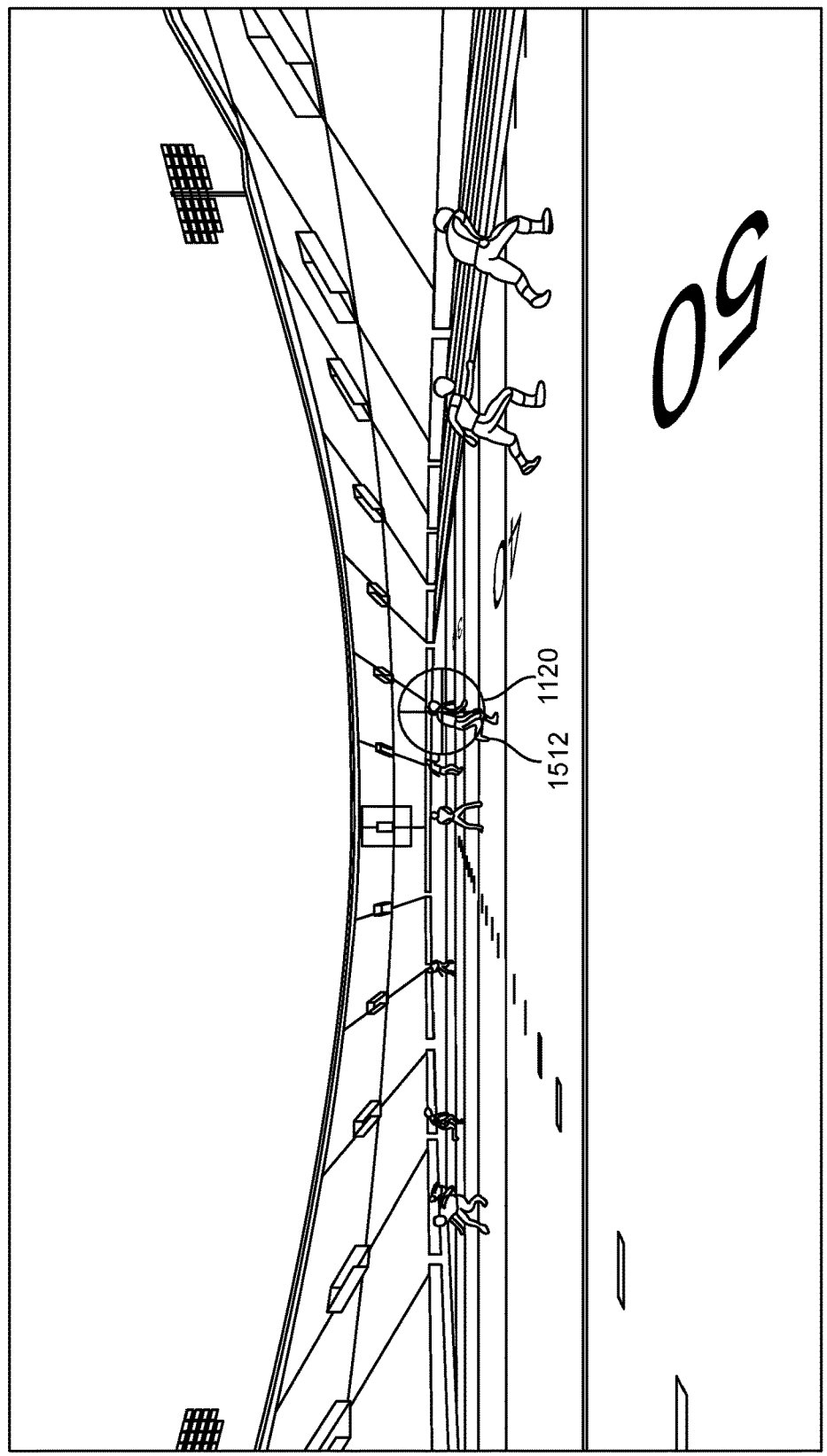
FIG. 27 is a front, perspective view of a user selecting a football player with the virtual pointer in one or more embodiments.
Figure 28:
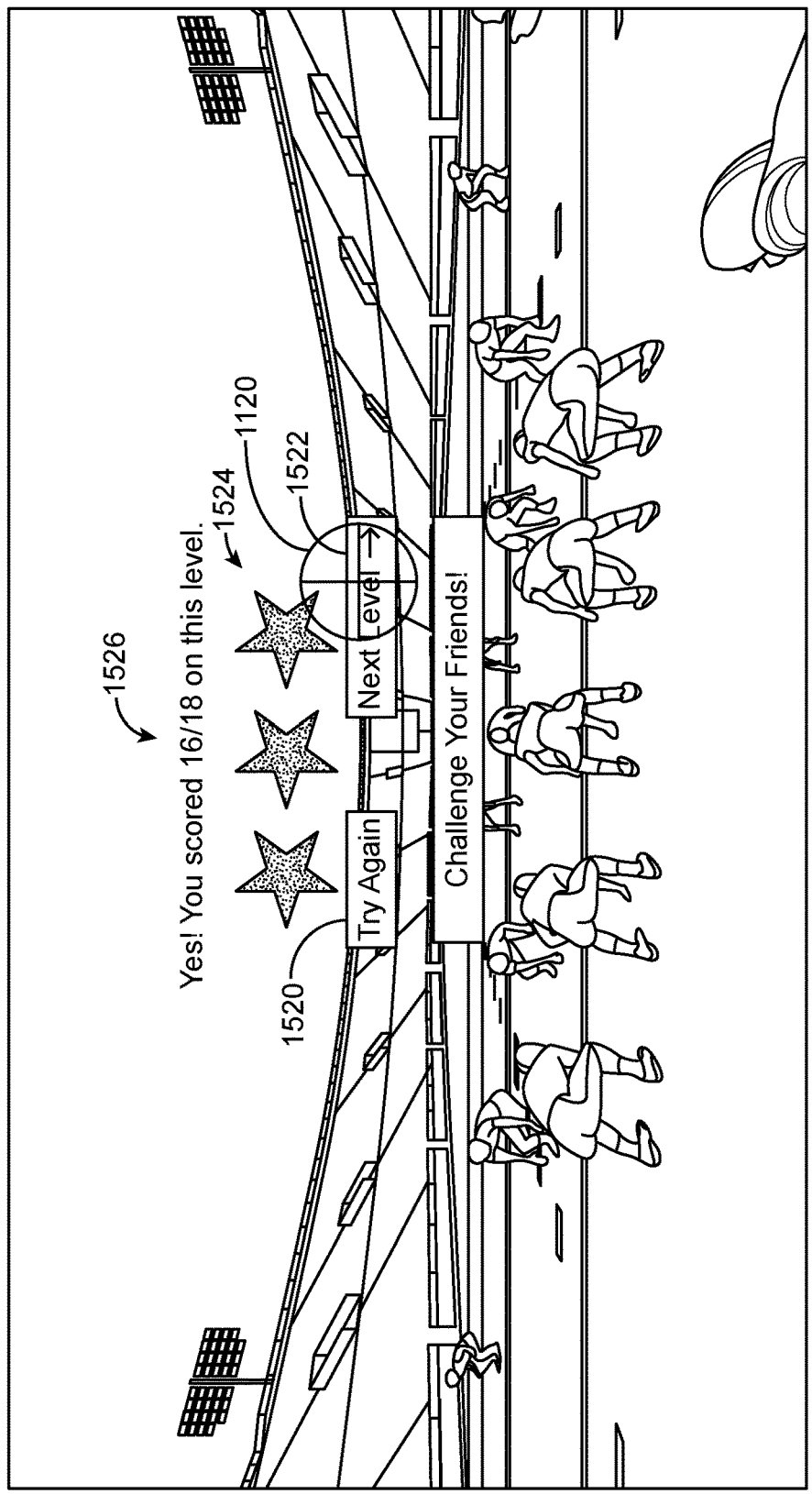
FIG. 28 is a front, perspective view of a user receiving the score of performance in an embodiment.

FIGS. 25-28 illustrate a training lesson in one or more embodiments. FIG. 25 is a diagram 1401 of a pre-snap formation showing details of a basic play concept shown to the user in one or more embodiments. In FIG. 26, the user selects the center 1510 with the virtual pointer 1120 to snap the ball. In FIG. 27, the play is executed and the user decides to which player he will throw the ball. The user selects player 1512 and the user's actions are monitored and scored. In FIG. 28, the user is presented with his score 1526 as well as star icons 1524 indicating performance. The user may choose between icons 1520 and 1522 with the virtual pointer 1120 to select the next action.

Figure 29:
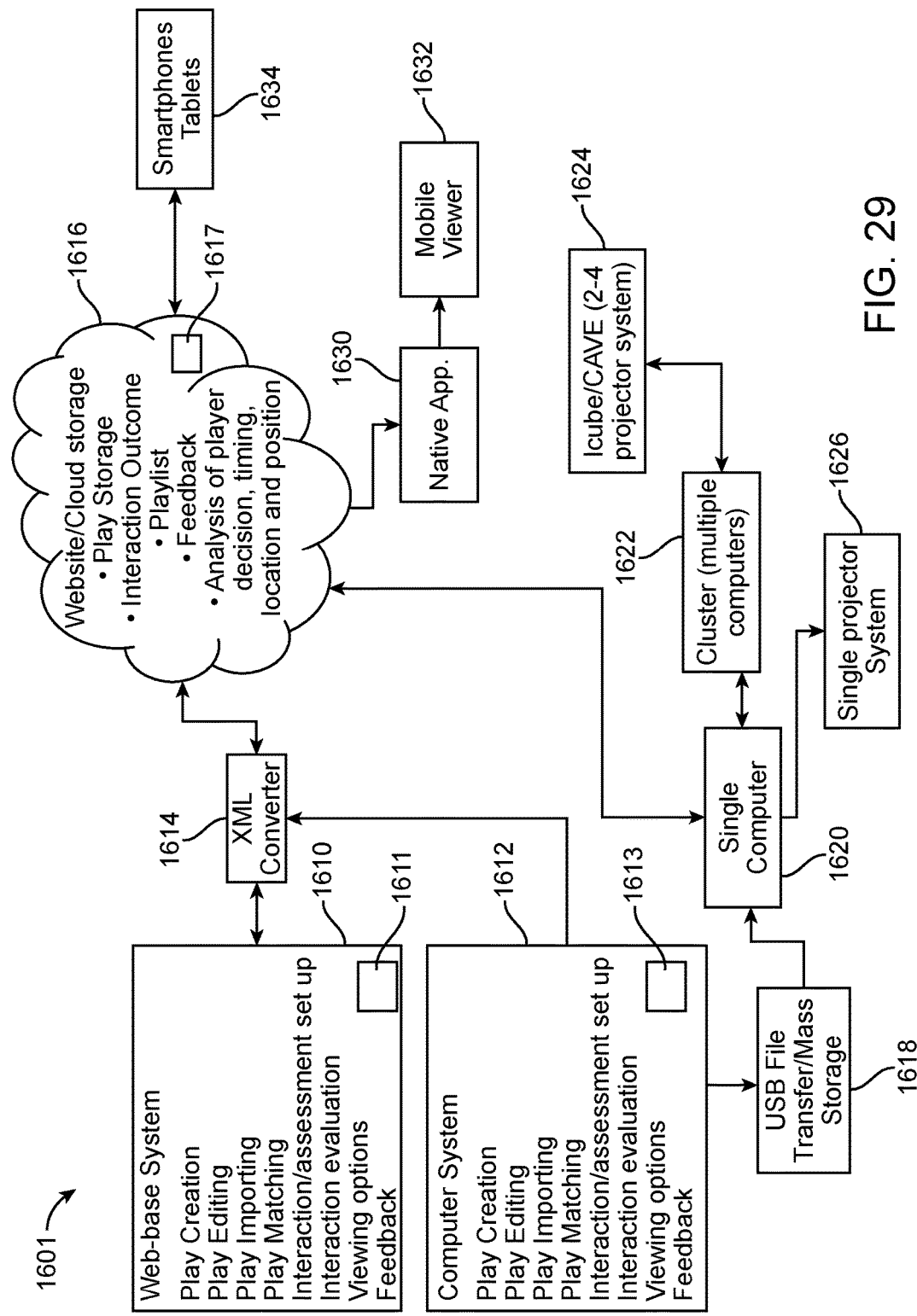
FIG. 29 is a schematic block diagram illustrating the devices for implementing the virtual reality simulated environment of a sporting event.

FIG. 29 is a schematic block diagram illustrating the system 1601 for implementing the virtual reality simulated sporting event. In one or more embodiments, the system 1601 may comprise a web-based system 1610 having a controller or processor 1611, a computer system 1612 having another controller or processor 1613, and website/cloud storage 1616 also having a controller or processor 1617. Both the web-based system 1610 and the computer system 1612 may be employed for creating, editing, importing, and matching plays, as well as for setting up the interaction/assessment, evaluating the interaction, viewing options, and handling feedback. The web-based system 1610 and the computer system 1612 communicate to the website/cloud storage 1616 through an encoding layer such as Extensible Markup Language ("XML") converter 1614. During this process the native software application .play file that is generated is in the XML language. The converter strips away XML tags, leaving just the remaining code without the XML tags. The mobile viewer is designed to read the remaining code and visualize the data from the code so the virtual simulations can run on the smartphone/tablet. The website/cloud storage 1616 may be employed for storing plays, handling interaction outcomes, playlists, feedback, and analysis of player decisions, timing, location, and position. The website/cloud storage 1616 may interface with several types of virtual reality systems including smartphones and tablets 1634, native apps 1630 running on mobile viewers 1632, or other computers 1620. In one or more embodiments, a USB file transfer/mass storage device 1618 receives data from a computer system 1612 and provides the data to the single computer 1620. The single computer 1620 may interface with a single projector system 1626 in one or more embodiments. The single computer 1620 may interface with a cluster of multiple computers 1622, which, in turn, drive an Icube/CAVE projector system 1624.

Figure 30:
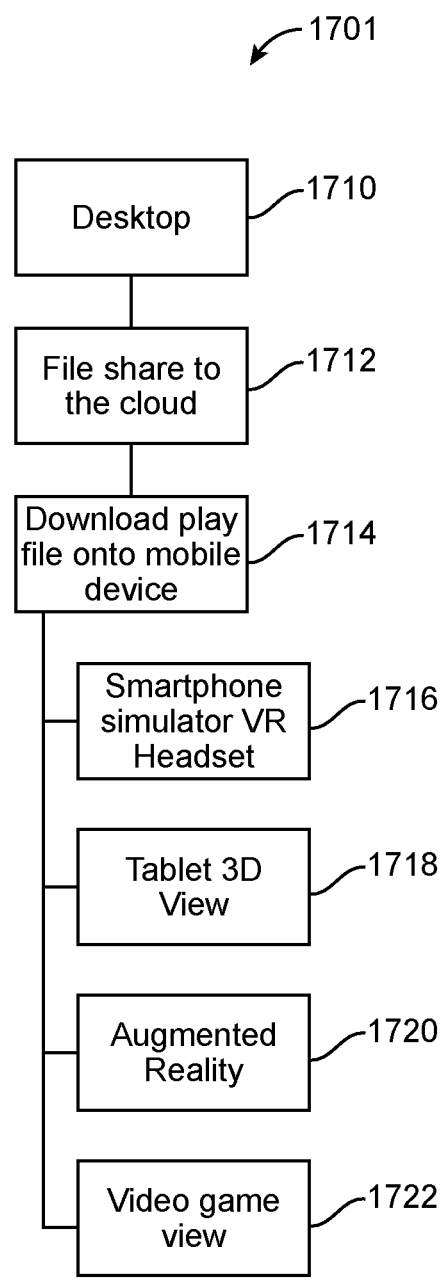
FIG. 30 is an exemplary flowchart showing the process of implementing the virtual reality simulated environment of a sporting event on a smartphone or tablet.

FIG. 30 is an exemplary flowchart showing the method 1701 of implementing the virtual reality simulated sporting event on a smartphone or tablet. In one or more embodiments, a play is developed on a desktop computer (step 1710). The files are then uploaded to a cloud (step 1712). The cloud then may download the play onto a mobile device (step 1714) such as a smartphone simulator virtual reality headset (step 1716), a tablet 3D view (step 1718), augmented reality (step 1720), or a video game view (step 1722).

Figure 31:
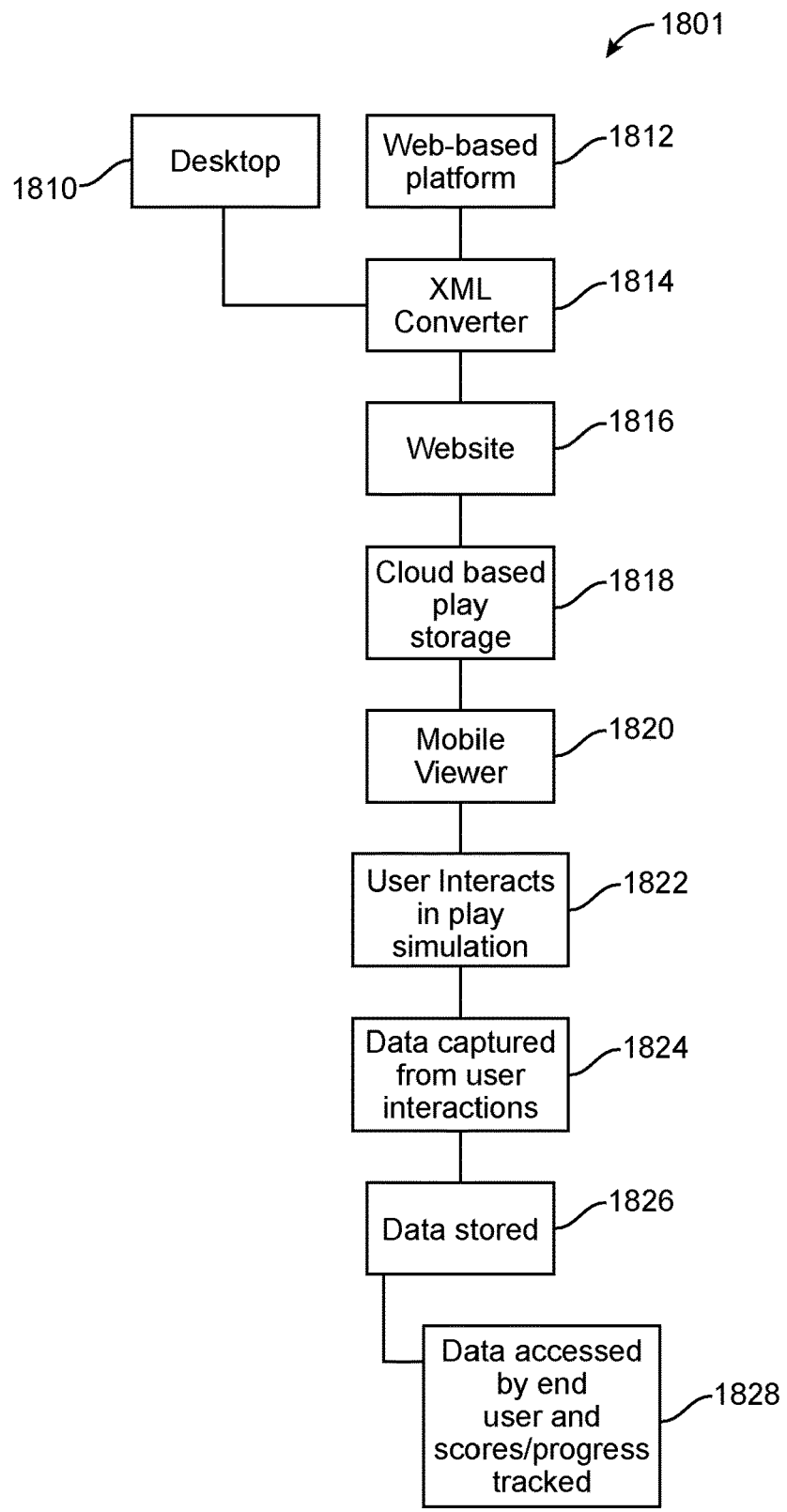
FIG. 31 is an exemplary flowchart showing the process of implementing the virtual reality simulated environment of a sporting event on a mobile device.

FIG. 31 is an exemplary flowchart showing the method 1801 of implementing the virtual reality simulated sporting event employing a desktop or a web-based platform. A desktop computer may be employed as a play creation and editing tool. In one or more embodiments, the file type is formatted through an encoding layer such as XML, and is saved as a "*.play" file. Once created, the file can be sent to the XML converter. The file type is XML, and it is saved as a .play file. In one or more embodiments, a user or coach may use the web-based version of the editing and play creation tool. The web-based version will also send the file to the XML convertor.

The desktop (step 1810) and the web-based platform (step 1812) interact with the XML convertor (step 1814). The XML converter transfers data to the website (step 1816) having the cloud-based play storage (step 1818). After going through the XML convertor, the play is then able to be stored on the website. This website serves as the cloud based storage facility to host, manage, and categorize the play files. The plays are downloaded to a mobile viewer (step 1820) where the user interacts with the simulated play (step 1822). The website is integrated with a mobile app that automatically updates when new play files are added to the cloud based storage in the website. The mobile viewer, employing an app, interprets the play file. The user then can experience the play, and be given the result of their actions within the play. This data is then sent back to the app/website.

Data is captured from the user interactions (step 1824) and is stored (step 1826). Once the data is captured, the system will display the data on the app or website so the athlete can monitor progress, learn information about his performance, and review his standing among other members from their age group. The data is accessed by the end user and the scores and progress are tracked (step 1828). The data capturing is the most important aspect in one or more embodiments. This data can then be used to challenge other users, invite other users to join in the same simulation, and to track and monitor a user's progress throughout their lifetime.

Figure 32:
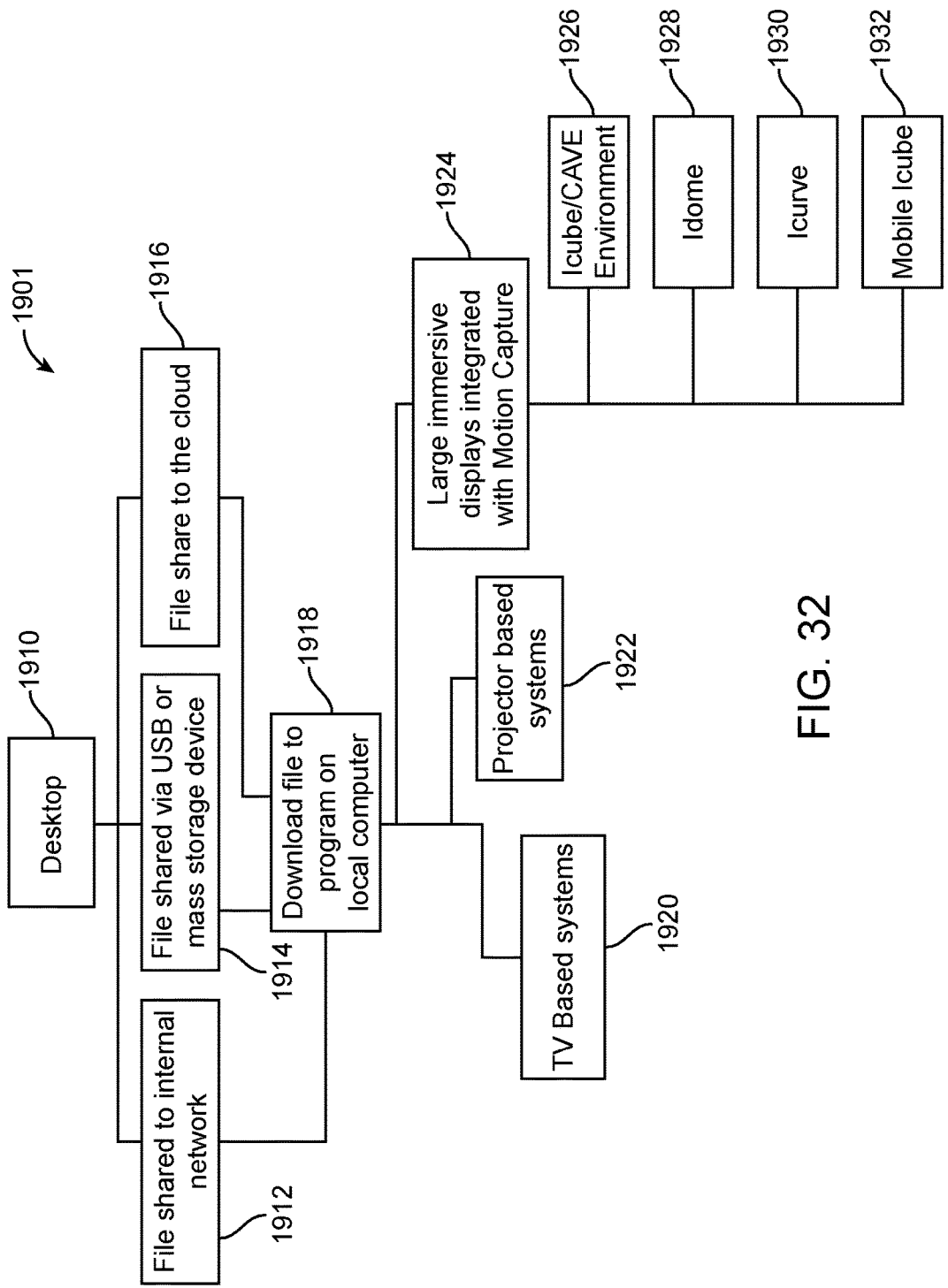
FIG. 32 is an exemplary flowchart showing the process of implementing the virtual reality simulated environment of a sporting event on a larger system.

FIG. 32 is an exemplary flowchart showing the method 1901 of implementing the virtual reality simulated sporting event on a larger system. Plays are created on a desktop (step 1910) and files are sent to an internal network (step 1912), a USB mass storage device (step 1914), or to the cloud (step 1916). The data is then downloaded to a program on a local computer (step 1918) and is then forwarded to TV based systems (step 1920), projector based systems (step 1922), or large immersive displays integrated with motion capture (step 1924). Examples of such large immersive displays include Icube/CAVE environments (step 1926), Idome (step 1928), Icurve (step 1930), or mobile Icubes (step 1932).

Figure 33:
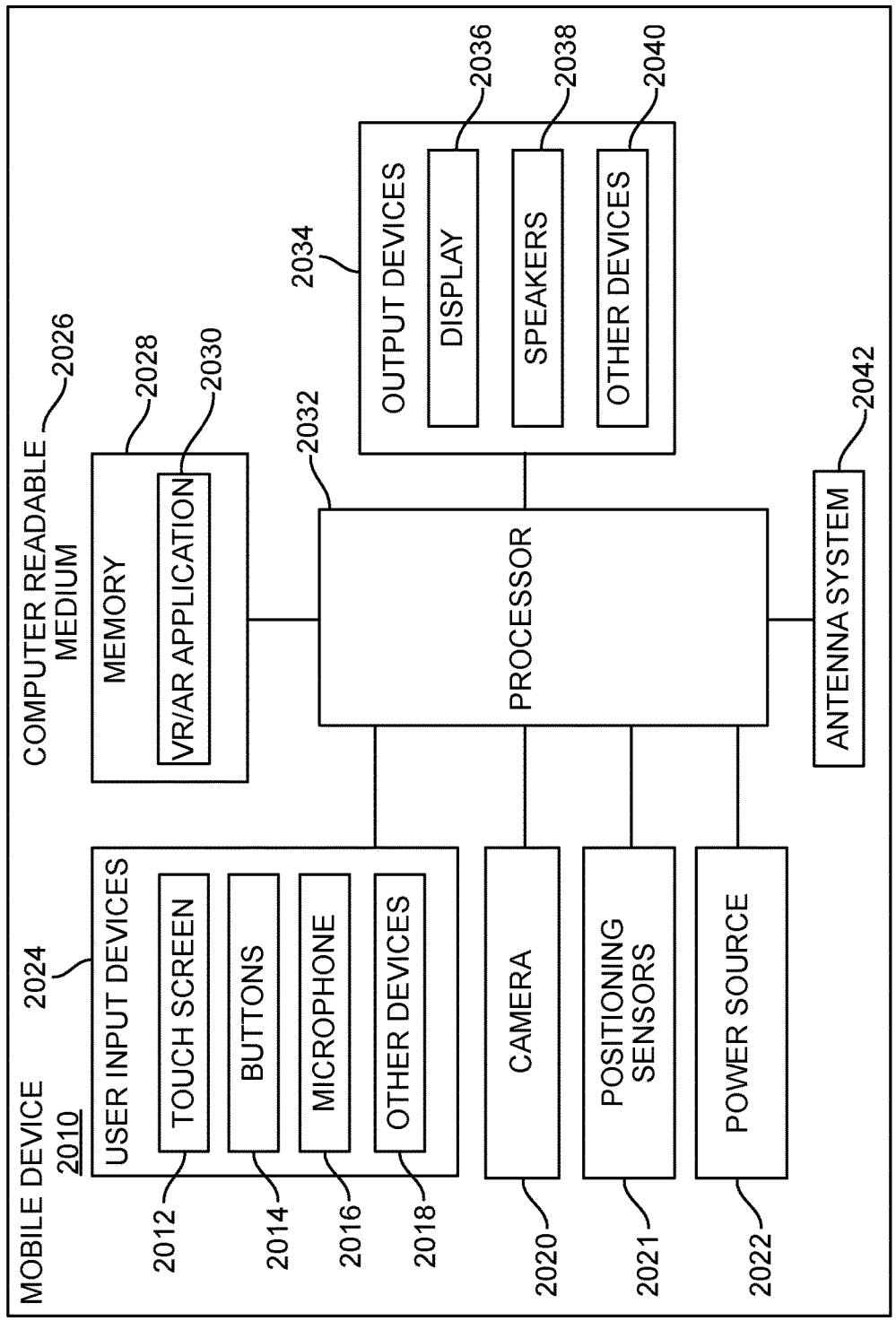
FIG. 33 is a schematic block diagram illustrating a mobile device for implementing the virtual reality simulated environment of a sporting event.
Figure 34:
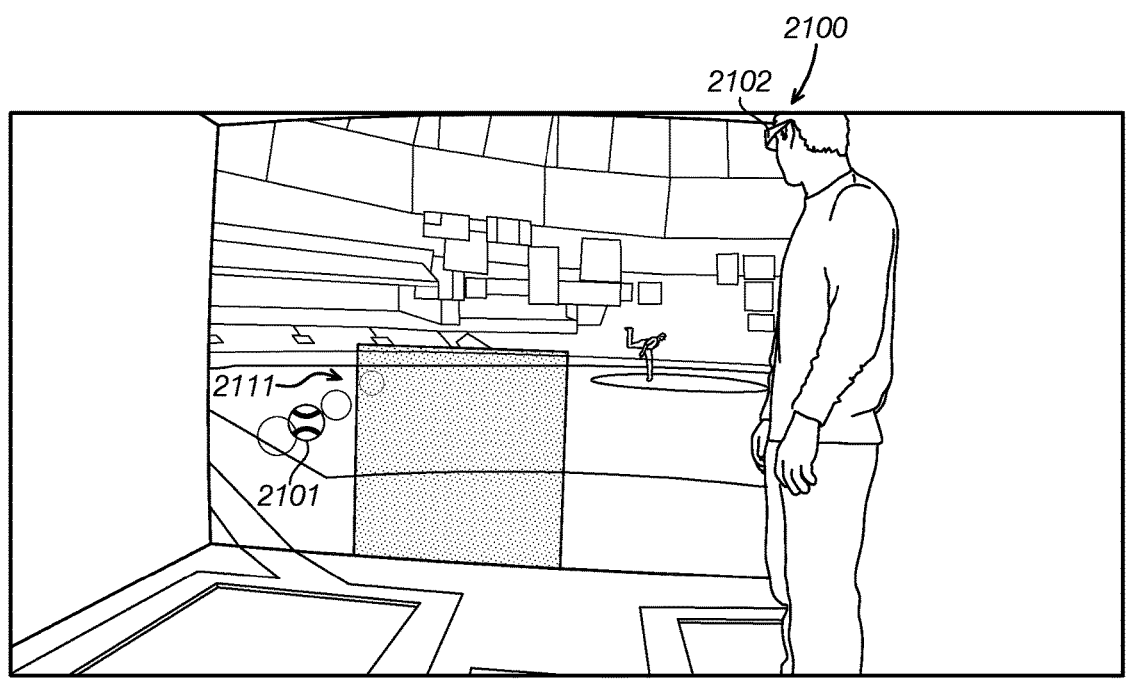
FIG. 34 is a stereoscopic front perspective view of a three dimensional panoramic virtual reality environment system simulating a baseball pitch thrown from a digitized avatar of a real-life pitcher, as seen from a baseball batter's perspective, according to an exemplary embodiment.
Figure 35:
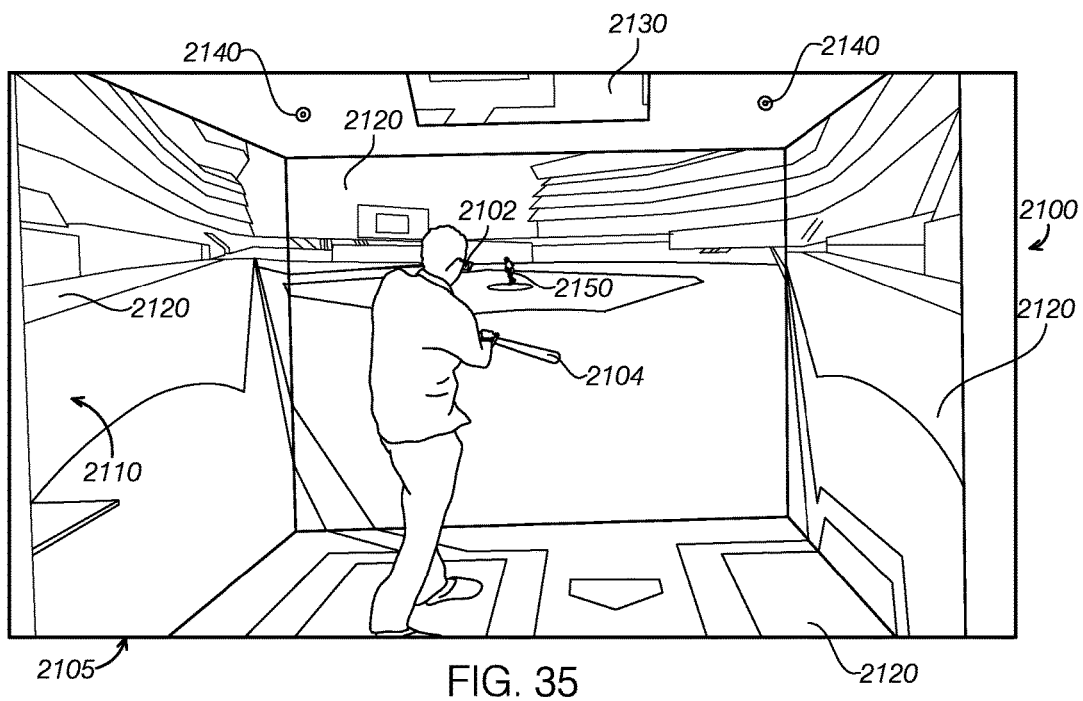
FIG. 35 is a stereoscopic front perspective view of the system of FIG. 34 with a user wearing a tracked stereoscopic glasses and swinging a bat at a simulated pitch according to an exemplary embodiment.

FIG. 33 shows an embodiment of a mobile device 2010. The mobile device has a processor 2032 which controls the mobile device 2010. The various devices in the mobile device 2010 may be coupled by one or more communication buses or signal lines. The processor 2032 may be a general purpose computing device such as a controller or microprocessor for example. In an embodiment, the processor 2032 may be a special purpose computing device such as an Application Specific Integrated Circuit ("ASIC"), a Digital Signal Processor ("DSP"), or a Field Programmable Gate Array ("FPGA"). The mobile device 2010 has a memory 2028 which communicates with the processor 2032. The memory 2028 may have one or more applications such as the Virtual Reality ("VR") or Augmented Reality ("AR") application 2030. The memory 2028 may reside in a computer or machine readable non-transitory medium 2026 which, when executed, cause a data processing system or processor 2032 to perform methods described herein.

The mobile device 2010 has a set of user input devices 2024 coupled to the processor 2032, such as a touch screen 2012, one or more buttons 2014, a microphone 2016, and other devices 2018 such as keypads, touch pads, pointing devices, accelerometers, gyroscopes, magnetometers, vibration motors for haptic feedback, or other user input devices coupled to the processor 2032, as well as other input devices such as USB ports, Bluetooth modules, WIFI modules, infrared ports, pointer devices, or thumb wheel devices. The touch screen 2012 and a touch screen controller may detect contact, break, or movement using touch screen technologies such as infrared, resistive, capacitive, surface acoustic wave technologies, as well as proximity sensor arrays for determining points of contact with the touch screen 2012. Reference is made herein to users interacting with mobile devices such as through displays, touch screens, buttons, or tapping of the side of the mobile devices as non-limiting examples. Other devices for a user to interact with a computing device include microphones for accepting voice commands, a rear-facing or front-facing camera for recognizing facial expressions or actions of the user, accelerometers, gyroscopes, magnetometers and/or other devices for detecting motions of the device, and annunciating speakers for tone or sound generation are contemplated in one or more embodiments.

The mobile device 2010 may also have a camera 2020, depth camera, positioning sensors 2021, and a power source 2022. The positioning sensors 2021 may include GPS sensors or proximity sensors for example. The power source 2022 may be a battery such as a rechargeable or non-rechargeable nickel metal hydride or lithium battery for example. The processor 2032 may be coupled to an antenna system 2042 configured to transmit or receive voice, digital signals, and media signals.

The mobile device 2010 may also have output devices 2034 coupled to the processor 2032. The output devices 2034 may include a display 2036, one or more speakers 2038, vibration motors for haptic feedback, and other output devices 2040. The display 2036 may be an LCD display device, or OLED display device. The mobile device may be in the form of hand-held, or head-mounted.

Referring now to FIGS. 34-50 in general, in another embodiment(s), aspects of the subject technology may generate a baseball related simulation that may be beneficial for users (as batters) to practice hitting in preparation of competition against real-life pitchers. Aspects of the embodiments described below may digitize the image of a real-life baseball pitcher and display the image as a digital avatar within a baseball replicated environment. As may be appreciated by those individuals that have tried hitting a real-life baseball thrown by a pitcher, the act of hitting a pitched baseball is often regarded as perhaps being the single most difficult act in all of competitive team sports. The challenge of hitting a professionally pitched baseball is more challenging than for most. The speed of a pitched baseball can often reach somewhere in the range of 90 miles per hour (MPH) to over 100 MPH for today's pitchers. The distance from the pitcher's plate (also known as a pitcher's rubber) to home plate is 60 feet and 6 inches by Major League Baseball (MLB) rules as well as for most baseball levels from high school and up. The typical time for a pitch to reach the plate once it leaves the pitcher's hand is approximately 400 to 500 milliseconds. The human eye has been found to only recognize the pitched baseball in just a few points along the path of trajectory from the pitcher's hand to the point of contact near the home plate. If one factors in the need for the batter to recognize not only when the ball will be at the point of contact but also from where the baseball is released by the pitcher in three dimensional space, the trajectory of the baseball's flight path, and whether the baseball will cross over home plate between the upper and lower limits of the batter's strike zone, it is understood that an extreme challenge exists for the batter to decide within split seconds whether or not to swing at the pitch.

The common approach for batters is to practice against live pitching or to use a mechanical pitching machine to practice form and timing. However, this approach is limited by the fact that every pitcher's delivery has its own subtle characteristics that heretofore are not replicated by conventional tools and practices. For example, one pitcher may release a pitch using what is known as a true overhand delivery (from a "12 o'clock to 6 o'clock" release), while some may throw from a three-quarters slot, some from a side arm release, and a few from what is known as a submariner's release where the arm lowers down to below the waist as the arm is swung upward and forward.

Some video games can generally replicate a general delivery type as described above and may use a generic pitcher avatar to "simulate" a certain pitcher for a certain team, however an actual real-life pitch and delivery may vary significantly from the video game generated delivery of said pitcher. In addition, while some video games include a relative speed of a pitch and calculate whether a user's action (which may be tracked by a game controller) resulted in contact, users often experience a substantial lag (for example, from tracking of said game controller) in the triggering action as well as an unnatural perspective because the pitcher often looks larger than life on a monitor. The release point between pitchers may remain static and becomes easy to predict and is not reflective of the pitcher's real-life release point. So while a user may become proficient at hitting a pitch from a static release point and may physically compensate for the video game system's lag, such practice does not translate into successful use in a real-life situation because the timing and release point recognition is very different.

Even amongst pitchers using a similar delivery type (overhead, three-quarters, etc.), pitchers have varying physical attributes (for example, height, arm length, etc.) and delivery mechanics that vary the release point that batters see from pitcher to pitcher. Recognizing and being prepared for delivery from a particular pitcher's release point is a strong tool for a batter's preparation against an opponent. This approach eliminates one of the decision making factors described above that need to be made within the split seconds available during a pitch. However, there remains the daunting task of actually recognizing a pitch type, timing and the trajectory of the pitched ball.

To date, the only way that is close to practice against a pitcher's delivery (known as "read the pitch") was to watch still shots or video footage of a pitcher. However, it is almost impossible to capture still shots and video footage exactly from the batter's perspective, but instead are typically captured by a photographer/cameraman at a third-person perspective offset from the batter's perspective. As a result, traditional still shots and video footage still fail to provide the batter the immersive experience of facing a real-life pitcher on the baseball field. Moreover, still shots and video do not allow a batter to simulate a swing at a pitch with certainty in the results. One can swing against a video clip and only guess as to whether or not contact was made and how successful the contact; in other words, did contact result in a foul ball, a weak/strong ground ball, a line drive, or fly ball? In live-action, players are limited to practice swings against a pitcher's delivery while waiting from far to the side of home plate (usually in a warm up circle next to the dugout). From this perspective, the batter is limited to timing pitches but cannot see from the same first person perspective that happens in an actual at-bat.

In the embodiments disclosed below, aspects of the subject technology provide a first-person perspective of pitches that simulate the actual real-life delivery and trajectory of pitches from real-life pitchers. The user (sometimes referred to generally as the "batter") may watch a digitized avatar of a real-life pitcher perform their own pitching sequence with a simulated baseball delivered from the pitcher's tracked release point that leaves the pitcher's hand with the spin pattern of a selected pitch type from the pitcher's known pitch types. Depending on the pitch, pitch data is used to simulate the flight path for a pitch type at the spin rate (and spin axis) associated with the pitcher's pitch and within the known range of speed, velocity and acceleration for a pitch type from the selected pitcher. The system may control whether a pitch will enter the strike zone or pass outside the strike zone so the batter can recognize with practice whether some pitches released at various release points for the pitcher will be a strike or ball.

Referring now to FIGS. 34-38 and 50, a virtual reality projection system 2100 (sometimes referred to generally as the "system") is shown both in illustration and block diagram embodiments. In an exemplary embodiment, the system 2100 generates a three dimensional, panoramic first person view of a pitcher 2150 and the surrounding environment. The surrounding environment may include a home plate, batters' boxes, the pitching mound, base lines, bases, dirt and grass infield parts, an outfield, an outfield wall, stadium seating, and any other elements one may find for a stadium setting. Some embodiments have images of professional (or otherwise) stadiums that can replicate the scene a player is about to experience. In use, the batter may look around and experience the same visual sensation one would perceive at the actual stadium. The pitcher 2150 may be a digitized avatar of a real-life pitcher with movements created by replicating real-life movements of said pitcher from stored video of past pitching performances. The pitcher 2150 may also be a digitized avatar of a real-life pitcher with movements created by animating the body joints of said avatar through techniques known as key-framing or motion capture. The system 2100 may thus enhance the practice experience by seeing the pitcher in the same environment the batter will perform. The processes for simulating the pitcher's appearance in a selected environment is described in more detail further below.

Figure 50:
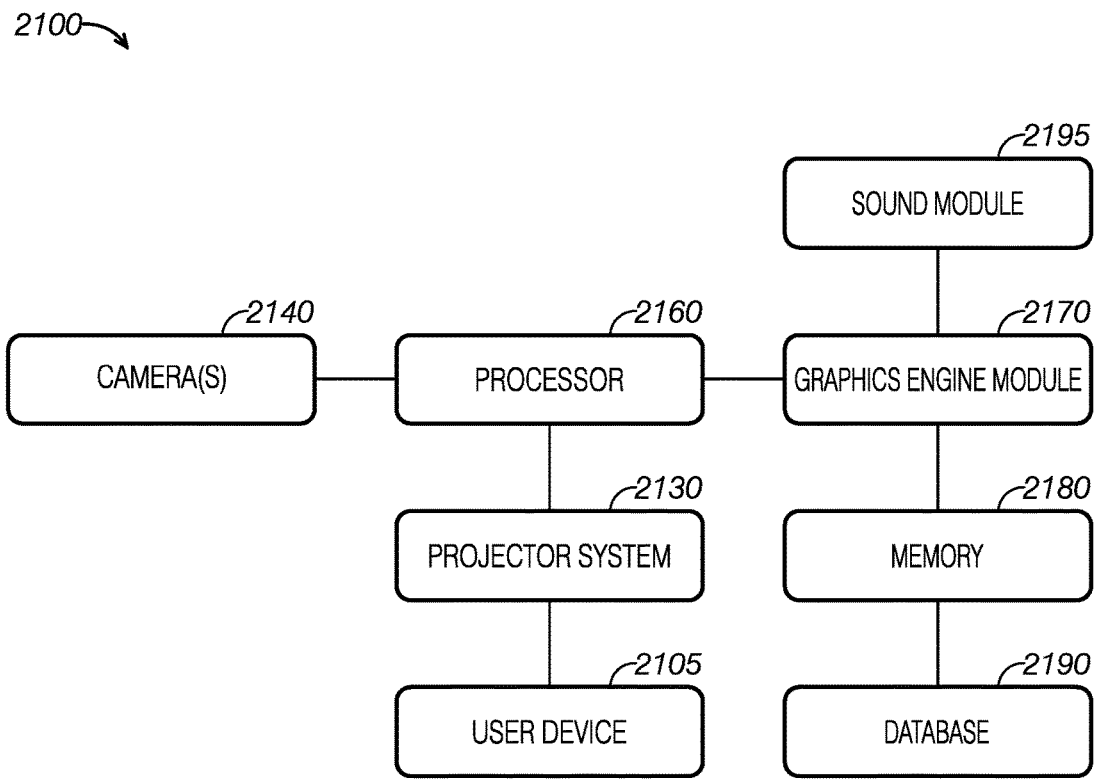
FIG. 50 is a block diagram of a system for generating a three dimensional virtual reality simulation of baseball pitches from digitized avatars of real-life baseball pitchers according to an exemplary embodiment.

Referring to FIG. 50 for the moment, the system 2100 generally includes a projection system 2130 coupled to a processor 2160, and a graphics engine module 2170. The graphics engine module 2170 may be dedicated hardware, software, or some combination thereof and is generally configured to generate the virtual reality graphics simulating a selected pitcher's delivery including delivery from a calculated release point, simulating the trajectory and spin of a thrown pitch, generating the virtual reality surrounding environment of both the digitized pitcher 2150 and the stadium, any pop-up elements, and any simulated hits of a pitch by the user. The processor 2160 may be similar to any of the processors described in FIGS. 1-33 above and/or may be a dedicated graphics processor. Some embodiments also include a memory bank 2180 for temporary storage and retrieval of data being processed and a database or memory storage 2190. Some embodiments may also include a camera or set of cameras 2140 connected to the processor 2160 and/or other elements shown. Any data related to a pitcher may be stored and accessed from the database 2190. The database 2190 may store data associated with a plurality of pitchers. Information retrieved from the database 2190 and used by the system 2100 includes for example initial position (ball release point), initial velocity, initial acceleration, spin rate and other data tracked from real-life pitchers' previous games. The database 2190 may be updated manually or automatically as more pitching data become available, for example as new baseball games are carried out in the season. The pitch data may be streamed via a streaming protocol as a means of the update, for example, the HMD user may choose to stream new pitch practice data remotely via wireless network from a network server or cloud.

A user device 2105 may be coupled to the processor 2160 and may vary from embodiment to embodiment. For instance, in the exemplary embodiment shown in FIGS. 34 and 35, the user device 2105 maybe a CAVE type projection room with the projection system 2130 projecting generated virtual reality scene segments onto four walls (front, left, right and floor) 2120 to generate a panoramic virtual reality scene 2110. The user may wear a pair of stereoscopic glasses 2102 that turn the images on the surrounding walls 2120 into a stereoscopic view. One or more walls may be removed to form a more portable system, for example a system with only the front wall and floor. Cameras 2140 may track the position of the user (and the user's eyes as described in some processes below) in the CAVE as well as any accessories carried by the user (including but not limited to a baseball bat, an interactive controller). Once a pitch is thrown, some embodiments will provide a trail 2111 of the pitch's flight path (for example as a series of balls 2101 placed along the pitch's trajectory), with the ball's seam position at each interval along the baseball's flight path shown from the batter's perspective so that the batter may learn to identify one pitch type from another based on the pitch trajectory and rotation of the seam pattern visible. Some embodiments will provide a mechanism for detecting if the pitch was hit with the tracked baseball bat 2104. While the embodiment shown and described is in the form of a CAVE, some embodiments may be adjusted to operate in a head mounted display (HMD) unit (FIGS. 36-38) so that the movement of batter's HMD is tracked in relation to the virtual environment, and adjust flight path of the pitched baseball in the field of view of the HMD. The batter may use gaze directed crosshairs to interact with pop-up elements such as a quiz question asking about the type of pitch, location of the pitch on strike zone plane, ball or strike (FIG. 38). The batter's bat swing may also be tracked in relation to the virtual environment, and checked if the pitch was hit. Some embodiments include a sound generation module 2195 that generates an impact sound dependent on the quality of the hit (for example, foul ball, hard/weak ground ball, line drive, pop fly, or homerun).

Figure 36:
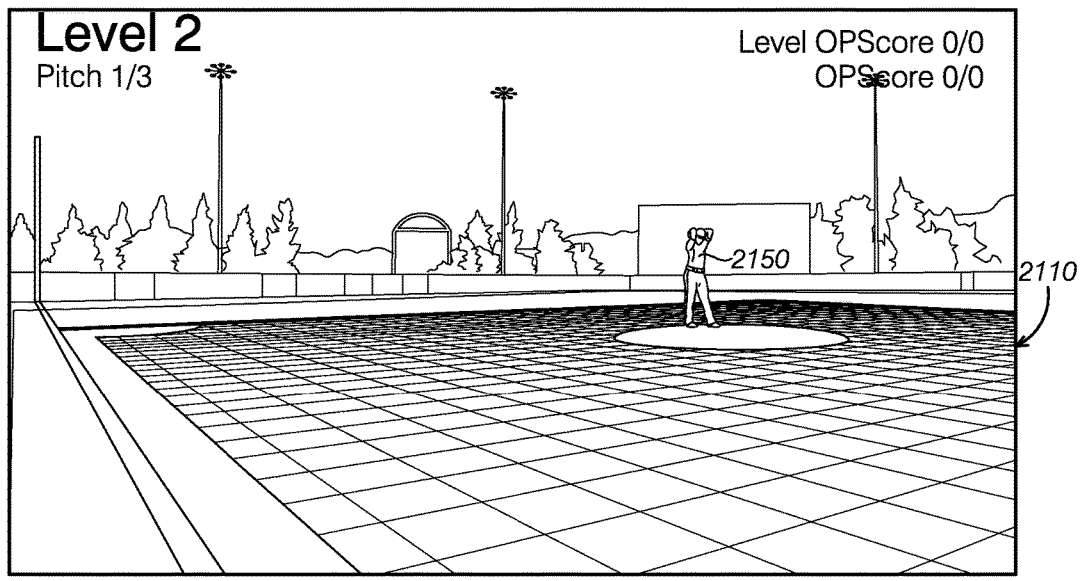
FIG. 36 is an enlarged view of a digitized avatar of a real-life pitcher within a three dimensional panoramic virtual reality environment system simulating a baseball pitching sequence according to an exemplary embodiment.

In use, a pitcher's profile may be selected from the database 2190 by the user so that the selected pitcher's digitized avatar 2150 is displayed in the virtual reality scene 2110. The selected pitcher's profile includes video footage of the pitcher's delivery and general body movements that are part of the delivery. FIG. 36 shows an enlarged view of a selected pitcher 2150 in mid-delivery during a wind-up type sequence. Some simulations will show pitchers delivering from a stretch position. As will be appreciated, every pitcher has his own arm/hand positioning as well as step placement during a delivery which affects the timing of delivery. Some pitchers go so far as to intentionally include hitches in their delivery to throw off a batter's timing. Being able to prepare against an accurate replication of a pitcher's delivery is highly beneficial to a consistent swing against that pitcher. The user may also focus on practicing against a specific type of pitch, by filtering out all other types of pitches, and working on the swing timing and/or swing position. The user may also focus on practicing against a specific range for the pitch speed, by filtering out all other ranges of pitch speed, and working on the swing timing. The user may also focus on practicing against a specific opposing pitcher by loading previous real-life at-bats data of such pitcher.

The pitcher's profile data also includes for example, each pitch type (including but not limited to two seam fastball, four seam fastball, change of speed, curveball, sinker, slider, split finger fastball, cut fastball, and knuckleball) that the pitcher has thrown and has been recorded along with a range of speed for each pitch type, the release point of each pitch type, trajectory paths, strike zone pitch distribution, and spin rates and spin patterns for each pitch type. The pitch type may be based on the initial grip of the baseball and the manner of hand movement used when releasing the grip (for example, degrees of supination, pronation, etc.). Thus a user may input into the system a setting which repeats the same pitch type over different parts of the strike zone or according to the selected pitcher's statistical preferences, or the user may ask for random pitch types thrown so that he can learn to recognize and distinguish one pitch type from another.

Figure 37:
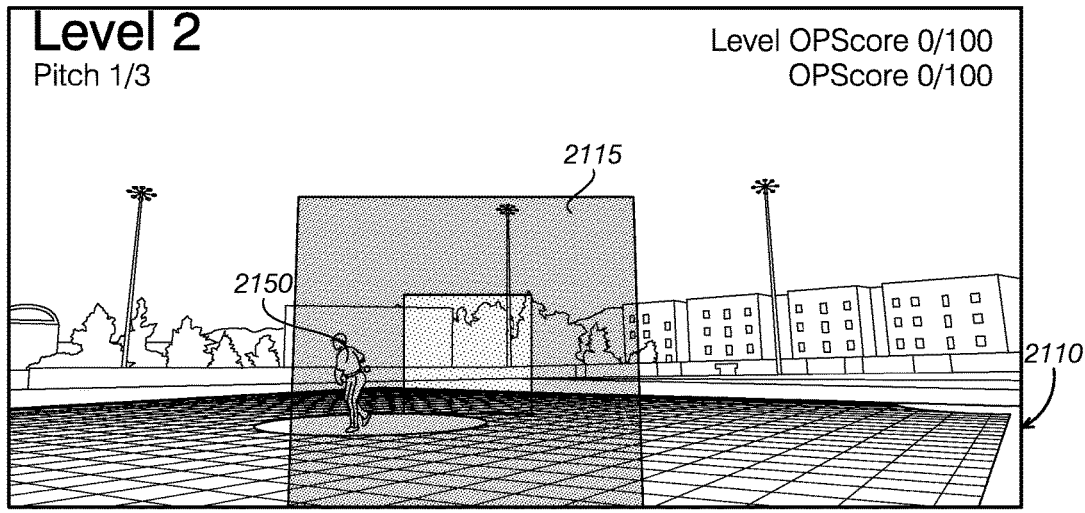
FIG. 37 is a perspective view displayed inside a head-mounted display, which shows a digitally generated strike zone location box from a batter's perspective displayed at the end of the pitching sequence of FIG. 36, according to an exemplary embodiment.
Figure 38:
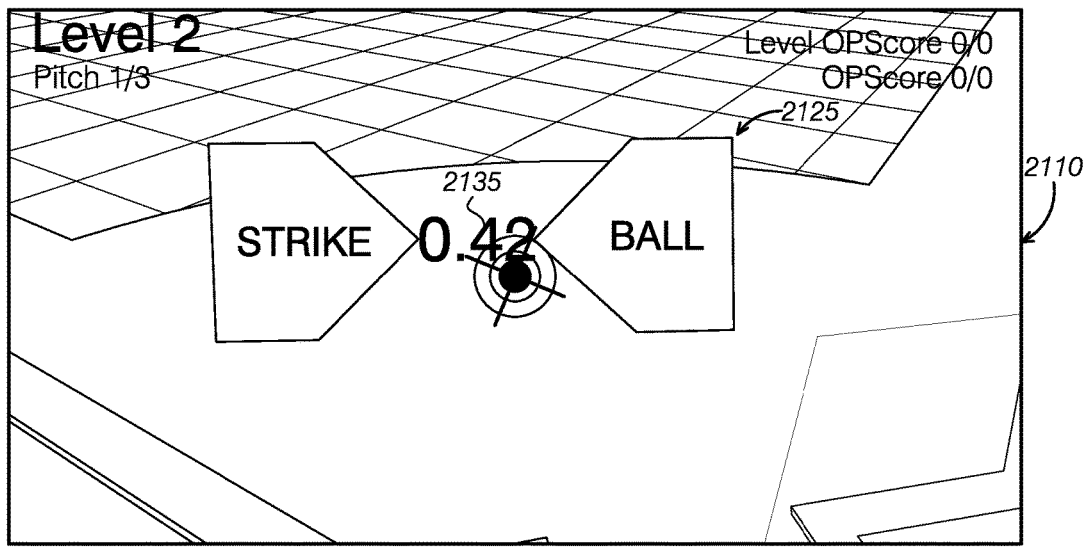
FIG. 38 is a perspective view displayed inside a head-mounted display, which shows a strike or ball decision graphic with countdown timer and the gaze-controlled crosshair according to an exemplary embodiment.

Referring to FIGS. 37 and 38, other embodiments may provide practice against a selected pitcher for determining whether a simulated pitch will be a strike or a ball (outside the strike zone). The system 2100 is able to use the selected pitcher's tracked data to accurately replicate known release points and simulate the same flight paths of pitches. A change in a pitcher's release point may be the difference in whether a same pitch type is either a strike or a ball. In some embodiments, a pop-up strike zone field 2115 (FIG. 37) may be displayed for the batter's reference. Some embodiments may provide a pause in the pitch's flight to present the user a displayed query graphic 2125 which may ask for example, whether the pitch is a strike or a ball. A timer 2135 may be displayed requiring the user to select a choice before the end of the timer. As shown, it will be appreciated that the timer may reflect a real-life time available to decide an aspect of the pitch. While the example is shown with respect to the decision of a ball or strike, it will be understood that other aspects may be presented in the query graphic 2125, such as asking for the pitch type, estimated pitch speed, in case of strike which of the 9 (3 by 3) strike zones did the pitch go through.

Figure 39:
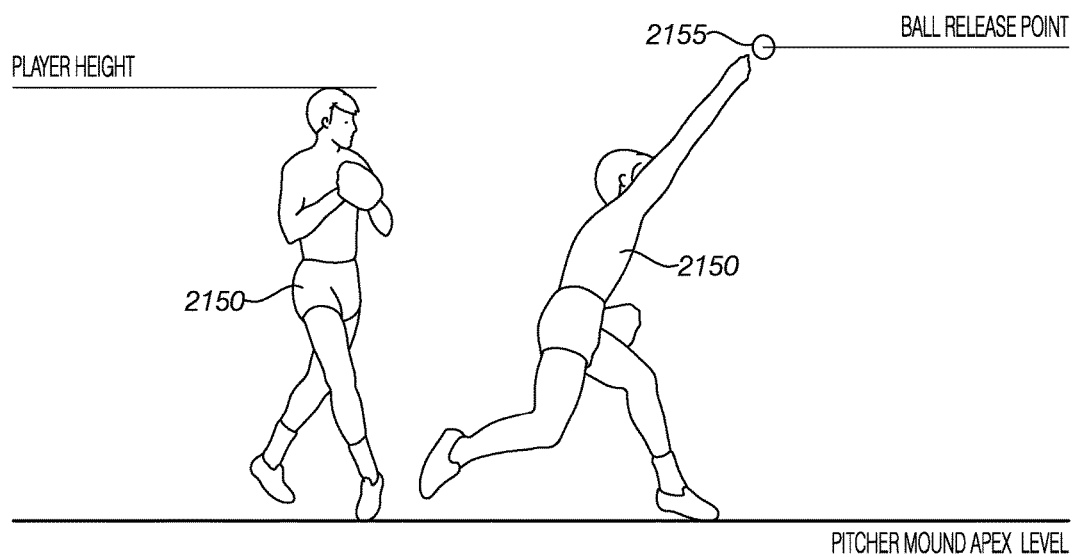
FIG. 39 is an illustration of a digitized real-life pitcher performing a pitching sequence and reference points determined in generating a release point in a virtual reality environment according to an exemplary embodiment.
Figure 40:
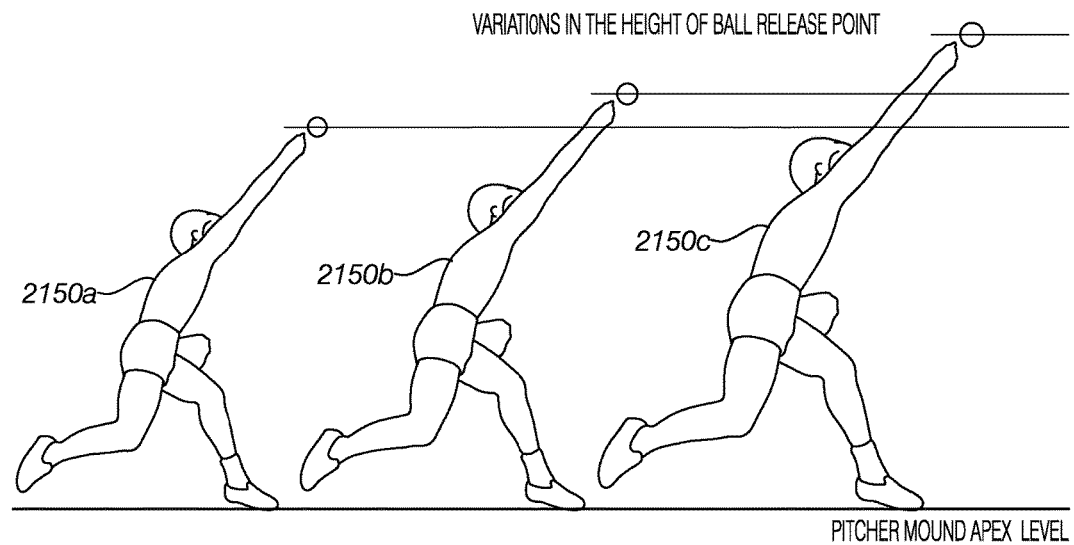
FIG. 40 is an illustration of digitized real-life pitcher performing several pitch sequences with different heights in the ball release points, and reference points determined for each pitcher in generating respective release points at arbitrary locations in a virtual reality environment according to an exemplary embodiment.

Referring now to FIGS. 39 and 40, illustrations showing how the release point 2155 for a selected pitcher may be determined. The digitized avatar 2150 for a pitcher may be replicated from actual game footage provided from any number of known third party sources. As described earlier, footage data used may be organized into data entries by pitch type so that the release point for each pitch type a pitcher uses is charted and used in the virtual reality setting rather than just showing for example an average release point for all the pitcher's pitches. In addition, the release point for each pitch type may be further organized by strike or ball results so that a batter may practice distinguishing from each for the same pitch type. Each video clip of a pitch thrown by the selected pitcher may be annotated to mark the player's height, the pitching mound apex (adjacent the pitcher's plate), and the height of the baseball from the mound apex level at the point of release for recorded pitch. As shown in FIG. 40, each pitcher has several video clips per pitch type in the database, with variations in the height of the ball release point recorded depending on the different pitches, as represented by avatars 2150a, 2150b, and 2150c each showing the baseball being released at a different height. The processor 2160 and graphics engine module 2170 may adjust the virtual reality graphics to replicate the release point 2155 based on the annotated data.

Figure 41:
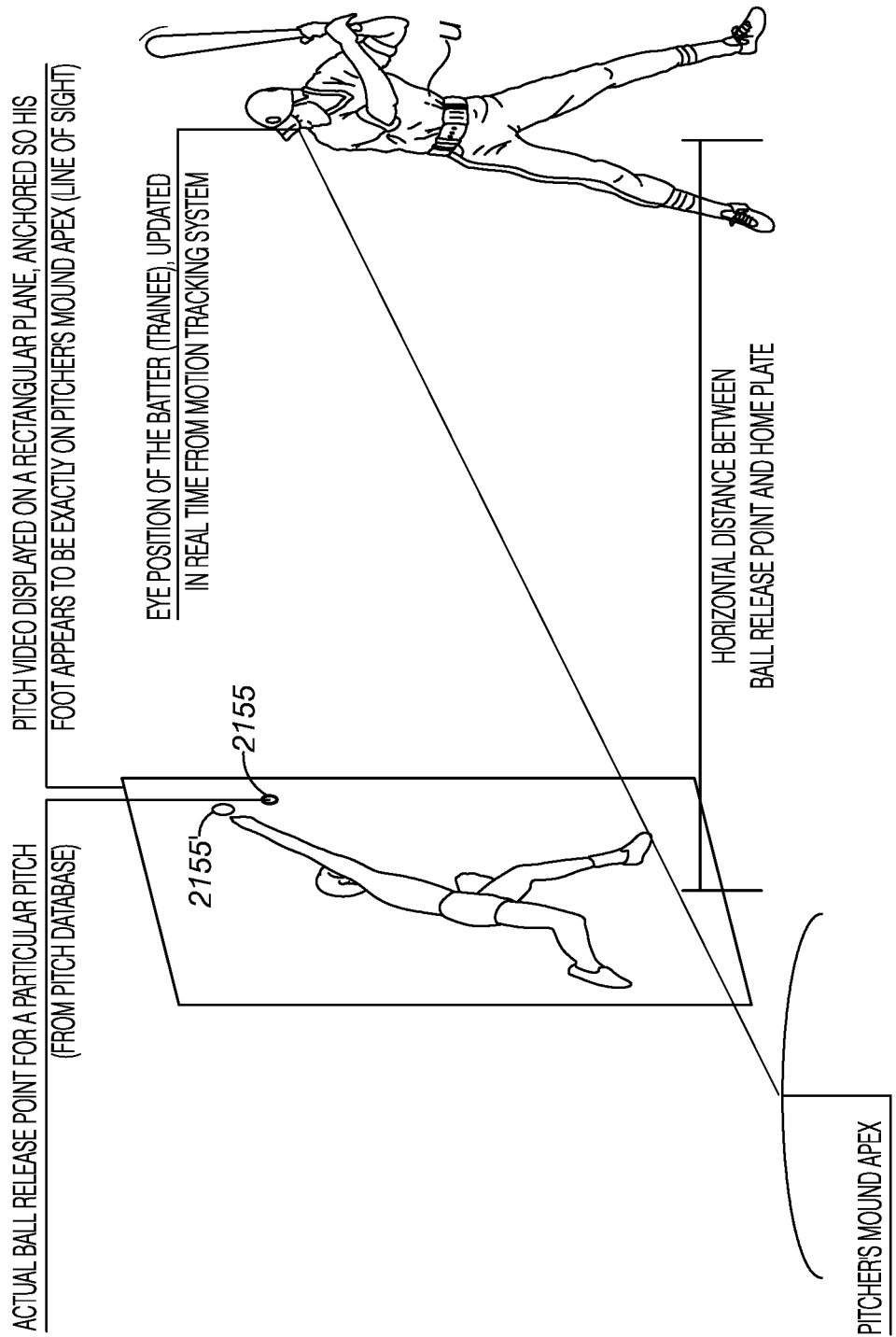
FIG. 41 is a side schematic view illustrating before the alignment of the digitized avatar of a pitcher's release point and pitch release relative to a position of a user batter according to an exemplary embodiment.
Figure 42:
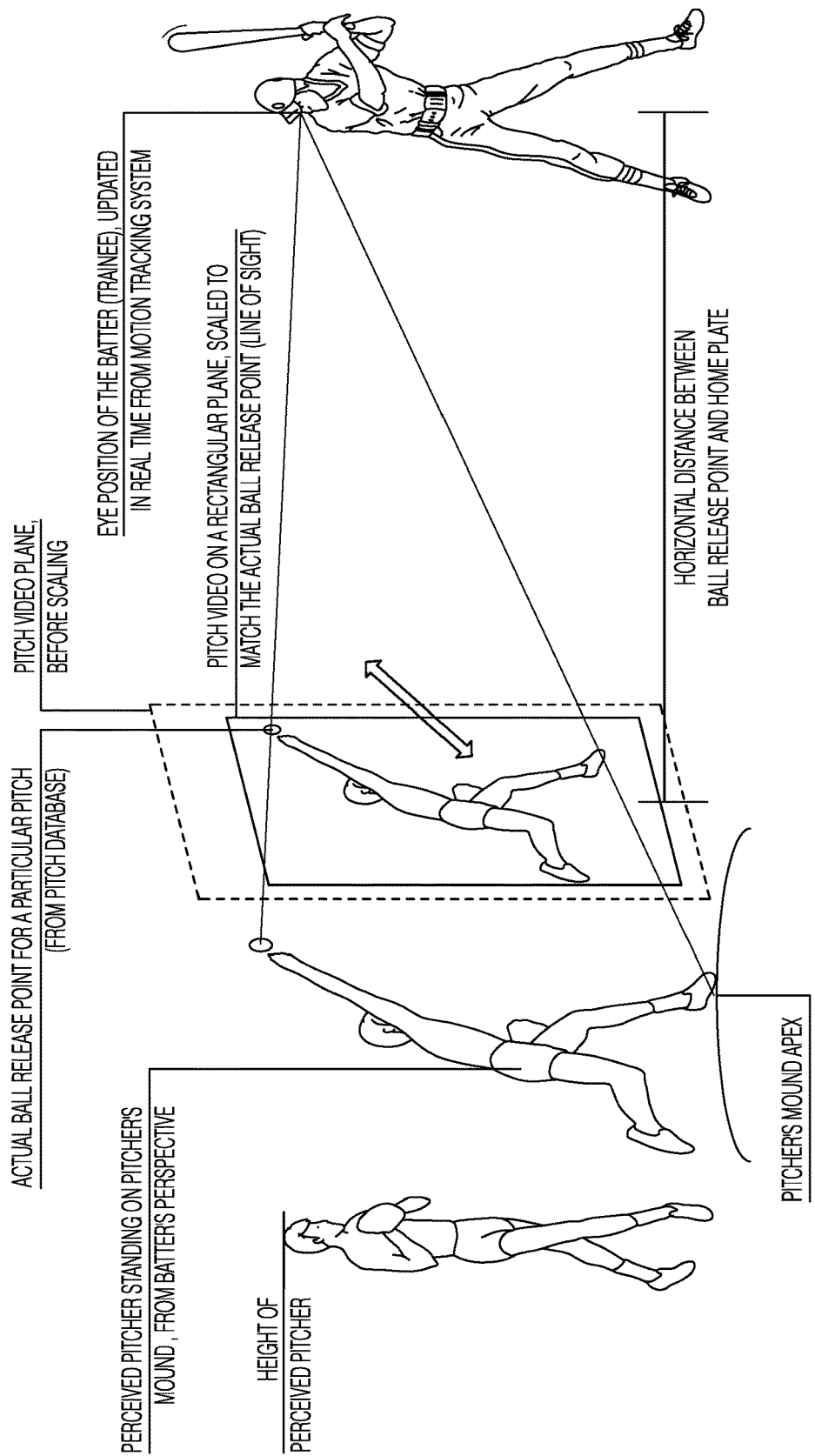
FIG. 42 is a side schematic view illustrating after the alignment of the digitized avatar of a pitcher's release point and pitch release relative to a position of a user batter according to an exemplary embodiment.
Figure 43:
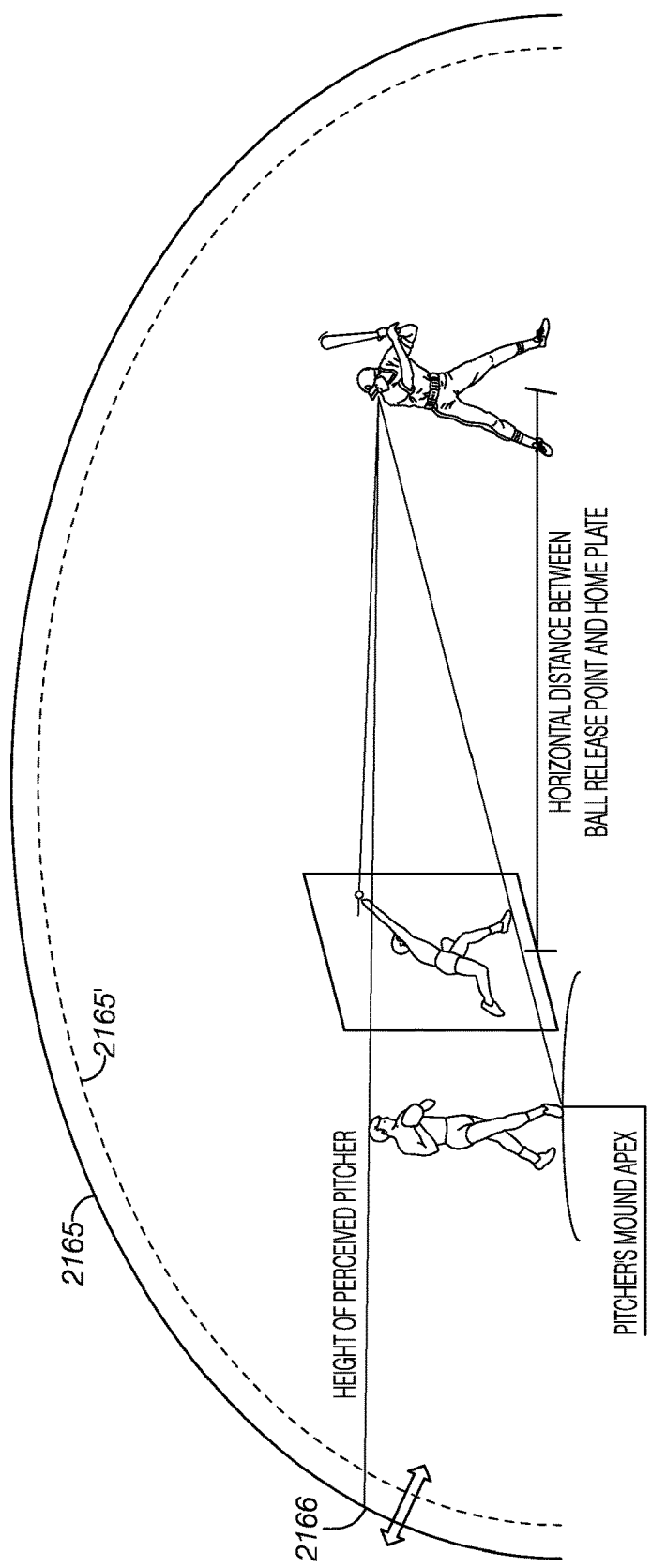
FIG. 43 is a side schematic view illustrating generating a field background and stadium environment relative to a position of the digitized pitcher's avatar and the user batter according to an exemplary embodiment.
Figure 44:
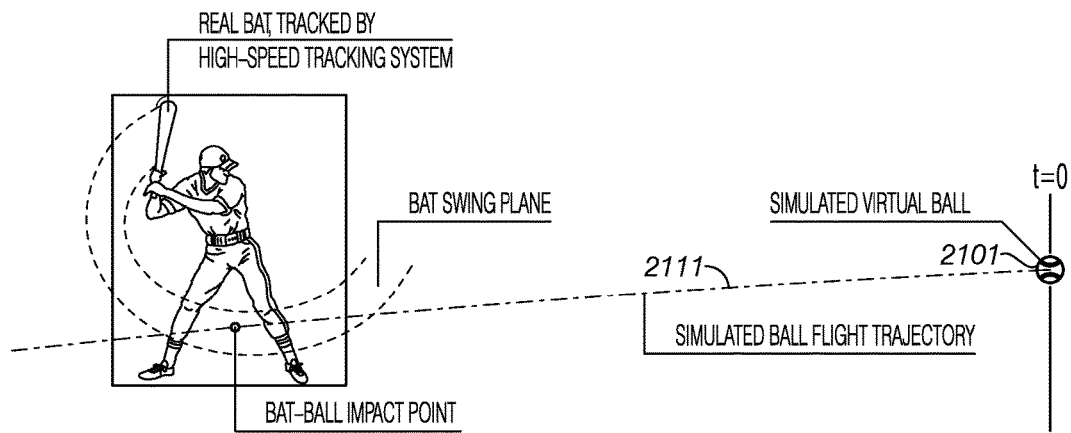
FIG. 44 is a side schematic view illustrating the tracking of a user's bat swing to determine if a simulated pitch was hit in the system of FIG. 35.
Figures 45, 46:
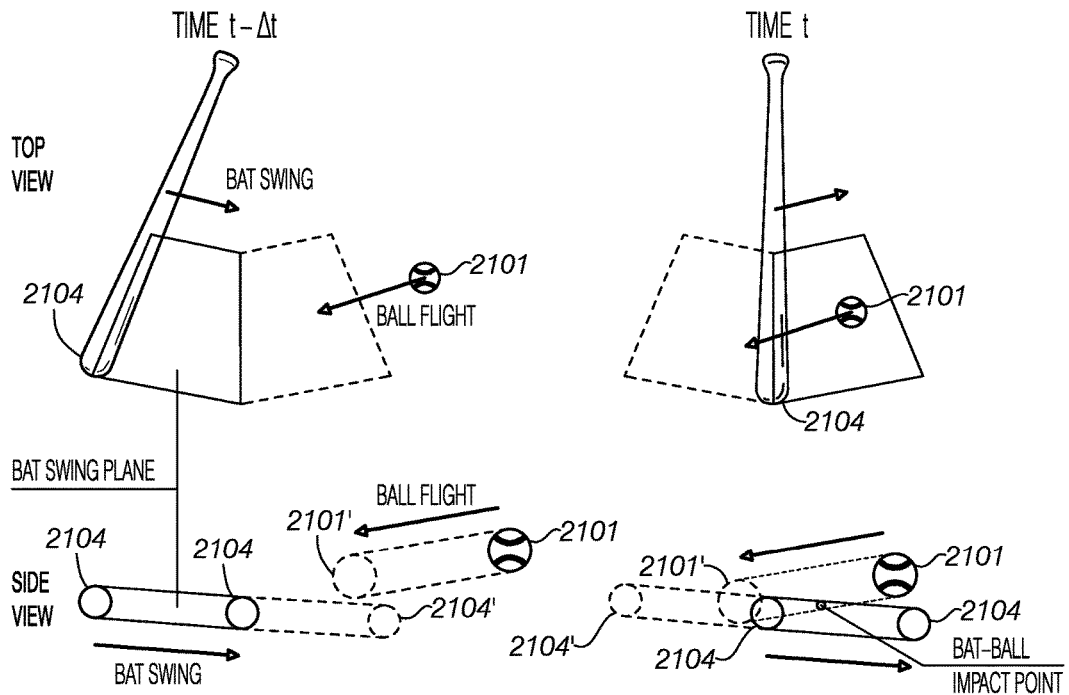
FIG. 45 shows a top view schematic and a side view schematic of a tracked bat swing to determine if the bat reaches a point of contact of the simulated pitch in a plane that intersects a simulated flight path of the simulated pitched baseball.
FIG. 46 shows a top view schematic and a side view schematic of a tracked bat swing that was determined to have hit the simulated pitched baseball.

Referring now again to FIGS. 34 and 45 along with FIGS. 41-43, in operation, it will be further appreciated that the system 2100 provides an enhanced realistic experience by simulating a user's environmental experience as close to the real-life experience of batting against a selected pitcher as possible. The virtual reality scene 2110 may be displayed so that the depth perception and scale of the digitized pitcher's avatar 2150 appears natural.

Figure 48:
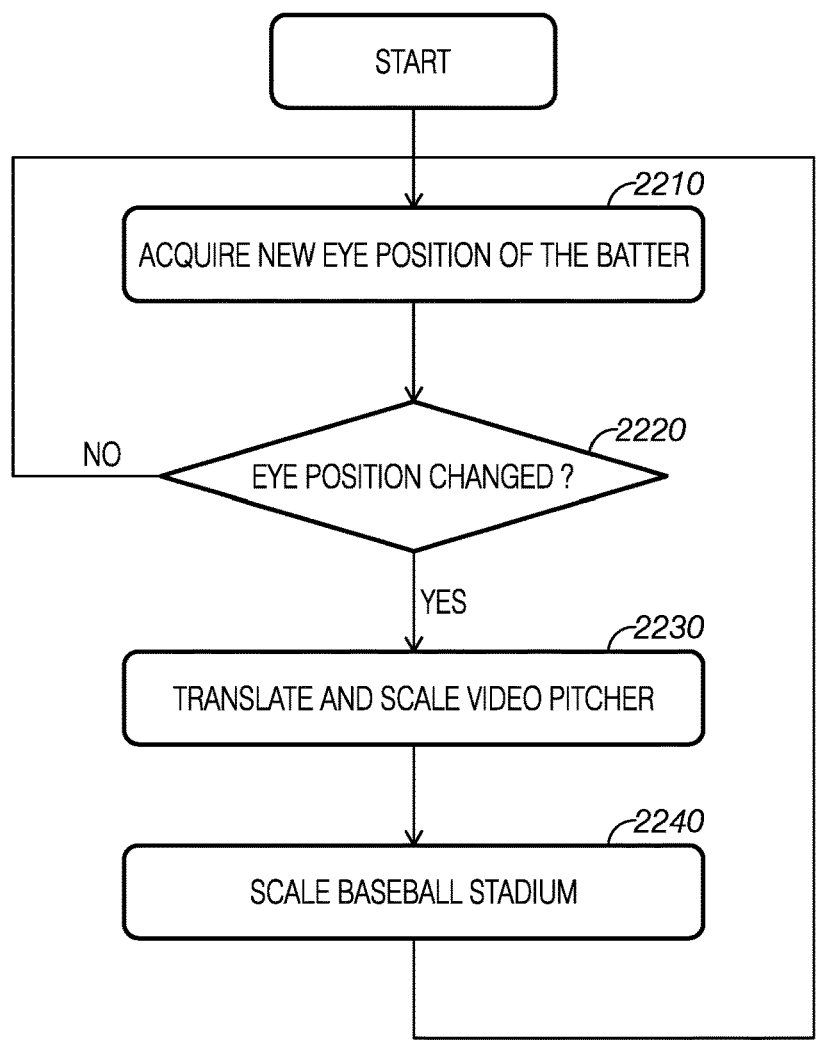
FIG. 48 is a flowchart of a method of matching a perspective of a batter user with the generated digitized avatar of a real-life pitcher in a three dimensional virtual reality environment according to an exemplary embodiment.

Referring also to FIG. 48 along with FIGS. 41-43, an exemplary process 2200 for matching perspective of the user with a selected pitcher's avatar is shown. Elements of the flowchart in the process 2200 are designated by placement in parenthesis while numerals without parenthesis refer to elements in the diagrams of FIGS. 41-43. Each pitch video may be pre-processed to turn all background pixels to full transparency, but the pitcher's image and baseball's image may be left as-is. This is sometimes known as rotoscoping. Each pitch video is annotated to mark the ball release point, pitcher's height, and locations of pitcher mound apex where the pitcher's pivot foot is placed. To simulate a particular pitch from the ball pitch database, first the ball release point is acquired from the ball pitch flight data, which typically is 50-55 feet away from home plate. Based on the pitch type and also height of the ball release point for this particular pitch, the best matched pitch video (rotoscoped and annotated) is selected from this specific pitcher's pool of video clips, in a way that the ball release point from the video is the closet to the actual ball release point for this particular pitch. This pitcher's avatar and associated video may be displayed on a video plane (for example in the form of a rectangular plane geometry), always facing the batter (user "U" as shown in FIG. 41), and the video plane is positioned so that the actual ball release point 2155 lies within the video plane. The eye position of the batter may be acquired (2210) from the motion tracking system which tracks the batter's stereoscopic glasses (for example glasses 2102 of FIGS. 34 and 35). The position of batter's eyes is updated (2220) in real-time. This pitch video plane may be anchored in a way that the pitcher's pivot foot is perceived to be fixated right at the apex of the pitching mound (because of line of sight) only from the perspective of the batter as shown in FIG. 41. More specifically, when the position of the user's eyes changes, the pitch video plane may be constantly adjusted in real-time to maintain the aforementioned line of sight, so that the pitcher's pivot foot appears to be exactly on top of the pitch's mound apex (essentially on top of pitcher's plate). In addition, the video pitcher may be constantly scaled and translated so that from the batter's perspective, the pitch release point 2155' shown on the video plane matches exactly the release point 2155 of the actual pitch being simulated (because of line of sight). More specifically, without translating and scaling of the video pitcher, the release point 2155' that appears in the video plane may not appear to be in the correct point of release in a natural environment as the perspective is off, because the projection surface may be in actuality closer than the 60 feet 6 inches a real-life pitcher would be. The height and pivot foot location of the perceived pitcher as well as the pitch release point 2155' are calculated in real-time based on the annotation data in the pitch video clip. The pitcher video plane is then scaled (2230) in a way that the ball is perceived to be released exactly from the actual ball release point 2155, while keeping pitcher's pivot foot anchored on top of pitcher's plate, as shown in FIG. 42. The video pitcher is perceived as if he is standing on the pitcher's mound at 60 feet 6 inches away from home plate.

The exemplary process 2200 for matching perspective of the user also includes adjusting the stadium and the baseball field. The stadium including the field may be captured as a 360 degrees panorama photo or video and applied to a sphere (represented by the arc 2165'), or may be geometrically modeled, or may be a hybrid of the two, for example the field is geometrically modeled and the stadium is captured as a 360 degrees panorama photo. The stadium including the field may be proportionally scaled (2240) in a way that the pitcher appears to be the same height. For example, if the perceived pitcher may be scaled to be slightly taller than his actual height (in order to match the actual pitch release point), the stadium may be scaled slightly larger by the same proportion towards a reference point 2166 on the arc 2165'. The scaled stadium is represented by the arc 2165 which is scaled up from arc 2165'. The perceived pitcher thus does not appear taller than he actually is. Each step from (2210) to (2240) may be repeated in real-time for consistency with movement of the user's eyes. As a result, the pitcher's avatar is being anchored and scaled in real-time based on batter's eye position, so from the batter's perspective, the pitcher is perceived to be on the pitcher's mound pitching the ball, and the ball release point from the video pitcher exactly matches the actual pitch release point from the pitch database throughout the entire pitch, given that the batter stays within a reasonable range from the home plate. Also the stadium is being scaled in real-time based on batter's eye position, so from the batter's point of view, the pitcher is perceived to be in accordance to his actual body height relative to the size of the stadium.

The exemplary process 2200 may need to handle a special case which is caused by the lack of variations in the height of pitch release points (such variation is depicted in FIG. 40). Hypothetically if only one pitch release point at a specific height is available from a particular pitcher's video database, assuming it happens to be a relatively low release point (for example one similar to 2150a), when a particular pitch performed by this particular pitcher with a relatively high release point is being simulated, this may cause the process 2200 to scale up the video pitcher so much that he becomes out of proportion. To prevent this issue, the exemplary process 2200 is designed to limit the scaling of the video pitcher (and also the corresponding scaling of the stadium) in a way that the overall virtual reality scene looks natural. The exemplary process 2200 may alter the actual pitch release point 2155 for a particular pitch in order to match the release point 2155' from the scaled video pitcher that is already scaled at the scaling limit. A drawback is that the system may not able to utilize the pitch data 100% original due to said shifting of pitch release height, however an option is added where the batter may filter out pitches with such shifts, to be able to utilize 100% original pitch data.

The system may also use computer generated (CG) pitcher avatars that are animated (also known as key-framed) either manually or using motion capture data. Unlike the pitch avatar described in process 2200, CG avatar is geometrically modeled in three dimensional space with articulated bones and body joints. Such CG avatars may eliminate the need for matching the perspective of the batter. In such case, CG avatar may be anchored directly on top of the pitching mound with pivot foot placed on pitcher's plate. The CG avatar may be scaled so that the pitch release point from the animated pitch sequence exactly matches the release point from the actual ball release point 2155. The pitch motion of the CG avatar may also be slightly altered using an algorithm known as Inverse Kinematics (IK), where the joint angles of the CG avatar's arm and/or body may be mathematically computed in a way that to control end-effector (in this case the pitch's hand) to reach any feasible location within the three dimensional space, specifically in this case control the CG avatar's hand to reach exactly the actual pitch release point 2155, without the need to alter the scaling of the said CG avatar nor the stadium. The drawbacks of using CG avatar may include the following. The CG avatar and associated variation of animated pitch sequences may be very difficult to acquire, which may pose a huge challenge when deploying such baseball virtual reality training system where large quantity and variations of CG pitchers and animated pitch sequences are required; the fidelity of the CG avatars as well as the pitch motions may be subpar compared to pitchers simulated using video sources.

Figure 49:
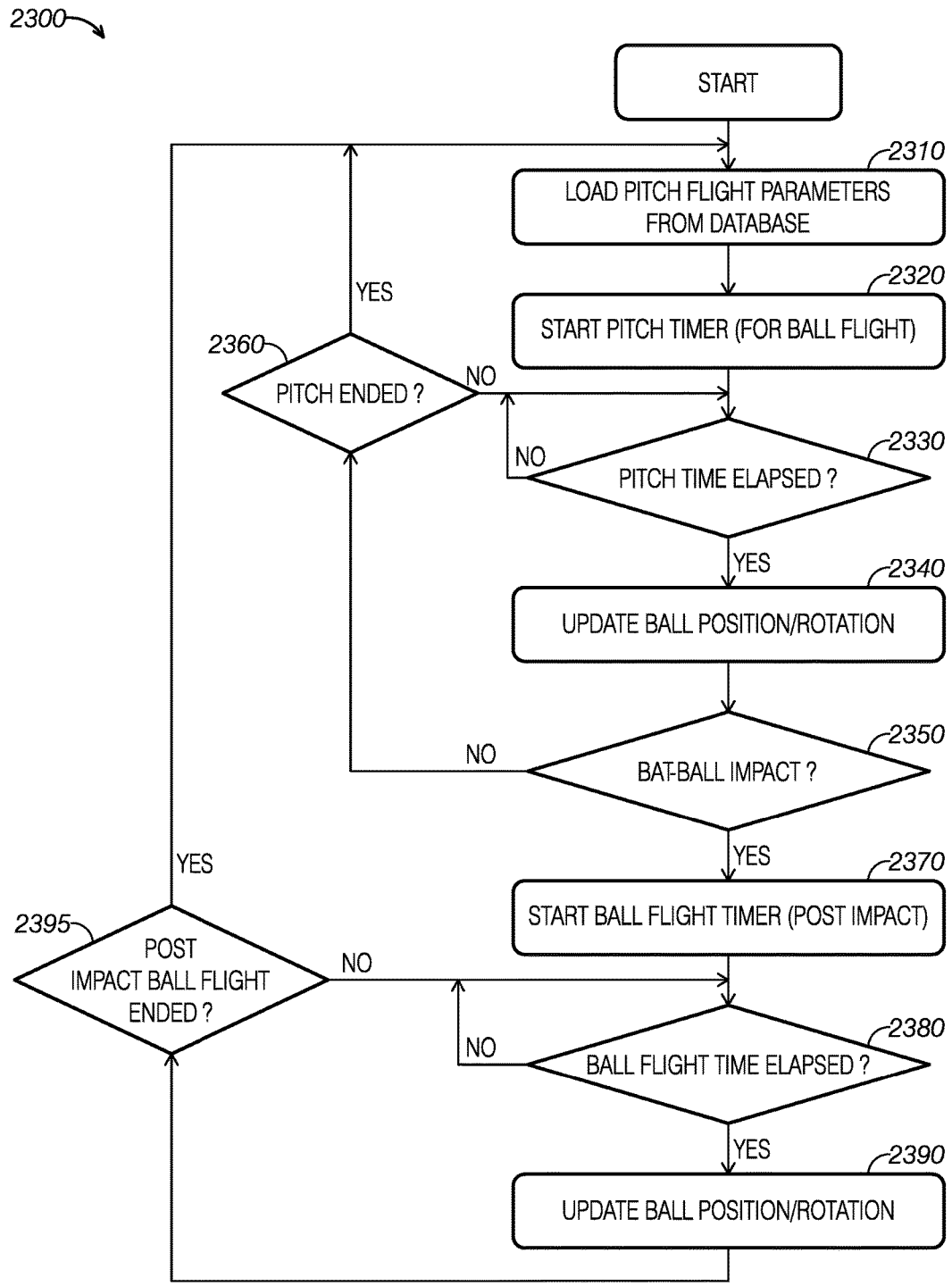
FIG. 49 is a flowchart of a method of simulating a flight path of a simulated pitched baseball from a digitized avatar of a real-life pitcher in a three dimensional virtual reality environment according to an exemplary embodiment.

Referring now to FIG. 49, a process 2300 for simulating a pitched ball flight trajectory in a virtual reality scene is shown according to an exemplary embodiment. Pitch flight parameters are loaded (2310) in from a database that stores pitching data associated with a selected pitcher. With the virtual pitcher having performed his motion and delivery, a pitch timer may be started (2320) at the exact moment when the ball is released from the pitcher's hand, which is associated with the flight time of a virtual pitch. During display of the simulated pitch and its flight path, the simulated baseball's position along the trajectory and its rotational property (shown by position of the seams) may be updated (2340). A determination (2350) may be made whether a user's batting swing made virtual contact with the simulated pitch. If the user missed, the process determines (2360) whether the pitch (flight path) has terminated. If the user makes contact, a second timer may be started (2370) tracking the length of time a hit ball has been travelling in flight. Some embodiments may calculate the trajectory, exit velocity, exit angle and distance of a simulated hit depending on the pitch speed, pitch spin, speed of the swing, angle of swing attack, and position of the bat barrel where contact occurred. A determination (2380) may be made on whether the flight of the hit ball's timer has elapsed. If so, the flight path of the hit ball may be updated (2390) for position and rotation until an affirmative determination (2395) is achieved that the hit ball's flight timer has ended.

Figure 47:
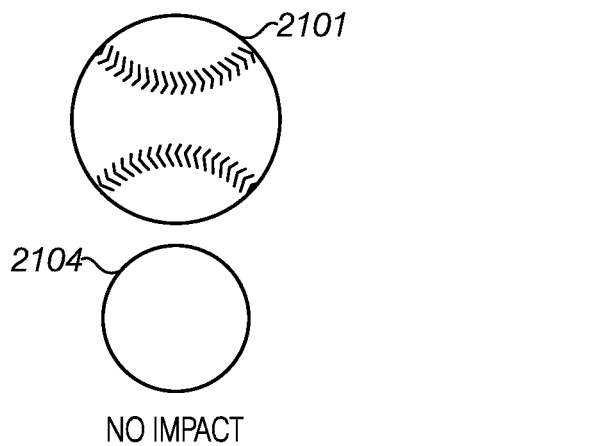
FIG. 47 is a schematic view illustrating two algorithms for determining whether a tracked swing of a baseball makes contact with a simulated baseball pitched in the system of FIG. 35 according to an exemplary embodiment.
Figure 47:
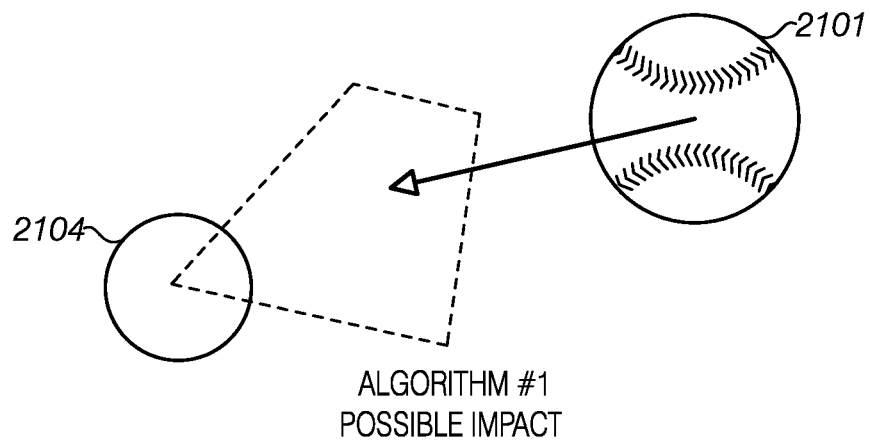
Figure 47:
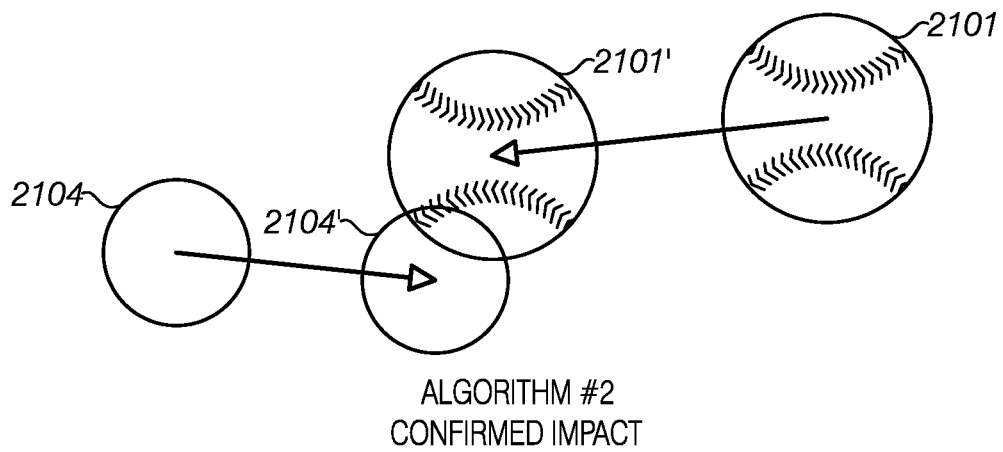

FIGS. 44-47 show schematics for determining whether a user makes contact with a simulated pitch. In some embodiments, a real bat 2104 may be used and retrofitted with tracking markers. Elements designated by a numeral and (') represent the position of the element shown in shadow lines which is at a later point in time (either at the point of impact or post-miss) than the position of an element using a regular numbered call out. As shown in FIG. 47 the swing plane may be tracked using high speed tracking cameras (for example camera(s) 2140 of FIG. 50). The bat swing is captured using a high-speed motion capture system running at 330 frames per second or higher. At each frame, the system checks for bat-ball impact. Between two consecutive frames, the valid hitting zone on the bat sweeps over a plane, in the shape of a "trapezoid" (see FIGS. 45-47) while the ball travels along an approximated "line segment" towards the home plate. The tracking system introduces a small but consistent bat tracking latency (which may be measured in advance). To compensate for this latency, the bat swing may be predicted based on previous frames tracking data so that the tracked bat (used for bat-ball impact detection) may be made to swing slightly ahead of itself. A different approach to compensate for the said tracking latency is that the system may apply the tracking latency on the pitch ball flight simulation so that the simulated pitch ball (used for bat-ball impact detection) may travel slightly ahead of time. Because the entire ball pitch flight can be simulated in advance using the pitch parameters retrieved from database, the second approach may be simpler to implement, and it may also be more accurate than the first approach.

Referring to FIG. 47 a bat-ball collision detection algorithm #1 detects the scenario of possible impact. At each frame, the system calculates the minimal distance between the "trapezoid" and the "line segment". If the minimal distance is less than the sum of the radius of the ball and the radius of the bat, it indicates a possible bat-ball impact, but requires further calculation to confirm; if the minimal distance is larger than the sum of the two, the bat does not make contact with the ball.

Referring to FIG. 47 bat-ball collision detection algorithm #2. When a possible bat-ball impact is detected, the system may use a continuous collision detection algorithm to further confirm the impact. Using the tracked bat data from current frame (t) (FIG. 46) and previous frame (t−Δt) (FIG. 45), the system calculates the speed of the bat. The speed of the pitch ball at current frame (t) is also calculated using the pitch parameters (as previously mentioned, the tracking latency may be applied to the timing of the ball). The system may perform an iterative procedure where it slowly advances the time t+Δt, calculates the position of the bat and the position of the ball based on their speeds at time (t), then calculates the minimal distance between the central axis of the bat and the center of the ball, if such minimal distance falls below the sum of the ball radius and the bat radius (at bat intersection), the system may confirm the bat-ball impact actually occurred at time t+Δt.

As will be appreciated, such continuous collision detection algorithm (#2) may accurately confirm the bat-ball impact, however it may run slower than collision detection algorithm #1. In order to achieve the fastest bat tracking result and low-latency immersive virtual reality experience, the system may be designed to run algorithm #1 by default to achieve maximum frame rate, and switches to algorithm #2 when a possible bat-ball impact needs to be confirmed. Such continuous collision detection algorithm (#2) may calculate the post-impact exit velocity, exit angle, ball trajectory and distance of a simulated hit, based on the pitch speed, pitch spin, speed of the bat swing, angle of swing attack, position of the bat barrel where contact occurred, and the overlap (vertical displacement) between the bat and the ball at contact. Based on the results of the bat-ball impact detection, some embodiments provide an impact sound generated by the sound module 2195 (FIG. 50) when the bat-ball impact is detected. Such sound may be electronically synthesized, for example the system 2100 plays recorded sound effects based on the type of impact through a speaker. Such sound may be generated physically, for example a mechanical trigger is released to hit a wood block in order to generate the sound effect. Such sound may be generated when a mechanical trigger on or inside the bat 2102 is released to hit the bat in order to generate the sound effect as well as causing the bat to vibrate as a form of haptic feedback. The impact sound may vary based on the type of bat, including an impact sound for the wood bat and a different impact sound for a metal bat. The frequency of the impact sound may vary based on the location where the bat barrel made contact with the simulated pitch, and/or the overlap (vertical displacement) between the bat and the simulated ball at contact. An impact sound may be selected for a particular pitch from a pool of impact soundtracks stored in the database or memory storage 2190, based on various properties for such particular impact, including but not limited to, pitch speed, pitch spin, speed of the bat swing, angle of swing attack, post-impact exit speed and exit angle, position of the bat barrel where contact occurred, the location where the bat barrel made contact with the simulated ball, and the overlap (vertical displacement) between the bat and the simulated ball at contact.

Note that the bat-ball impact detection may not real-time, but very close to real-time. The delay may be introduced by the bat tracking latency. The delay may also be introduced by the bat-ball impact collision detection algorithm #2 executed at least 1 frame after the impact.

As will be appreciated, a swing plane (FIG. 44-46) from the user's bat swing may be plotted as an augmented reality overlay inside the virtual environment, along with a virtual baseball as it cut through the strike zone plane. The swing plane may be used to visualize if the batter's swing was too high, too low or at the correct height. Colors may be applied to swing planes in order to help visualize such location differences from the bat swings. Bat swings and the corresponding pitches may be recorded to help the batter analyze his swing. Replay of a previous bat swing and the corresponding pitch may be activated in slow motion (frame by frame) to analyze for any arbitrary practice recorded.

Although the invention has been discussed with reference to specific embodiments, it is apparent and should be understood that the concept can be otherwise embodied to achieve the advantages discussed. The preferred embodiments above have been described primarily as simulated environments for sports training of athletes. In this regard, the foregoing description of the simulated environments is presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

Unless specifically stated otherwise, it shall be understood that disclosure employing the terms "processing," "computing," "determining," "calculating," "receiving images," "acquiring," "generating," "performing" and others refer to a data processing system or other electronic device manipulating or transforming data within the device memories or controllers into other data within the system memories or registers.

One or more embodiments may be implemented in computer software firmware, hardware, digital electronic circuitry, and computer program products which may be one or more modules of computer instructions encoded on a computer readable medium for execution by or to control the operation of a data processing system. The computer readable medium may be a machine readable storage substrate, flash memory, hybrid types of memory, a memory device, a machine readable storage device, random access memory ("RAM"), read-only memory ("ROM"), a magnetic medium such as a hard-drive or floppy disk, an optical medium such as a CD-ROM or a DVR, or in combination for example. A computer readable medium may reside in or within a single computer program product such as a CD, a hard-drive, or computer system, or may reside within different computer program products within a system or network. The computer readable medium can store software programs that are executable by the processor 2032 and may include operating systems, applications, and related program code. The machine readable non-transitory medium storing executable program instructions which, when executed, will cause a data processing system to perform the methods described herein. When applicable, the ordering of the various steps described herein may be changed, combined into composite steps, or separated into sub-steps to provide the features described herein.

Computer programs such as a program, software, software application, code, or script may be written in any computer programming language including conventional technologies, object oriented technologies, interpreted or compiled languages, and can be a module, component, or function. Computer programs may be executed in one or more processors or computer systems.

What is claimed is:

1. A virtual reality system, comprising:
    an electronic display configured to project a virtual reality baseball environment shown in a first-person perspective of a user training a batting swing in the virtual reality baseball environment; and
    a graphics engine module connected to the electronic display, the graphics engine module configured to:
    generate the virtual reality baseball environment;
    generate a digital avatar of a user selected real-life baseball pitcher;
    retrieve from an electronic database, real-life pitching data of the user selected real-life baseball pitcher, the real-life pitching data including:
        pitch types thrown in real-life by the user selected real-life baseball pitcher, a release point of a real-life thrown baseball for each respective pitch type of the user selected real-life baseball pitcher, and
        a range of speeds associated with each pitch type for the user selected real-life baseball pitcher, wherein
        the release point is defined by a height of the real-life thrown baseball,
    display in the virtual reality environment, the digital avatar of the user selected real-life baseball pitcher with an appearance replicating the real-life baseball pitcher in real-life from the first-person perspective of the user,
    display in the virtual reality environment, a pitching sequence by the digital avatar of the user selected real-life baseball pitcher, from either a wind-up or a stretch delivery, and
    display in the virtual reality environment, a replicated release of a digital baseball from the release point associated with the pitch type for the user selected real-life baseball pitcher thrown from a replicated digital arm of the user selected real-life baseball pitcher, the replicated release of the digital baseball continuing in a simulated trajectory of a thrown pitch within the range of speeds associated with the pitch type, seen in the first-person perspective of the user, from the release point associated with the pitch type for the user selected real-life baseball pitcher toward a strike zone adjacent the user in the virtual reality baseball environment.

2. The virtual reality projection system of claim 1, wherein the graphics engine module is also configured to scale the digital avatar of the user selected real-life baseball pitcher to replicate an appearance of a perceived distance of the real-life baseball pitcher from the user's first-person perspective.

3. The virtual reality projection system of claim 2, wherein the replicated digital arm and a location of the replicated release of the digital baseball from the release point associated with the pitch type are scaled to replicate the appearance of the perceived distance of the real-life baseball pitcher from the user's first-person perspective.

4. The virtual reality projection system of claim 3, wherein the replicated digital arm and the replicated release of the digital baseball from the release point associated with the pitch type are constantly scaled during the displayed pitching sequence.

5. The virtual reality projection system of claim 1, wherein the graphics engine module is also configured to generate a visible swing plane overlay graphic in the virtual reality baseball environment representing a path of a user's swing.

6. The virtual reality projection system of claim 1, wherein the electronic display is a projector system or a head mounted display.

7. The virtual reality projection system of claim 1, wherein the graphics engine module is also configured to generate a three-dimensional panoramic view of a stadium surrounding the digital avatar from the first-person perspective of the user.

8. A machine readable non-transitory medium storing executable program instructions which when executed cause a data processing system to perform a method comprising:
    generating a virtual reality baseball environment in an electronic display;

generating a digital avatar of a user selected real-life baseball pitcher;

retrieving from an electronic database, real-life pitching data of the user selected real-life baseball pitcher, the real-life pitching data including:

pitch types thrown in real-life by the user selected real-life baseball pitcher, a release point of a real-life thrown baseball for each respective pitch type of the user selected real-life baseball pitcher, and a range of speeds associated with each pitch type for the user selected real-life baseball pitcher, wherein the release point is defined by a height of the real-life thrown baseball;

displaying in the virtual reality environment, the digital avatar of the user selected real-life baseball pitcher with an appearance replicating the real-life baseball pitcher in real-life from the first-person perspective of the user, displaying in the virtual reality environment, a pitching sequence by the digital avatar of the user selected real-life baseball pitcher, from either a wind-up or a stretch delivery, and displaying in the virtual reality environment, a replicated release of a digital baseball from the release point associated with the pitch type for the user selected real-life baseball pitcher thrown from a replicated digital arm of the user selected real-life baseball pitcher, the replicated release of the digital baseball continuing in a simulated trajectory of a thrown pitch within the range of speeds associated with the pitch type, seen in the first-person perspective of the user, from the release point associated with the pitch type for the user selected real-life baseball pitcher toward a strike zone adjacent the user in the virtual reality baseball environment.

9. The machine readable non-transitory medium storing executable program instructions which when executed cause the data processing system to perform the method of claim 8, further comprising scaling the digital avatar of the user selected real-life baseball pitcher to replicate an appearance of a perceived distance of the real-life baseball pitcher from the user's first-person perspective.

10. The machine readable non-transitory medium storing executable program instructions which when executed cause the data processing system to perform the method of claim 9, further comprising scaling the replicated digital arm and a location of the replicated release of the digital baseball from the release point associated with the pitch type to replicate the appearance of the perceived distance of the real-life baseball pitcher from the user's first-person perspective.

11. The machine readable non-transitory medium storing executable program instructions which when executed cause the data processing system to perform the method of claim 10, further comprising constantly scaling the replicated digital arm and the replicated release of the digital baseball from the release point associated with the pitch type during the displayed pitching sequence.

12. The machine readable non-transitory medium storing executable program instructions which when executed cause the data processing system to perform the method of claim 8, further comprising generate a visible swing plane overlay graphic in the virtual reality baseball environment representing a path of a user's swing.

13. The machine readable non-transitory medium storing executable program instructions which when executed cause the data processing system to perform the method of claim 8, further comprising generating a three-dimensional panoramic view of a stadium surrounding the pitcher from the first-person perspective of the user.

14. A method of simulating a baseball pitcher's pitch, comprising:

generating a virtual reality baseball environment in an electronic display;

generating a digital avatar of a user selected real-life baseball pitcher;

retrieving from an electronic database, real-life pitching data of the user selected real-life baseball pitcher, the real-life pitching data including:

pitch types thrown in real-life by the user selected real-life baseball pitcher, a release point of a real-life thrown baseball for each respective pitch type of the user selected real-life baseball pitcher, and a range of speeds associated with each pitch type for the user selected real-life baseball pitcher, wherein the release point is defined by a height of the real-life thrown baseball;

displaying in the virtual reality environment, the digital avatar of the user selected real-life baseball pitcher with an appearance replicating the real-life baseball pitcher in real-life from the first-person perspective of the user, displaying in the virtual reality environment, a pitching sequence by the digital avatar of the user selected real-life baseball pitcher, from either a wind-up or a stretch delivery, and displaying in the virtual reality environment, a replicated release of a digital baseball from the release point associated with the pitch type for the user selected real-life baseball pitcher thrown from a replicated digital arm of the user selected real-life baseball pitcher, the replicated release of the digital baseball continuing in a simulated trajectory of a thrown pitch within the range of speeds associated with the pitch type, seen in the first-person perspective of the user, from the release point associated with the pitch type for the user selected real-life baseball pitcher toward a strike zone adjacent the user in the virtual reality baseball environment.

15. The method of claim 14, further comprising scaling the digital avatar of the user selected real-life baseball pitcher to replicate an appearance of a perceived distance of the real-life baseball pitcher from the user's first-person perspective.

16. The method of claim 15, further comprising scaling the replicated digital arm and a location of the replicated release of the digital baseball from the release point associated with the pitch type to replicate the appearance of the perceived distance of the real-life baseball pitcher from the user's first-person perspective.

17. The method of claim 16, further comprising constantly scaling the replicated digital arm and the replicated release of the digital baseball from the release point associated with the pitch type during the displayed pitching sequence.

18. The method of claim 14, further comprising generating a visible swing plane overlay graphic in the virtual reality baseball environment representing a path of a user's swing.

19. The method of claim 14, wherein the electronic display is a projector system or a head mounted display.

20. The method of claim 14, further comprising generating a three-dimensional panoramic view of a stadium surrounding the digital avatar from the first-person perspective of the user.

* * * * *